(12) United States Patent
Lyden

(10) Patent No.: US 12,136,824 B2
(45) Date of Patent: Nov. 5, 2024

(54) DEVICE FOR RECEIVING AND HARVESTING ENERGY FROM THE EARTH AND ITS ATMOSPHERE

(71) Applicant: Robert M. Lyden, Ashland, OR (US)

(72) Inventor: Robert M. Lyden, Ashland, OR (US)

(*) Notice: Subject to any disclaimer, the term of this patent is extended or adjusted under 35 U.S.C. 154(b) by 83 days.

(21) Appl. No.: 18/166,744

(22) Filed: Feb. 9, 2023

(65) Prior Publication Data
US 2023/0187968 A1 Jun. 15, 2023

Related U.S. Application Data

(63) Continuation-in-part of application No. 16/542,043, filed on Aug. 15, 2019, now Pat. No. 11,588,421.

(51) Int. Cl.
H02J 50/00 (2016.01)
H02J 50/70 (2016.01)

(52) U.S. Cl.
CPC .............. H02J 50/001 (2020.01); H02J 50/70 (2016.02)

(58) Field of Classification Search
CPC .......... H02J 50/001; H02J 50/70; H02J 50/00; H05F 7/00
USPC .......................................................... 307/104
See application file for complete search history.

(56) References Cited

U.S. PATENT DOCUMENTS

| | | |
|---|---|---|
| 28,793 A | 6/1860 | Vion |
| 129,179 A | 7/1872 | Harrison et al. |
| 182,172 A | 9/1876 | Crookes |
| 454,622 A | 6/1891 | Tesla |
| 462,418 A | 11/1891 | Tesla |
| 514,168 A | 2/1894 | Tesla |
| 568,176 A | 9/1896 | Tesla |
| 568,178 A | 9/1896 | Tesla |
| 593,138 A | 11/1897 | Tesla |
| 600,457 A | 3/1898 | Stubblefield |
| 609,245 A | 8/1898 | Tesla |
| 609,251 A | 8/1898 | Tesla |
| 645,576 A | 3/1900 | Tesla |
| 649,621 A | 5/1900 | Tesla |
| 674,427 A | 5/1901 | Palencsar |
| 685,012 A | 10/1901 | Tesla |
| 685,955 A | 11/1901 | Tesla |
| 685,957 A | 11/1901 | Tesla |
| 685,958 A | 11/1901 | Tesla |
| 706,747 A | 8/1902 | Fessenden |
| 787,412 A | 4/1905 | Tesla |
| 803,684 A | 11/1905 | Fleming |

(Continued)

FOREIGN PATENT DOCUMENTS

| | | |
|---|---|---|
| EP | 1043425 A1 | 10/2000 |
| GB | 191417811 A | 5/1915 |

(Continued)

OTHER PUBLICATIONS

Tesla coil retrieved Jul. 26, 2022 from "https://en.wikipedia.org/w/index.php?title=Tesla_coil&oldid=1099395854".

(Continued)

Primary Examiner — Rexford N Barnie
Assistant Examiner — Xuan Ly
(74) Attorney, Agent, or Firm — Westman, Champlin & Koehler, P.A.

(57) ABSTRACT

A device for receiving and harvesting energy from the earth and its atmosphere for providing a supply of electrical energy.

20 Claims, 56 Drawing Sheets

(56) References Cited

U.S. PATENT DOCUMENTS

| | | | |
|---|---|---|---|
| 841,387 A | 1/1907 | De Forest | |
| 879,532 A | 2/1908 | De Forest | |
| 911,260 A | 2/1909 | Pennock | |
| 1,014,719 A | 1/1912 | Pennock | |
| 1,113,149 A | 10/1914 | Armstrong | |
| 1,119,732 A | 12/1914 | Tesla | |
| 1,336,378 A | 4/1920 | Pupin et al. | |
| 1,342,885 A | 6/1920 | Armstrong | |
| 1,360,167 A | 11/1920 | Alexanderson | |
| 1,380,206 A | 5/1921 | Weagant | |
| 1,424,065 A | 7/1922 | Armstrong | |
| 1,540,998 A | 6/1925 | Plauson | |
| 1,723,422 A | 8/1929 | Hubbard | |
| 1,767,218 A | 6/1930 | Kunsman | |
| 1,941,066 A | 12/1933 | Armstrong | |
| 1,991,236 A | 2/1935 | Van De Graaff | |
| 2,006,676 A | 7/1935 | Garrett | |
| 2,032,545 A | 3/1936 | McElrath | |
| 2,047,019 A | 7/1936 | Ferris | |
| 2,071,515 A | 2/1937 | Farnsworth | |
| 2,071,516 A | 2/1937 | Farnsworth | |
| 2,071,517 A | 2/1937 | Farnsworth | |
| 1,969,399 A | 8/1937 | Farnsworth | |
| 2,090,006 A | 8/1937 | Knoll et al. | |
| 2,091,439 A | 8/1937 | Farnsworth | |
| 2,135,615 A | 11/1938 | Farnsworth | |
| 2,139,813 A | 12/1938 | Farnsworth | |
| 2,140,285 A | 12/1938 | Farnsworth | |
| 2,140,832 A | 12/1938 | Farnsworth | |
| 2,141,827 A | 12/1938 | Farnsworth | |
| 2,141,837 A | 12/1938 | Farnsworth | |
| 2,141,838 A | 12/1938 | Farnsworth | |
| 2,143,262 A | 1/1939 | Farnsworth | |
| 2,161,620 A | 6/1939 | Farnsworth | |
| 2,172,152 A | 9/1939 | Farnsworth | |
| 2,174,487 A | 9/1939 | Farnsworth | |
| 2,179,996 A | 11/1939 | Farnsworth et al. | |
| 2,184,910 A | 12/1939 | Farnsworth | |
| 2,203,048 A | 6/1940 | Farnsworth | |
| 2,204,479 A | 6/1940 | Farnsworth | |
| 2,217,417 A | 10/1940 | Peterson | |
| 2,217,860 A | 10/1940 | Farnsworth | |
| 2,260,613 A | 10/1941 | Farnsworth | |
| 2,263,032 A | 11/1941 | Farnsworth | |
| 2,274,194 A | 2/1942 | Farnsworth | |
| 2,286,076 A | 6/1942 | Farnsworth | |
| 2,311,981 A | 2/1943 | Farnsworth | |
| 2,460,707 A | 2/1949 | Moray | |
| 2,590,863 A | 4/1952 | Jacobs et al. | |
| 2,802,127 A | 8/1957 | Dobischek et al. | |
| 2,813,242 A | 11/1957 | Crump | |
| 2,842,706 A | 7/1958 | Dobischek et al. | |
| 2,845,558 A | 7/1958 | Stec | |
| 2,922,905 A | 1/1960 | Van De Graaff | |
| 2,943,225 A | 6/1960 | Firth et al. | |
| 3,258,402 A | 6/1966 | Farnsworth | |
| 3,262,872 A | 7/1966 | Rhodes et al. | |
| 3,331,108 A | 7/1967 | Fisher et al. | |
| 3,386,883 A | 6/1968 | Farnsworth | |
| 3,393,316 A | 7/1968 | Carr | |
| 3,530,497 A | 9/1970 | Hirsch et al. | |
| 3,533,910 A | 10/1970 | Hirsch | |
| 3,694,754 A | 9/1972 | Baltzer | |
| 3,980,053 A | 9/1976 | Horvath | |
| 4,014,777 A | 3/1977 | Brown | |
| 4,107,008 A | 8/1978 | Horvath | |
| 4,124,463 A | 11/1978 | Blue | |
| 4,204,147 A | 5/1980 | Larrabee | |
| 4,394,230 A | 7/1983 | Puharich | |
| 4,428,193 A | 1/1984 | Papp | |
| 4,622,510 A | 11/1986 | Cap | |
| 4,726,888 A | 2/1988 | McCambridge | |
| 4,760,325 A | 7/1988 | Suzuki et al. | |
| 4,835,433 A | 5/1989 | Brown | |
| 4,897,592 A | 1/1990 | Hyde | |
| 5,018,180 A | 5/1991 | Shoulders | |
| 5,087,089 A | 2/1992 | Lee | |
| 5,089,107 A | 2/1992 | Pacheco | |
| 5,178,118 A | 1/1993 | Nakamats | |
| 5,399,251 A | 3/1995 | Nakamats | |
| 5,416,391 A | 5/1995 | Correa et al. | |
| 5,449,989 A | 9/1995 | Correa et al. | |
| 5,794,601 A | 8/1998 | Pantone | |
| 5,852,993 A | 12/1998 | Anderson | |
| 6,119,651 A | 9/2000 | Anderson | |
| 6,208,061 B1 | 3/2001 | An | |
| 6,218,998 B1 | 4/2001 | Van Voorhies | |
| 6,476,766 B1 | 11/2002 | Cohen | |
| 6,545,444 B2 | 4/2003 | Bedini | |
| 6,790,324 B2 | 9/2004 | Chambers | |
| 6,971,594 B1 | 12/2005 | Polifka | |
| 6,974,110 B2 | 12/2005 | Grandics | |
| 7,091,481 B2 | 8/2006 | Miller et al. | |
| 7,145,513 B1 | 12/2006 | Cohen | |
| 7,439,712 B2 | 10/2008 | McCowen | |
| 7,478,712 B2 | 1/2009 | McCowen | |
| 7,888,584 B2 | 2/2011 | Lyden | |
| 8,319,091 B2 | 11/2012 | Lyden | |
| 8,686,575 B2 | 4/2014 | McCowen | |
| 8,810,049 B2 | 8/2014 | McCowen | |
| 8,957,301 B2 | 2/2015 | Lyden | |
| 9,331,603 B2 | 5/2016 | McCowen | |
| 9,479,086 B2 | 10/2016 | McCowen | |
| 10,030,917 B1 | 7/2018 | Cohen | |
| 10,648,430 B2 | 5/2020 | Jenkins | |
| 10,840,707 B2 | 11/2020 | Lyden | |
| 11,207,988 B2 | 12/2021 | Lyden | |
| 2002/0169351 A1 | 11/2002 | Brown | |
| 2007/0007844 A1 | 1/2007 | Barbat | |
| 2007/0195481 A1 | 8/2007 | McCowen | |
| 2007/0273206 A1 | 11/2007 | McCowen | |
| 2008/0129639 A1 | 6/2008 | Mitsugi | |
| 2008/0191580 A1 | 8/2008 | Deyo | |
| 2009/0040680 A1 | 2/2009 | McCowen | |
| 2009/0114495 A1 | 5/2009 | McCowen | |
| 2010/0090562 A1 | 4/2010 | McCowen | |
| 2010/0090563 A1 | 4/2010 | McCowen | |
| 2010/0201314 A1 | 8/2010 | Toncich et al. | |
| 2010/0207399 A1* | 8/2010 | Grandics | H02N 1/06 290/1 R |
| 2012/0299559 A1 | 11/2012 | McCowen | |
| 2013/0157729 A1 | 6/2013 | Tabe | |
| 2014/0043861 A1 | 2/2014 | Luh et al. | |
| 2014/0191843 A1 | 7/2014 | DeCou et al. | |
| 2014/0210308 A1 | 7/2014 | McCowen | |
| 2014/0253271 A1 | 9/2014 | Heins | |
| 2015/0001966 A1 | 1/2015 | McCowen | |
| 2016/0043661 A1 | 2/2016 | McCowen | |
| 2016/0248345 A1 | 8/2016 | McCowen | |
| 2018/0026553 A1 | 1/2018 | McCowen | |
| 2019/0020117 A1 | 1/2019 | Cohen | |
| 2021/0036500 A1 | 2/2021 | McCowen | |
| 2022/0290317 A1 | 9/2022 | Tadiello et al. | |

FOREIGN PATENT DOCUMENTS

| | | |
|---|---|---|
| GB | 191505591 A | 8/1915 |
| GB | 191514311 A | 8/1916 |
| GB | 121561 A | 12/1918 |
| GB | 299735 A | 5/1927 |
| GB | 2324307 | 10/1998 |

OTHER PUBLICATIONS

Werner et al., "Fractal Antenna Engineering: The Theory and Design of Fractal Antenna Arrays," published in IEEE Antennas and Propagation Magazine, vol. 41, No. 5, Oct. 1999.

Prosecution history from corresponding U.S. Appl. No. 16/542,043, filed Aug. 15, 2019 including: Notice of Allowance and Fee(s) Due mailed Dec. 19, 2022, Advisory Action mailed Sep. 7, 2022, Final Rejection mailed Jul. 11, 2022, Non-Final Rejection mailed Oct. 26, 2021, Advisory Action mailed Sep. 13, 2021, Final Rejection mailed Aug. 4, 2021; and Non-Final Rejection mailed Feb. 4, 2021.

(56) References Cited

OTHER PUBLICATIONS

Leimer, E. On Radium Antennae (Influence of the proximity of Radium upon signal reception), Elckt. Zets. 86. p. 94, Feb. 25, 1915.

* cited by examiner

PRIOR ART

PRIOR ART

Marx Generator (Charging)

Marx Generator (Discharging)

PRIOR ART

PRIOR ART

PRIOR ART

PRIOR ART

Kit 57. ION GENERATOR

PRIOR ART

Phi Triangle, Cone, and Spiral

DEVICE FOR RECEIVING AND HARVESTING ENERGY FROM THE EARTH AND ITS ATMOSPHERE

CROSS REFERENCE TO RELATED APPLICATION

This application is a continuation in part of U.S. application Ser. No. 16/542,043 filed on Aug. 15, 2019 entitled Receiver Device of Energy From the Earth and Its Atmosphere which is pending. The contents of the application cited in the CROSS REFERENCE TO RELATED APPLICATION section is hereby incorporated by reference herein in its entirety.

FIELD

The present disclosure relates to a device for receiving and harvesting energy derived from the earth and its atmosphere for providing a supply of electric power.

BACKGROUND

Our planet is undergoing a dramatic period of climate change due at least in part to rapid growth of human population and the burning of fossil fuels. Accordingly, there is a great need for a clean and renewable source of energy for providing electric power.

There have been a number of individuals who have invented devices that were intended to provide energy obtained from the earth and its atmosphere, e.g., U.S. Pat. No. 28,793 by H. C. Vion in 1860, U.S. Pat. No. 129,179 by Mahlon Loomis in 1872, U.S. Pat. No. 182,172 by W. Crookes in 1876, U.S. Pat. No. 600,457 by N. B. Stubblefield in 1898, the "Condensing Dynamo" of Edward S. Farrow in 1911, U.S. Pat. No. 674,427 by A. Palencsar in 1901, U.S. Pat. No. 911,260 W. I. Pennock in 1909, U.S. Pat. No. 1,014,719 by W. I. Pennock in 1912, U.S. Pat. No. 1,540,998 by Hermann Plauson in 1921, U.S. Pat. No. 3,311,108 by C. Cristofv et al., and more recently U.S. 2008/0191580 by Harold Deyo in 2008, U.S. Pat. No. 5,590,031 by Mead et al., U.S. Pat. No. 6,974,110 for Method and Apparatus for Converting Electrostatic Potential Energy by Peter Grandics, and U.S. Pat. Nos. 7,439,712, 7,478,712, 8,686,575, 8,810,049, and 9,331,603, 9,479,086 by Clint McCowen assigned to Ion Power Group LLC. All of the aforementioned patents recited in his paragraph are hereby incorporated by reference herein.

Nicola Tesla invented AC current, electric motors, generators, coils, light bulbs, and contributed to making the hydro-electric power station at Niagra Falls. He was also granted patents relating to lighting, radio transmission, radiant energy, and superconductivity, e.g., U.S. Pat. Nos. 454,622, 462,418, 514,168, 568,176, 568,178, 593,138, 609,245, 609,251 649,621, 645,576, 685,012, 685,955, 685,957, 685,958, 787,412, and 1,119,732. All of the aforementioned patents recited in his paragraph are hereby incorporated by reference herein. Tesla described the earth as follows in U.S. Pat. No. 787,412 on page 3:

" . . . the planet behaves like a perfectly smooth or polished conductor of inappreciable resistance with capacity and self-induction uniformly distributed along the axis of symmetry of wave propagation and transmitting slow electrical oscillations without sensible distortion and attenuation."

In U.S. Pat. No. 787,412, on page 3, Tesla disclosed his belief that it was advantageous when attempting to transmit communications through the earth to use relatively low frequencies under 20,000 Hz, and irrespective of the frequency that is being used, the wave or wave train should continue for a certain interval of time, and in particular, not less than one-twelfth or probably 0.08484 of a second. In this regard, Tesla was attempting to create stationary waves in the earth and he was then treating the distance associated with the surface of the earth as a resonating solid or antenna.

Further, there also exists an unconfirmed story that Tesla obtained a 1931 Pierce Arrow from the automobile plant in Buffalo, New York near the site of the power station he helped to design at Niagara Falls, and then replaced the gasoline combustion motor with an 80 hp AC electric motor capable of turning 1800 rpm. The electric motor was allegedly provided with power from a black box device that Tesla made that measured approximately 2 feet long, 1 foot wide, and 6 inches high which contained 12 Type 70-L-7 vacuum tubes and some resistors. One of the problems with this information is that the Type 70-L-7 vacuum tube was not manufactured until some years later. The black box was allegedly connected with an antenna measuring 1.5 meters or about 6 feet long, and two small metal rods also protruded from the black box device. According to this story, Tesla connected the black box to some wiring, he pushed in the two metal rods and then indicated to a Mr. Petar Savo, who was a relative, the device was ready to use and the motor then had a viable source of electric power. Tesla instructed Savo to drive the car which was then allegedly tested for about week and at one point reached a maximum speed around 90 miles per hour. The modified Pierce Arrow was stored at a farmhouse location about 20 miles from Buffalo, New York.

Savo had allegedly served as a pilot for Austria-Hungary during World War I, and later told the story to a man named Derek Ahlers who was a designer and inventor in the aviation industry living in New York. Savo's identity has not been confirmed, and this has led to the authenticity of this story being disputed. The Applicant has studied the Russian language, and knows there could be many different ways to translate and spell the name Savo. Because his last name is derived from the Cyrillic alphabet and could possibly be translated in many different spellings into English, the task of tracing and establishing his identity could be difficult or impossible. According to one version of this story, a man named Lee de Forest called Savo a couple weeks later to inquire about the automobile experiment. It is known that de Forest was the inventor of the three electrode or triode vacuum tube, but also of early amplifiers and regenerative circuits. Moreover, the Applicant has determined that an individual named John Derek Ahlers lived in New York during this period, and he was a prominent aviation engineer who is now featured in an exhibit at the Smithsonian.

There is also a second source that supports this story of Tesla's experiment with the Pierce Arrow automobile. A man named Klaus Lebens who lives in Germany discovered in his deceased father's papers a letter from 1930 in which his father described first meeting with Nikola Tesla at the Waldorf Astoria in New York on Nov. 25, 1930, and then taking a ride in an electric 1930 Pierce Arrow the next day. At the time, Heinrich Jebens was an employee of the German Patent Office in Hamburg, and he had traveled to America to meet the world-famous inventors Thomas Edison, Nicola Tesla, and others. The Applicant is not in a position to know if the letter of Jebens is authentic, but on information and belief officials who work in the German or U.S. Patent Offices are not inclined to tell fables about technology and inventions. The 1930 Pierce Arrow that was allegedly modified by Tesla would have been wired positive ground, and been equipped with a six Volt battery and an ignition coil as a stock vehicle coming from the factory. However, the fate and location of the 1930 Pierce Arrow vehicle is unknown, and no research notes by Tesla relating to this experiment are known to exist. Accordingly, it would be difficult or impossible to find information and evidence that could serve to confirm this story. In sum, we don't know if the Pierce Arrow story is a myth, or whether Tesla actually made and tested the electric vehicle. Moreover, if Tesla did succeed with an alternative energy experiment using a Pierce Arrow including an electric motor, we don't know the structure of the device, or how it worked because he never mentioned the possible automotive invention to the news media, and it does not appear in any of his patents.

The invention of the vacuum tube provided for making a possible amplifier, a modulator, oscillator, regulator, and an electronic switch for use, but also means for making large magnifications by way of oscillations and regenerative feedback. In this regard, the "Fleming valve" disclosed in U.S. Pat. No. 803,684 by J. A. Fleming in 1905, was followed by the work of Lee de Forest who is attributed with the invention of the "grid Audio" or first triode vacuum tube that was patented as U.S. Pat. No. 841,387 in 1907, and U.S. Pat. No. 879,532 in 1908. De Forest also combined two triode vacuum tubes to create a "cascade amplifier" and was involved in legal disputes with Edwin Howard Armstrong over the discovery of "regeneration," the "ultra audion" or the feedback circuit for which de Forest was granted U.S. Pat. No. 1,113,149 in 1914. In this regard, Armstrong was awarded U.S. Pat. Nos. 1,113,149, 1,336,378, 1,342,885, 1,424,065, and was also the inventor of frequency modulation or FM disclosed in U.S. Pat. No. 1,941,066. Other patents for vacuum tubes include U.S. Pat. No. 1,380,206 for a vacuum valve detector by R. A. Weagant, U.S. Pat. No. 2,047,019 for a grid structure by W. R. Ferris, U.S. Pat. No. 2,090,006 for electron discharge tube by M. Knoll et al., U.S. Pat. No. 2,217,417 for electron discharge apparatus by L. C. Peterson, and U.S. Pat. No. 2,460,707 for electrotherapeutic apparatus by T. H. Moray. Other patents for signaling and/or antennas include U.S. Pat. No. 706,747 by R. A. Fessenden in 1902, U.S. Pat. No. 1,360,167 by E. F. W. Alexanderson in 1920, U.S. Pat. No. 3,694,754 by Otto Baltzar, and U.S. Pat. No. 6,218,998 for Toroidal Helical Antenna by Kurt Louis Van Voorhies. All of the aforementioned patents recited in his paragraph are hereby incorporated by reference herein.

In accordance with Ohm's law which is I (current)=V (voltage)/R (resistance), there normally exists an inverse relationship between voltage and current. Accordingly, very high frequency voltage is normally associated with very low current. High frequency voltage can be used to power certain electrical devices without generating the same amount of heat that is often associated with the use of high levels of current. For example, a florescent light does not normally generate the same amount of heat as does a conventionally wired and powered incandescent light bulb which uses lower frequency voltage and also a resistive filament. In this regard, some of the aforementioned patents of Tesla, e.g., U.S. Pat. No. 454,622, teach the use of an inductor to achieve high frequencies of at least 15,000-20,000 cycles per second and also high voltage potentials of at least 20,000 Volts in devices which can include resonating circuits, condensers, and means for causing rapid mechanical, magneto-electric, or disruptive discharge(s).

While not being bound to theory, the disclosure of the present application relates to the belief that voltage and current, dielectric capacity and magnetic inductance, are different aspects or parts of what is called "electricity" and they can appear together in various degrees, or they can very nearly or actually appear individually and to the near or complete exclusion of the other in certain conditions. An inductor which has generated high voltage but relatively low current that has suddenly been discharged into a high impedance load can provide one example of a cold form of electricity. In this regard, due to the sudden collapse and/or movement of a magnetic field, high voltage can produce useful electrical energy in what is sometimes conceived and visualized as being like a compression or pulse wave without high current then also being present. When conditions of high current and high voltage are both present, or when a condition of high current and low voltage is present, these conditions can prevent an associated magnetic field which collapses and/or which is in motion from being easily communicated along the skin and/or proximate to the outside surface of a conductor, rather the magnetic field is then impeded because it meets with greater resistance by having to travel between and/or through more of the atoms and molecules which are present in the conductor. When a condition of very high voltage and a very low current is present it can be the case that an associated magnetic field which suddenly collapses and/or which is in motion can then resemble a compression or pulse wave can travel substantially longitudinally and approximately at or near the speed of light on the skin and/or proximate to the outside surface a conductor, and under certain conditions, also in the surrounding atmosphere and so-called empty space. Alternatively, electrical energy without the presence of high voltage can be generated by the fluctuation of potentials in a low impedance circuit when relatively high current is being suddenly and repeatedly interrupted and the reflection of this fluctuation crosses between two negative terminals. The observed electrical energy may then take the form of a transverse wave. In a paper entitled "Conflicts Between Quantum Mechanics and Relativity," by Philo T. Farnsworth, which is believed to have been published by the Farnsworth Electronics Company of Fort Wayne, Indiana in the year 1956, he puts forth a theory that an observed magnetic field which is consistent with the right hand rule and is substantially perpendicular to the orientation and direction a straight wire could be the result of a mass inertial effect associated with and resulting from the movement of an electron along or in the wire. See also the paper entitled: "Tesla's Nonlinear Oscillator-Shuttle-Circuit (OSC) Theory," by T. W. Barrett, https://www.researchgate.net/publication/305636853_Tesla's_nonlinear_oscillator-shuttle-circuit_OSC_theory_compared_with_linear_nonlinear-feedback_and_nonlinear-element_electrical_engineering_circuit_theory.

Here is as good a place as any to state that due to a misunderstanding of electrical phenomenon by early scientists, what is normally called "negative" is actually positive, and vice-versa, that is, "positive" is negative. In this regard, negative earth is a source of electrons and other forms of electrical energy and has for practical purposes almost infinite capacity, and in a lightning strike the leader actually comes from the earth, and is then joined by one from the clouds as discussed and shown in The Feynman Lectures on Physics, Volume II, Chapter 9, entitled "Electricity and the Atmosphere." Accordingly, when studying an electrical diagram it can sometimes be helpful to reverse the way most people commonly think about the origin and/or conduction of electrical energy and power.

The forms of electrical energy which are generated by relatively extreme conditions of either high voltage and low current or low voltage and high current conditions can sometimes be communicated via a conductor with relatively little or no resistance at normal temperatures. For at least these reasons, and others discussed in the patent references and scientific papers which are recited or incorporated by reference herein, classical measurements and some so-called electrical laws and formulas may not accurately predict or describe electrical energy in circuits which are characterized by either of these two conditions, but real work can nevertheless be done.

Most vacuum or gas filled tubes use heated cathodes in order to provide electron emissions. However, cold cathode vacuum or gas filled tubes also exist, and they can have certain advantages over heated cathode vacuum tubes. For example, they do not need a battery or other power source to pre-heat the tubes and so there is no delay at start. They also consume less power for generating electron emission and produce less heat and so can provide a longer service life. Cold cathodes on vacuum tubes can include a coating, such as magnesium oxide. Once started, the emission of electrons from the coating can be self-sustaining provided a collector electrode of higher potential is present to attract the emitted electrons. Emission can be caused by exposure to ultraviolet light, or by bombarding the coating with electrons within the tube, or by excitation with a high frequency inductive coil and/or Tesla coil.

The following U.S. Patents disclose cold cathode vacuum tubes: U.S. Pat. No. 2,032,545, "Electron Tube," by H. B. McElrath; U.S. Pat. No. 2,943,225, "Cold Cathode Vacuum Tube Devices" by B. G. Firth et al. which discloses the use of a magnesium oxide coating; U.S. Pat. No. 2,184,910 "Cold Cathode Electron Discharge Tube, by Philo T. Farnsworth which discloses that its cathode can be excited by Tesla coil; U.S. Pat. No. 2,263,032, "Cold Cathode Electron Discharge Tube" by Farnsworth which discloses the use of Caesium and Barium; U.S. Pat. No. 2,590,863, "Cold Cathode Gas Tube Amplifier" by H. Jacobs, et al; U.S. Pat. No. 2,802,127, "Dynode Coating," and U.S. Pat. No. 2,842,706, "Cold Cathode Vacuum Tube," by D. Dobischek; and, U.S. Pat. No. 2,845,558, "Colt Cathode Vacuum Tube Means," by C. L. Stec. All of the aforementioned patents recited in his paragraph are hereby incorporated by reference herein. More information on prior art cold cathode tubes can be found on the following website: https://en.wikipedia.org/wiki/Cold_cathode.

Farnsworth was the inventor of television. He also designed many high power vacuum tubes and/or gas-filled tubes including photomultipliers, multipactors, IR imaging tubes, image storage tubes, and image amplifiers. Farnsworth described some of these tubes as self-oscillating and they used regenerative feedback and resonant reinforcement. Many of his tubes included metal components such as aluminum, barium, nickel, silver, tungsten, and coatings such as calcium, sodium, potassium, magnesium, and sometimes even soft radioactive materials such as nickel barium alloy, caesium, barium, strontium, and thorium as secondary emitters. In this regard, certain vacuum or gas filled tubes which include radioactive substances can be excited by high frequency voltage. For example, the magnetron used in many microwave ovens often contains a thoriated anode or cathode, and other vacuum or gas-filled electron tubes also exist that contain Pm-147, H-3, or Ni-63 which are low energy beta emitters. In this regard, thoriated tungsten has been used, e.g., in the following electron tubes: 01A, 3C24, 841, 4-65A, 10Y, 15E, 25T, 35T, 100TL and 801A.

The following patents of Farnsworth disclose vacuum or gas-filled tubes: U.S. Pat. Nos. 1,969,399, 2,071,515, 2,071,516, 2,071,517, 2,091,439 2,135,615, 2,139,813, 2,140,285, 2,140,832, 2,141,827, 2,141,837, 2,141,838, 2,143,262, 2,161,620, 2,172,152, 2,174,487, 2,179,996, 2,203,048, 2,204,479, 2,217,860, 2,260,613, 2,263,032, 2,274,194, 2,286,076, 2,311,981, and all of these patents are hereby incorporated by reference herein.

In U.S. Pat. No. 2,091,439 filed in 1936 Farnsworth describes tubes that are cold cathode devices and which operate over-unity and recited: "All that is necessary to set the tube into oscillation, is to energize the anodes, as there will be, in the space between the cathodes, a sufficient number of free electrons which are accelerated toward one or both of the cathodes by the potential of the anode, to strike thereon and cause the initiation of secondary emissions."

In U.S. Pat. No. 2,139,813, "Secondary Emission Electrode," Farnsworth discloses a multipactor vacuum tube that can operate cold cathode over unity, and because of its symmetrical electrode the tube can function with AC instead of DC.

In U.S. Pat. No. 2,140,832, "Means and Method of Controlling Electron Multipliers," Farnsworth indicates that the electrons do not reach the opposite surface before they get reversed, and this results in high output current. The oscillator power of this tube is indicated as 600 watts, and when used as an amplifier it could produce 1,000 watts.

In U.S. Pat. No. 2,143,262, "Means for Electron Multiplication," Farnsworth discloses that gain increases of between 100,000 to 1,000,000 are possible with a single multipactor. The disclosed tube was operated in an "interrupted" mode, that is, pulsed operation, and it was sensitive enough to self-oscillate or interrupt.

Some of Farnsworth's tubes included opposed curved cathodes, and they produced brilliant space suspended star-like "poissors" or plasmoids. Farnsworth was also able to achieve fusion in a vacuum tube, as disclosed in U.S. Pat. No. 3,258,402, "Electric Discharge Device For Producing Interactions Between Nuclei, and U.S. Pat. No. 3,386,883, "Method And Apparatus For Producing Nuclear-Fusion Reactions," but also see U.S. Pat. No. 3,530,497, "Apparatus For Generation Fusion Reactions" and U.S. Pat. No. 3,533,910, "Lithium Ion Source In Apparatus For Generating Fusion Reactions," by his former associate R. L. Hirsch, and all of these patents are hereby incorporated by reference herein.

In the 1950's, vacuum tubes were largely replaced by transistors for use in electronic devices, but in recent years NASA has developed a 460 GHz vacuum channel transistor which is faster than MOSFET transistors. Graphene transistors which are also much faster and powerful than conventional silicon transistors are also now being developed.

Farnsworth made some of the first television cameras, and some of his multipactor and other vacuum tubes were designed for this application. For many years, RCA made photomultiplier tubes which could magnify the current produced by incident light by as much as 100 million times, and made available a widely used RCA Photomultiplier Manual, published in 1970. Hamamatsu is now the world leader in the photomultiplier industry and has its own handbook entitled Photomultiplier Tubes Basics and Applications published in 2014 that is available to the public on its company website. In some applications, semiconductor devices, and in particular avalanche photodiodes, can be used as an alternative to photomultipliers, but the latter are well-suited for detecting visible light and other forms of electrical energy which is not substantially collimated. Modern bolometers which are most often used to detect heat, light, and electromagnetic radiation can detect photons and other ionizing particles, but also non-ionizing particles and they also do not need to be heated or cooled in order to function. As a result, bolometers do not consume much power during operation.

After studying the Feynman Lectures on physics and work of Tesla and Farnsworth, and conducting experiments in electrical engineering, the Applicant believes that he has discovered certain phenomenon, and also how to make a receiver and harvesting device that can use the naturally occurring energy of the earth and its atmosphere to provide useful electric power. The Feynman Lectures on Physics, Volume II, Chapter 9, entitled "Electricity and the Atmosphere," discloses that there is about 100 Volts of electrical potential for every three feet of elevation above level ground. As shown in drawing FIG. 1, which corresponds to FIG. 9.1 (a) therein, there is a potential of about 200 Volts at an elevation of six feet. However, because human beings and many other structures and things are electrical conductors, we do not normally sense this electrical potential because if we attempt to reach out and touch it, the earth and its atmosphere quickly adjust so as to maintain an equipotential or near neutral resting state.

The difference in electrical potential between the ionosphere which includes positively charged ions and the earth which is negative ground is associated with lightning, and on the average there are about 100 strikes around the world every second. This phenomenon results in Schumann Resonance. As previously discussed, contrary to popular belief, it is the negative and not the positive electrical side which is the leader in a lightning strike. The most powerful Schumann Resonance when taking a 30 second average over a period of 8 hours corresponds to a peak of approximately 7.83 Hz, and also other smaller peaks having less power at approximately 14 Hz, 20 Hz, 26 Hz, 33 Hz, 39 Hz, and 45 Hz.

An antenna which is raised above the ground surface can also cause one of equal length to effectively extend beneath the ground surface. As discussed in the Marine Corps' MCRP 8-10B.11, "Antenna Handbook," published in June, 1999 (henceforth MCRP), on page 2-19. "A quarter-wave antenna erected vertically, with its lower end connected electrically to the ground . . . behaves like a half-wave antenna." While not being limited to the following hypothesis, it is believed to be possible that the raising of an antenna above the ground and resulting upward shift of the local atmospheric gradient of electrical energy may also cause a corresponding upward shift of the local gradient of earth ground and electrical energy beneath an antenna.

When a monopole antenna is raised and placed in communication terrestrial earth ground the electrical potential measured as between the atmosphere and the top side or end of the antenna having its bottom side or end connected to ground is changed very little relative to the electrical potential which is normally maintained as between the atmosphere and ground, as shown in drawing FIG. 2. In this regard, the measured voltage is commonly then in the range of micro micro Volts or picovolts. However, when the same monopole antenna is subsequently disconnected from ground, the electrical potential gradient(s) in the atmosphere which increase in value by approximately 100 Volts every three feet, as previously shown and discussed in drawing FIG. 1, then return to their normal condition and level as if the antenna was not present, as shown in drawing FIG. 3.

When the resting terrestrial earth ground state of the antenna is switched on and off many times per second, then the local electrical potential and gradient(s) of the atmosphere relative to the terrestrial earth ground can be caused to move up and down or dance along the length of the antenna. This causes a movement of electrons and a change in the electric fields and/or magnetic fields within and/or near the antenna and this is associated with a wave or pulse of electrical energy having a measurable electrical current and voltage, and thereby provides a way in which to receive and harvest a portion of the naturally occurring electrical potential of the earth and its atmosphere for use in providing an abundant source of renewable energy. In this regard, one possible source of this energy is the aforementioned electrical potential which exists as between the earth and its atmosphere. Further, a related and more specific source of energy is the earth's Schumann Resonance peak of approximately 7.83 Hz, and other smaller peaks having less power at approximately 14 Hz, 20 Hz, 26 Hz, 33 Hz, 39 Hz, and 45 Hz. Another source of energy is the so-called negative ground which includes the earth and which for practical purposes has near infinite capacity, and in part, because the earth has a metallic core and electro-magnetic field. Telluric or earth currents also exist which vary in different locations around the world. Moreover, the earth and its atmosphere are being bombarded by solar wind and high energy radiation such as gamma rays which can cause and/or accelerate radioactive decay. It is also possible that the earth, solar system, Galaxy and Universe does contain what scientists in the late 19th and early 20th century and including Nikola Tesla referred to as ether. Today, so-called ether is discussed and generally falls under the subject of zero-point energy, e.g., see "Zero-Point Energy," Wikipedia. Feb. 5, 2023. https://en.wikipedia.org/wiki/Zero-point_energy, and also the paper "The Final Secret of Free Energy," by Thomas E. Bearden, 1993. https://archive.org/details/thomas-beaden-final-secret-of-free-energy-1993. In brief, there is no such thing as empty space. According to quantum field theory, there exists what some individuals have called a virtual photon flux characterized by a continuous fluctuation of matter fields and force fields. The late physicists Richard Feynman and John Wheeler calculated that the amount of energy contained in a very small portion of the zero-point vacuum exceeds by many orders of magnitude the amount of energy which is associated with nuclear fission or fusion, but no one has yet been able to theoretically solve the cosmological constant problem and explain how the energy present in the vacuum is canceled out. In recent years, the existence of gravity waves has been confirmed, but the exact relationship between electric fields, magnetic fields, photons, mass, energy, time, and gravity is not fully understood. The Applicant teaches a receiver and harvesting device which can tap into one or more of the aforementioned possible sources of energy and provide a source of electrical energy and power.

SUMMARY

A first aspect of the present disclosure relates to a device configured to receive and harvest electrical energy from the electrical potential associated with the earth and its atmosphere, the device including an antenna comprising a top end and a bottom end, the bottom end of the antenna being in electrical communication with a switch adapted to alternate between open and closed electrical communication with a terrestrial earth ground, at least the bottom end of the antenna, the switch, and the terrestrial earth ground being in electrical communication with an electrically conductive structure or wire, and at least the bottom end of the antenna, the switch, the electrically conductive structure or wire, and the terrestrial earth ground being substantially shielded and substantially isolated from ions in the atmosphere, the terrestrial earth ground being disposed beneath a surface of the earth and being in subsurface electrical communication with the electrically conductive structure or wire, and at least one of a resistor or load, a capacitor, and a battery configured to be in electrical communication with the electrically conductive structure or wire and disposed between the antenna and the terrestrial earth ground.

A second aspect of the present disclosure relates to a device configured to receive and harvest electrical energy from the electrical potential associated with the earth and its atmosphere, the device configured to receive electrical energy from an electrical potential derived from the earth and its atmosphere, the device comprising an antenna comprising a length between a top end and a bottom end, the top end being disposed at a first elevation, the bottom end being disposed at a second elevation, the first elevation being vertically higher than the second elevation; a terrestrial earth ground; a switch in electrical communication with the antenna and the terrestrial earth ground, the switch adapted to alternate between an open and a closed electrical connection with the antenna and the terrestrial earth ground many times per second, whereby the electrical potential is caused to change along the length of the antenna and also between the top end of the antenna and terrestrial earth ground corresponding with a frequency of the switch being manipulated between the open and the closed electrical connection resulting in the harvesting of a series of pulses of electrical energy, the antenna, the switch, and the terrestrial earth ground further comprising an electrically conductive structure or wire, whereby the antenna, the switch, and the terrestrial earth ground are configured to be in electrical communication with one another; the electrically conductive structure or wire being substantially shielded and substantially electrically isolated from ions present in the atmosphere substantially along the length of the antenna between the top end of the antenna disposed at the first elevation and the bottom end of the antenna disposed at the second elevation; the electrically conductive structure or wire also being substantially shielded and substantially electrically isolated between the bottom end of the antenna and the switch and including any connections of the electrically conductive structure or wire to the switch; the electrically conductive structure or wire also being substantially shielded and substantially electrically isolated from the atmosphere between the switch and the terrestrial earth ground until the electrically conductive structure or wire is disposed beneath a surface of the earth and is in subsurface electrical communication with the terrestrial earth ground; and at least one of a resistor or load, a capacitor, and a battery configured to be in electrical communication with the electrically conductive structure or wire and disposed between the antenna and the terrestrial earth ground.

Optionally, at least one of the top end of the antenna and the bottom end of the antenna is in electrical communication with a diode.

Optionally, at least one of the resistor, the load, the capacitor, and the battery are configured to be in electrical communication with the diode.

Optionally, the antenna further comprises a plurality of nanostructures or nanowires comprising points.

Optionally, the antenna is in electrical communication with a tuner.

Optionally, the switch comprises a variable speed control.

Optionally, the variable speed control is electronic.

Optionally, the antenna is in electrical communication with an amplifier.

Optionally, the antenna is in electrical communication with a transistor.

Optionally, the antenna further comprises at least one coil.

Optionally, the coil includes a primary coil and a secondary coil.

Optionally, the antenna is in electrical communication with a circuit.

Optionally, the circuit is configured to resonate.

Optionally, the antenna is in electrical communication with at least one electronic component, the at least one electronic component selected from the group of electronic components consisting of: an amplifier, a magnetic amplifier, a converter, a capacitor, a capacitor comprising an air capacitor, an electrolytic capacitor, a series of capacitors, a diode, a series of diodes, a Cockcroft-Walton generator, a coil, a coil comprising a conical shape, a coil comprising primary and secondary windings, a coil comprising a secondary winding comprising a length in the ratio of 1.61803/1 relative to the primary winding, a DC combiner, a DC multiplier, a demultiplexer, a filter, an inductor, an inverter, a Marx generator, a master control, a wireless master control, a modulator, an oscillator, an on and off master power switch, an on and off phantom power switch, a phase shifter, a phantom power supply, a power output controller, an AC power supply, a DC power supply, a rectifier, a bridge rectifier, a resistor or load, a spark gap, a variable speed control switch, a tap, a transistor, a graphene transistor, a transformer, a transmitter, a tuner, a vacuum tube, a series of vacuum tubes, and, a visual display, wherein said antenna is selected from the group consisting of: a monopole antenna, a dipole antenna, a loop antenna, a fractal antenna, an antenna comprising a golden rectangle, an antenna comprising a golden triangle, an antenna comprising a golden spiral, a fractal antenna comprising a Mandelbrot set, an antenna comprising a sphere on said top end, an antenna comprising a toroid on said top end, an antenna comprising a coil, an antenna comprising a tuner, an antenna comprising a tuner comprising a tap, an antenna comprising a tuner comprising an air capacitor, an antenna comprising at least one resistor and at least one capacitor in electrical communication, an antenna comprising a transmitter, and an antenna comprising a counterpoise.

Optionally, the antenna is in electrical communication with at least one of an electric motor in a transportation vehicle and an electric power grid.

Optionally, the switch comprises a switch selected from the group consisting of a mechanical switch, a relay, a fluid-mechanical mercury switch, an optical switch, a spark gap switch, an electronic circuit and timing chip switch, a transistor switch, a gas filled tube switch, a vacuum tube switch, and a hydrogen thyratron tube switch.

Optionally, the antenna comprises at least one of an ion generator, a magnetofluidynamic drive, and a humidifier or fogger.

Optionally, the least one of a resistor, a load, a capacitor, and a battery in electrical communication with said electrically conductive structure or wire being configured to be disposed between the bottom end of the antenna and the switch.

Optionally, the at least one of a resistor, a load, a capacitor, and a battery in electrical communication with said electrically conductive structure or wire being configured to be disposed between the switch and the terrestrial earth ground.

Optionally, the antenna further comprises at least one vertical structure, the at least one vertical structure selected from the group of vertical structures consisting of: a building, a fence post, a utility pole, a cell phone tower, a recharging station for electric vehicles, and a solar array.

A third aspect of the present disclosure is a method of producing electrical energy from the electrical potential derived from the earth and its atmosphere, the method comprising: providing an antenna comprising a top end comprising a plurality of nano structures or nanowires comprising points, and a length between the top end and a bottom end, wherein the top end is disposed at a first elevation and the bottom end is disposed at a second elevation, the first elevation being vertically higher than the second elevation; providing a terrestrial earth ground; providing a switch in electrical communication with the antenna and the terrestrial earth ground, providing an electrically conductive structure or wire, whereby the antenna, the switch, and the terrestrial earth ground are in electrical communication with one another; substantially shielding and substantially electrically isolating the electrically conductive structure or wire from ions present in the atmosphere substantially along the length of the antenna between the top end of the antenna disposed at the first elevation and the bottom end of the antenna disposed at the second elevation; shielding and substantially electrically isolating the electrically conductive structure or wire between the bottom end of the antenna and the switch and including any connections of the electrically conductive structure or wire to the switch; substantially shielding and substantially electrically isolating the electrically conductive structure or wire from the atmosphere between the switch and the terrestrial earth ground until the electrically conductive structure or wire is disposed beneath a surface of the earth and is in subsurface electrical communication with the terrestrial earth ground; providing at least one of a resistor or a load, a capacitor, and a battery also being in electrical communication with the electrically conductive structure or wire disposed between the antenna and the terrestrial earth ground; and alternating the switch between an open and a closed electrical connection between the antenna and the terrestrial earth ground many times per second such that the electrical potential is caused to change along the length of said antenna and also between the top end of the antenna and the terrestrial earth ground corresponding with a frequency of the switch being manipulated between the open and the closed electrical connection resulting in the harvesting of a series of pulses of electrical energy.

A fourth aspect of the present disclosure relates to a device configured to receive and harvest electrical energy from the electrical potential associated with the earth and its atmosphere, the device configured to receive electrical energy from an electrical potential derived from the earth and its atmosphere, the device comprising an antenna comprising a length between a top end and a bottom end, the top end being disposed at a first elevation, the bottom end being disposed at a second elevation, the first elevation being vertically higher than the second elevation; a terrestrial earth ground; a switch in electrical communication with the antenna and the terrestrial earth ground, the switch adapted to alternate between an open and a closed electrical connection with the antenna and the terrestrial earth ground many times per second, whereby the electrical potential is caused to change along the length of the antenna and also between the top end of the antenna and terrestrial earth ground corresponding with a frequency of the switch being manipulated between the open and the closed electrical connection resulting in the harvesting of a series of pulses of electrical energy, the antenna, the switch, and the terrestrial earth ground further comprising an electrically conductive structure, whereby the antenna, the switch, and the terrestrial earth ground are configured to be in electrical communication with one another; the electrically conductive structure being substantially shielded and substantially electrically isolated from ions present in the atmosphere substantially along the length of the antenna between the top end of the antenna disposed at the first elevation and the bottom end of the antenna disposed at the second elevation; the electrically conductive structure also being substantially shielded and substantially electrically isolated between the bottom end of the antenna and the switch and including any connections of the electrically conductive structure to the switch; the electrically conductive structure also being substantially shielded and substantially electrically isolated from the atmosphere between the switch and the terrestrial earth ground until the electrically conductive structure is disposed beneath a surface of the earth and is in subsurface electrical communication with the terrestrial earth ground; at least one of a resistor or load, a capacitor, and a battery configured to be in electrical communication with the electrically conductive structure and disposed between the antenna and the terrestrial earth ground; the antenna comprising an antenna comprising a vertical portion disposed between the first elevation and the second elevation and also a transverse portion comprising a wire which is disposed above the second elevation and the terrestrial earth ground.

Optionally, the wire comprises a barbed wire comprising a plurality of points.

Optionally, the antenna comprises at least one of a dipole antenna or a loop antenna.

A fifth aspect of the present disclosure relates to a device configured to receive electrical energy from the electrical potential associated with the earth and its atmosphere, the device including an antenna including a coil between a top end of the antenna and a bottom end of the antenna, the coil including at least one of a tap tuner and an air capacitor tuner, the top end of the antenna including a fractal configuration including at least one of a toroid, a golden square, a golden triangle, and a golden spiral, the bottom end of the antenna in electrical communication with a grounding switch, the grounding switch including at least one of a mechanical switch, a relay, a fluid-mechanical mercury switch, an optical switch, a spark gap switch, an electronic circuit and switch, a 555 or 955 integrated circuit timing switch, a transistor switch, a gas filled tube switch, a vacuum tube switch, and a hydrogen thyratron tube switch, wherein the grounding switch is adapted to alternate between an open and closed connection to a terrestrial earth ground, the grounding switch comprising a variable speed control, wherein the variable speed control is adapted to control the rate at which the grounding switch is opened and closed in electrical communication to the terrestrial earth ground, at least one diode in electrical communication with at least one of the bottom end of the antenna and the top end of the antenna, at least one amplifier in electrical communication with the at least one diode, the at least one of an amplifier or an electrical voltage and current modulation device comprising at least one of a gas filled tube amplifier, a vacuum tube amplifier, cold cathode tube amplifier, a Farnsworth multipactor tube amplifier, a photomultiplier tube amplifier, a bolometer amplifier, a coil, a Tesla coil, a resonating circuit, a rectifier, an inverter, a converter, a transformer, at least one electrically conductive structure or wire for placing the aforementioned structures and components in electrical communication with one another and with at least one of a resistor or load, a capacitor, a battery, an electric vehicle, and an electric power grid.

BRIEF DESCRIPTION OF THE DRAWINGS

Drawing

Drawing

Drawing FIG. 2 is subsequently disconnected from ground by a switch open to terrestrial earth ground the electrical gradients in the atmosphere which correspond to approximately 100 Volts every three feet shift downwards and then return to their original resting condition.

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

Drawing

DETAILED DESCRIPTION

Although the present invention has been described with reference to preferred embodiments, workers skilled in the art will recognize that changes may be made in form and detail without departing from the spirit and scope of the invention.

Figure 1:
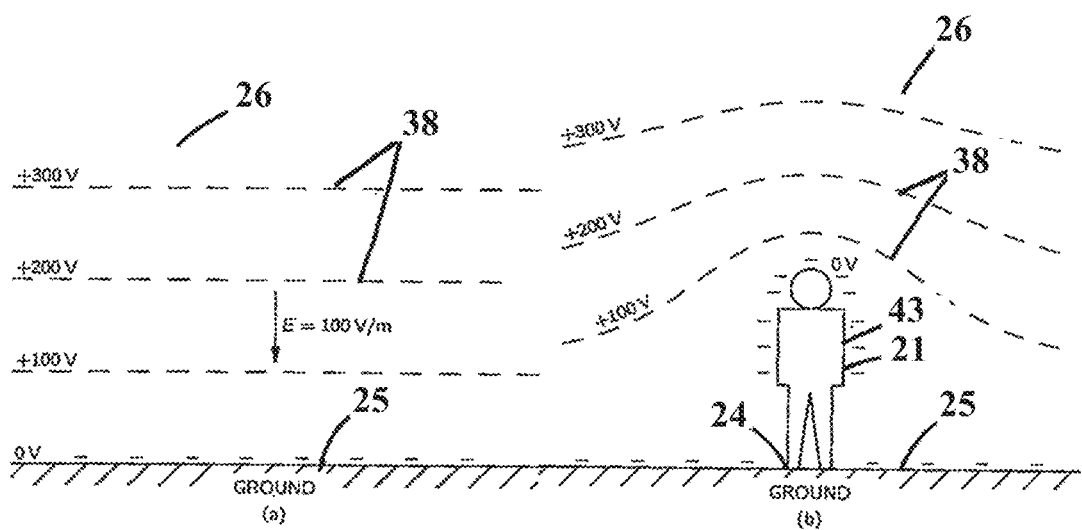
FIG. 1, is a reproduction of FIG. 9.1 (a) in The Feynman Lectures on Physics, Volume II, Chapter 9, entitled "Electricity and the Atmosphere," but with the addition of numerals for reference purposes which shows there are gradients of about 100 Volts of electrical potential for every three feet of elevation above level ground on the earth.
Figure 9:
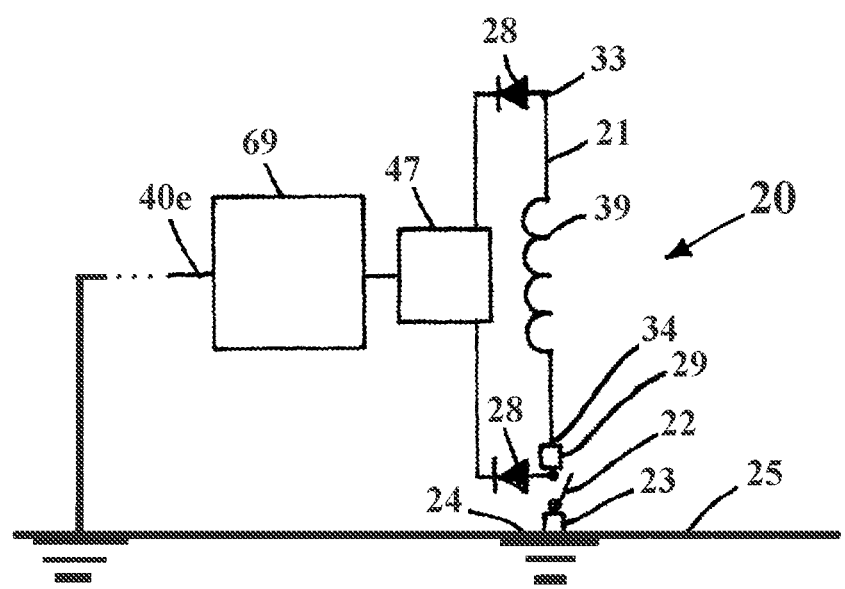
FIG. 9, shows a device for receiving and harvesting energy including a DC combiner in order to combine the DC pulse output of two circuits and create a single DC current output.

Drawing FIG. 1 is a reproduction of FIG. 9.1 (a) in The Feynman Lectures on Physics, Volume II, Chapter 9, entitled "Electricity and the Atmosphere," but with the addition of numerals for reference purposes which shows on the left side of the drawing figure that there exists a gradient 38 of about 100 Volts of electrical potential for every three feet of elevation above the level surface of the earth 25 at low elevations. Drawing FIG. 1 also shows on the right side of the drawing figure that this gradient 38 is caused to move upwards when a human being or other electrically conductive object extends vertically and is in electrical communication with the terrestrial earth 25 and ground 24.

Figure 2:
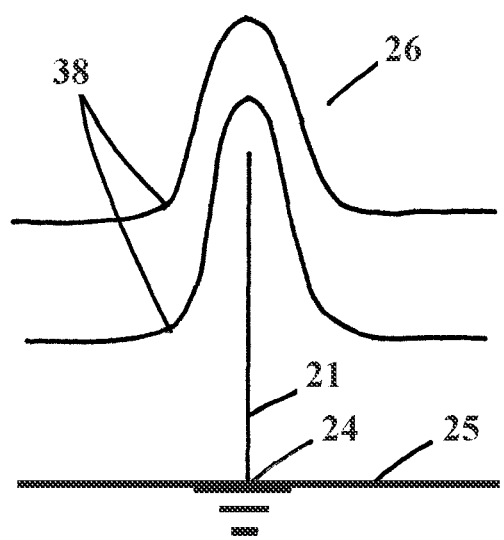
FIG. 2 shows that when a vertical monopole antenna or other conductive object is grounded to terrestrial earth the gradients of electrical potential and their corresponding voltages in the atmosphere are then shifted upwards.

Drawing FIG. 2 shows that when a vertical monopole antenna 21 or other electrically conductive object is in a fixed or permanent position and in communication with terrestrial earth 25 ground 24, the gradients 38 of electrical potential in the atmosphere 26 are then shifted upwards. In this regard, the resulting electrical potential and voltage that could be measured as between the top end 33 of the antenna 21 having a bottom side or end 34 in communication with the terrestrial earth 25 ground 24 then changes very little relative to the state normally maintained between the atmosphere 26 and terrestrial earth 25 ground 24 shown on the left side in drawing FIG. 1.

Figure 3:
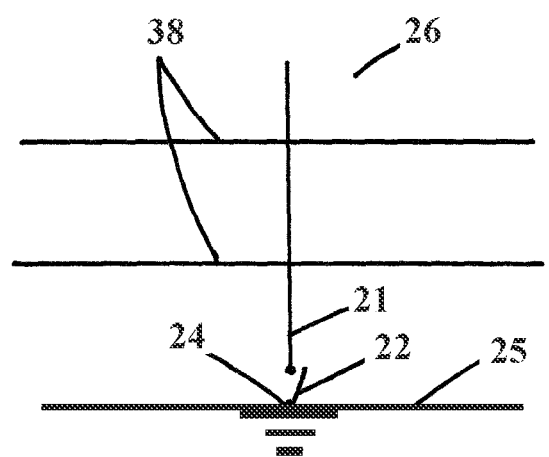
FIG. 3 shows that when the same monopole antenna shown in drawing

Drawing FIG. 3 shows that when a similar monopole antenna 21 or other electrically conductive object is subsequently disconnected from the terrestrial earth 25 ground 24 with the use of a switch 22, the electrical gradients 38 in the atmosphere 26 which correspond to approximately 100 Volts every three feet will then shift downwards and return to their approximately normal original condition and state as if the antenna 21 was not present.

Current Models of Electrical Energy

An ion is commonly defined as an atom or molecule having a net electrical charge. A cation is a positively charged ion with fewer electrons than protons, whereas an anion is a negatively charged ion having more electrons than protons. Many of us were taught in grade school and later in high school to imagine that electricity flows in wires or other electrical conductors much like how water flows in water pipes. In this regard, we were taught that electrons or anions which have a negative charge and protons or cations which have a positive charge can flow like water and then carry electrical energy from a starting point A to a destination point B. Further, we may have also been shown a model which suggested that electrons behave like solid marbles when packed closely together inside a hollow tube, that is, if one electron or marble is pushed then the others are also pushed and moved along in a row. These models which are sometimes used for visualization purposes can be convenient, but like Ohm's Law V (voltage)=I (current) times R (resistance) they are associated with a simplified lumped element model with regards to the phenomenon known as electricity. In this specification, this simple model which focuses on the movement of particles or electrons will henceforth be referred to as the traditional model of electricity. The traditional model will also be discussed later in the specification with reference to the electronic switch devices that are shown in drawing FIGS. 31-32.

In reality, electrons move very slowly in a metal conductor such as copper wire and it is rather the electric fields and magnetic fields which quickly change and carry most of the electrical energy. For example, in the video entitled: "The Speed of Electricity—RSD Academy" by Mr. Bob Duhamel which can be found on Youtube: https://youtu.be/ImaHK9eVSDE, explains that in $\frac{1}{1,000}$ of an inch length which approximately equals 25 microns of a 16 gauge wire which is about 2 mm thick there are about $6.24 \times 10^{18}$ free electrons which is unit of measure called 1 Coulomb, and 1 amp of electric power=1 Coulomb per second. He then shows and discusses that it would take about 16 minutes for the described electrons to move 1 inch or about 2.54 centimeters in that 16 gauge wire. In the video entitled "Speed of Electrons—What's a Resistor," by ElectroBoom made by Mehdi Sadandar which can be found on Youtube: https://youtu.be/IOb3-JZPY0Y, he calculates that electrons move at only about 0.23 mm per second in a 22 gauge wire. Again, it is actually the electric fields and magnetic fields which carry most of the electrical energy in and/or around a wire or other conductor of electricity. The following videos which can be found on Youtube show and discuss how electric fields and magnetic fields typically communicate electrical energy: "The Big Misconception About Electricity," By Veritasium made by Dr. Derek Muller can be found at: https://youtu.be/bHIhgxav9LY; and, "How Electricity Really Works," also by Veritasium can be found at: https://youtu.be/oI_X2cMHNe0, and in particular, see the model and visual aid representations shown between 13:30 and 15:30 minutes. This model suggests that we can imagine electricity being conducted in part by a movement of particles which could include ions, cations, anions, electrons, protons, but also by a wave, pulse, or sudden change in the associated electric field and magnetic field which has the ability to move at or near the speed of light and then communicate and provide electrical energy. This model of electricity which focuses more upon the role of electric fields and magnetic fields will henceforth be referred to in this specification as the modern model of electricity, and it will be discussed later with reference to the electronic switch devices shown in drawing FIGS. 43-44. Further, the humorous and also informative video entitled "How Right IS Veritasium?! Don't Electrons Push Each Other??", by ElectroBoom made by Mehdi Sadandar can be found at: https://youtu.be/O-WCZ8PkrK0, and "Magic of Magnetism & Inductors," also by ElectroBoom can be found at: https://youtu.be/ySx84Ca7BFQ. Accordingly, the possible use of the words change, communication, flow, movement, and pulse or wave in this specification with regards to certain phenomenon associated with ions, cations, anions, electrons, protons, electric fields, magnetic fields and electrical energy should not be construed, understood, or limited to the traditional model of electricity that many of us were taught in grade school, high school, and perhaps even in college. Further, because of the difficulty of possibly showing the actual movement of electrons and changes in electric fields and magnetic fields which is possible in a laboratory setting, the focus of the present claims is on the collection and harvesting of electrical energy which can be measured by electronic devices such as voltmeters and oscilloscopes.

Figure 4:
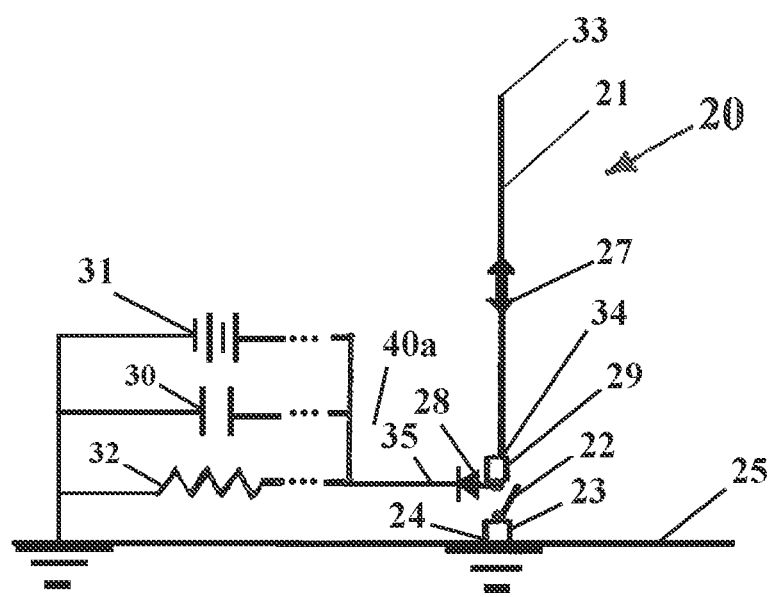
FIG. 4 shows a device for receiving and harvesting energy from the terrestrial earth and it atmosphere including an antenna which can alternatively be placed in closed or open communication by a switch to terrestrial earth ground, but also a diode in a circuit.

Drawing FIG. 4 shows an electrical energy receiver and harvesting device 20 including an antenna 21 having a top side or end 33 and a bottom side or end 34. In this regard, the following terms, i.e., receiver device, harvesting device, receiver and harvesting device, and the word device will be used to make reference to the electrical energy receiver and harvesting device which is disclosed in the specification and claims. The bottom end 34 is connected to a diode 28 which acts as a one-way door in circuit 40*a* and then prevents electrical energy 27 from going back into the antenna 21. In this patent application, the word circuit can indicate a closed circuit or loop including a path to a ground, an open circuit which does not include a complete loop or path to a ground, and a circuit which can alternate between providing an open and closed path to a ground. It is known that Nikola Tesla showed that a light bulb could be illuminated by a single wire with terrestrial earth ground serving as the return path to provide the loop in a circuit. In this regard, some of the drawing figures show and the corresponding portions of the specification discuss circuits that include a complete loop and which are or can be made to be open or closed and include a path to a ground through an electrical component, such as a capacitor, resistor, diode, or transistor, other electrical device or load, and this path may be to an internal ground within the electrical device, and/or to an external terrestrial 25 earth ground 24. The use of the following three dot symbol ( . . . ) in some of the drawing figures signifies an omission and/or the possible continuation of a circuit, and/or the possibility of combinations with electrical devices or loads which are not shown in the view of those drawing figures, and which may be internally grounded and/or be externally grounded to terrestrial earth 25 ground 24. In this regard, the primary focus in some of the drawing figures is on a key portion of a circuit or device which is shown and discussed in the specification, but this should not be construed or misunderstood as being a limitation of the present invention. The bottom end 34 of the antenna 21 is in electrical communication with a switch 22 that can repeatedly open and close the antenna's 21 connection to a terrestrial earth 25 ground 24. In this regard, the switch 22 can be mechanical and possibly include brushes or contacts, or can be a fluid-mechanical switch such as a mercury switch, or can be a preset or adjustable spark gap switch, or can be a switch which includes and uses optical sensors, hall effect sensors, magnetic sensors, or other electronic sensors, or can be a switch which includes a switching transistor and related integrated circuit, and/or be a switch which includes an integrated circuit which includes a timing chip such as a 555 or 955 timer, and/or be a switch which includes a relay. Further, a vacuum tube such as a Western Electric 1B22 tube can be used as a switch, and/or to make a switching circuit. For example, hydrogen thyratron tubes such as 3C45, 4C35, 5C22 can be used as switches and are able to operate in micro or nanoseconds. Also shown in FIG. 4 is an adaptable control switch 22 which can be manipulated as desired and includes a variable speed control 23 for selectively changing and/or tuning the speed and/or dwell and contact time, and associated working or duty cycle of the switch 22. The switch 22 can be used to cause the terrestrial earth 25 ground 24 connection of the antenna 21 to be controlled as desired or electrically engineered, and then be opened and closed hundreds, thousands, tens of thousands, hundreds of thousands, and even millions of times per second. In this regard, an electrically conductive structure, e.g., a wire 35, can be in contact with the bottom end 34 of the antenna 21, and the electrically conductive structure and/or wire 35 can also be substantially shielded and substantially electrically isolated with the use of plastic insulation and/or be encapsulated by an electrically non-conductive material so as to be substantially electrically isolated from the atmosphere using, e.g., potting compounds, glob tops, and molding encapsulates which can be made of acrylic, elastomers, compounds, epoxy, polyurethanes, polyesters, polyamides, silicones, resins, rubber, thermosets, thermoplastics, and some of the aforementioned materials can be cured using room temperature vulcanization, or visible and/or ultraviolet light. ASTM F641 provides a standard specification concerning implantable epoxy electronic encapsulants. Companies which can provide such materials and/or services include 3M, Henkel Adhesives, Geospace, Loctite, the Lord Corporation, Panacol, and the Robert McKeowne Company, Inc. Further, the contact points of the electrically conductive structure and/or wire 35 with the antenna 21 and the switch 22 can be likewise substantially electrically isolated from the atmosphere. In addition, the switch 22 and the electrically conductive structure and/or wire 35 which extends between the switch 22 and terrestrial earth 25 ground 24 can also be likewise substantially electrically isolated from the atmosphere so that the electrically conductive structure and/or wire 35 can be disposed beneath the surface of the earth and then in subsurface contact and electrical communication with terrestrial earth 25 ground 24. The terrestrial earth 25 ground 24 can include an electrically conductive metal structure such as grounding rod, a counterpoise, earth, carbon, and water, in partial or complete combination. It can be readily understood that the aforementioned structures and electrically insulated configuration and means can be used to connect and ground the receiver and harvesting devices 20, antennas 21, switches 22, and terrestrial earth 25 ground 24 shown in drawing FIGS. 4-5, 8-11, 14-17, 20-23, 30-32, 34-35, 38-44, and 48.

Figure 17:
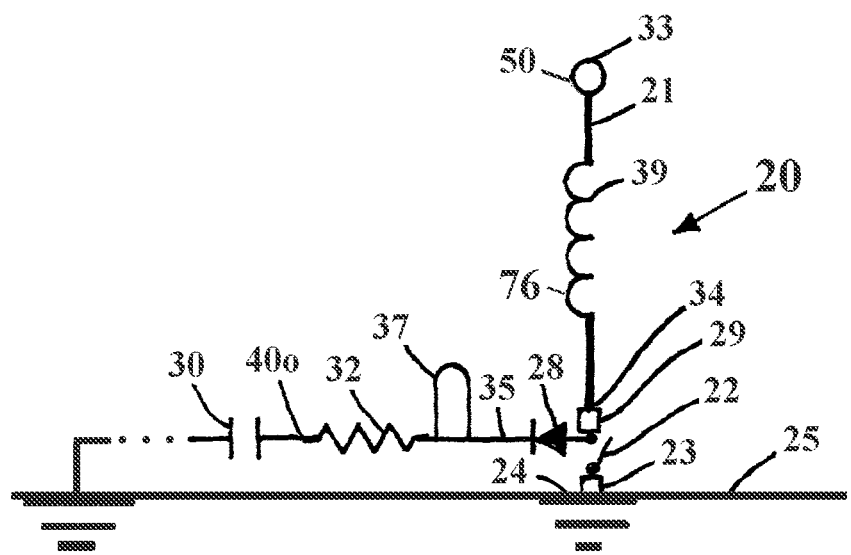
FIG. 17 shows a device for receiving and harvesting energy including an antenna including a primary coil in communication with a switch for opening and closing its conductive path to terrestrial earth ground and an amplifier.

In this regard, the frequency at which the antenna 21 is being placed in opened or closed communication to terrestrial earth 25 ground 24 by a switch 22 can possibly be selected as the driving frequency and the antenna length could then be tuned to that frequency, e.g., it could be the length of a half wave, or quarter wave, or other smaller fraction thereof. An electronic or other tuning device 29 can be used with an antenna 21 and/or an antenna 21 and coil 39 combination in order to tune the antenna 21 and/or an antenna 21 and coil 39 combination in relation to a circuit 40a and device, as shown in drawing FIG. 4. As shown in FIG. 17, the attachment point of the antenna 2 in relation to a circuit 40o, and/or a tap tuner 76 which can be moved up and down on the length of the antenna 21 and/or a coil 39 can be used in order to make a desired or required tuning adjustment. For this purpose, a capacitor such as an air capacitor 77 can also and/or alternatively be used. As shown in drawing FIG. 15, the output of a coil or inductor 39 which is in electrical communication with the antenna 21 can also be tuned or otherwise manipulated with a magnetic amplifier 75 to create a tuned and/or resonant antenna and circuit. It is also possible to target and tune the antenna 21 to Schumann Resonance(s) or other naturally occurring frequencies, and then select the frequency of the switching of the antenna 21 on and off to terrestrial earth 25 ground 24 and the related dwell, working time, and/or duty cycle to maximize reception and/or the harvesting of energy. Further, it is also possible to frequency hop and target multiple peaks and then combine and sum the energy from multiple Schumann Resonances, or other naturally occurring frequencies of electromagnetic energy.

When the receiver and harvesting device 20 including the antenna 21 shown in drawing FIG. 4 is grounded to terrestrial earth 25 ground 24 the local gradient of voltage in the atmosphere will be elevated relative to a normal state when no antenna 21 exists, or when the antenna 21 is not electrically connected to terrestrial earth 25 ground 24. However, when the receiver and harvesting device 20 including the antenna 21 is suddenly disconnected from ground 24 the elevated electrical local gradient of voltage in the atmosphere will move downwards and this will cause a positive charge, ions, an electric field, a magnetic field, a wave, a pulse, and/or other form of DC electrical energy to flow, move, change or otherwise be communicated towards the bottom end 34 of the antenna 21. This electrical energy which can include voltage, current, an electric field, a magnetic field, a wave, a pulse or other form of electrical energy can then pass through a diode 28 in circuit 40a which acts as a one-way door and prevents the electrical energy from being returned to the antenna 21. The diode 28 can be connected by wires 35 or other conductors 72 to a capacitor 30 or battery 31 for storage of electrical energy, and/or to a resistor 22 or other electrical device which provides a load. In this regard, it can be readily understood by a person of ordinary skill in the art that the electronic symbol which is typically used to represent a resistor 32 can also be used to indicate the presence of a load. Further, a resistor 32 having a desired value can also be included and used between the diode 28, and at least one of a capacitor 30, a battery 21, and a resistor 32 or other electrical device which can provide a load, and it is here recognized that even a wire 35 can have some resistance.

When the switch 22 is subsequently closed and the receiver and harvesting device 20 including the antenna 21 is once again placed in communication with terrestrial earth 25 ground 34, the atmospheric electrical gradient will once again shift upwards and this will cause electrical energy 27 associated with the antenna 21 to flow, move or otherwise change and create a DC pulse or wave which can include ions, electrons, an electric field, a magnetic field, voltage, current, and/or other electric energy 27 to move towards or otherwise be communicated to the top end 33 of the antenna 21. The DC pulse will then be reflected off of the top end 33 and will move towards the bottom end 34 of the antenna 21. This can possibly cause the antenna 21 to resonate at the frequency associated with its design structure and length, and insofar as this takes place energy will be dampened and turned into heat, but also be transmitted into the atmosphere and then be lost for possible use as a local source of electric energy and power. The frequency of the antenna 21 can be selectively changed and/or tuned as desired with the use of other antenna structures which can possibly include the use of a coil 39 or other inductor 59, and/or the use of an electronic or other antenna frequency tuning device 29, such as a movable tap tuner 76, or an air capacitor 77. Relevant information on prior art antenna tuners can be found on the following web site: https://en.wikipedia.org/wiki/Antenna_tuner.

When the desire and intention is the transmission of radio waves or other frequencies of electromagnetic radiation, the antenna 21 can be resonant at the frequency at which the source of energy is alternating, and a usable signal for radio communication can be as small as a few hundred microvolts. A vertical half-wave or quarter-wave antenna can provide omnidirectional communications, and a resonant antenna will effectively radiate a radio signal for frequencies close to its design frequency. Resonance can be achieved by physically matching the length of the antenna to the wave and/or electronically matching the length of the antenna to the wave. In this regard, maximum electrical energy is communicated and/or current flows more readily when the impedance is minimized. When the antenna is resonated so that its impedance is pure resistance, that is, when capacitive reactance is made equal to inductive reactance, they cancel each other, and impedance equals pure resistance. Further, in order to improve the ground connection of an antenna, a counterpoise can be used. In this regard, it is known to use six or more conductive lines or segments radiating out from a vertical antenna for the purpose of enhancing its ground connection when a good subsurface connection is not available or adequate for the desired or required task. In general, the length of wires or conductive elements that are used to create a counterpoise should be at least equal to or larger than the size of the antenna.

However, when the desire and intention is for the electrical energy 27 which is obtained and harvested by an receiver and harvesting device 20 to provide a source of electrical energy 27 for storage and/or use with a resistor 32 or other electrical devices which can provide a load, then the antenna 21 can be hard wired or otherwise be wirelessly placed in electrical communication with a circuit 40a including means for receiving and storing electrical energy 27 such as a capacitor 30 or battery 31, and/or be connected to a resistor 32 or other electrical device which provides a load which requires a source of electric power. As shown in drawing FIG. 4, the capacitor 30, battery 31, and/or resistor 32 or load can be in communication with a ground 24, and in particular, terrestrial earth 25 ground 24. In this regard, the electrical energy 27 can possibly include, e.g., electrons, an electric field, a magnetic field, voltage, current, and/or an electrical wave or pulse.

When the connection of a receiver and harvesting device 20 including an antenna 21 to terrestrial earth 25 ground 24 is opened and closed many times per second, the result will be the generation of a series of DC pulses or waves caused by the movement of electrons and changes in the electric field and/or magnetic field, and electrical energy 27 can then flow or otherwise be communicated and collected from the bottom end 34 of the antenna 21 and then be prevented from returning by the diode 28 in circuit 40a. The electrical energy 27 can then be harvested and stored in a capacitor 30, a battery 31, and/or a resistor 32 or other electrical device which can provide a load and requires electrical energy. A resistor 32 having a desired value can be included and possibly be used between the diode 28 and capacitor 30 in circuit 40a, and it is here recognized that a wire 35 can provide some electrical resistance. The size and value of a selected capacitor 30 for possible use in circuit 40a can be small or large and even resemble those used in a Van de Graaff generator as disclosed in U.S. Pat. Nos. 1,991,236 and 2,922,905 by R. J. Van de Graaff, and these patents are hereby incorporated by reference herein. The output of pulsed DC electrical energy 27 as shown on an Oscilloscope 68 can possibly resemble the image shown in drawing FIG. 6, and in particular, see the image provided in drawing FIG. 33. As discussed above, it can be readily understood that a capacitor 30, a battery 31, and a resistor 32 or other electrical device or load can include an electrical connection to a ground 24 in an electrical device, and/or to a terrestrial earth 25 ground 24.

Figure 5:
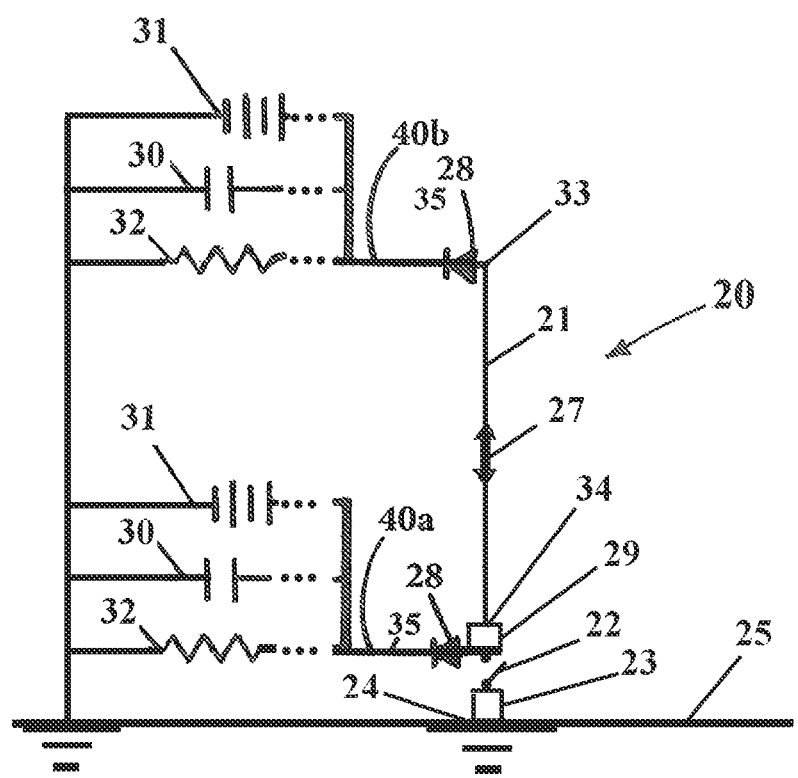
FIG. 5 shows a device for receiving and harvesting energy including an antenna which can alternatively be placed in communication with an open or closed switch to terrestrial earth ground, but also two diodes in two circuits.

Drawing FIG. 5 shows an alternative receiver and harvesting device 20 including an antenna 21 generally similar to the one shown in FIG. 4 having a top end 33 and a bottom end 34. Accordingly, for the sake of brevity some of the previous discussion concerning the various structures, methods, and techniques which can be used with a receiver and harvesting device 20 including an antenna 21 shown and/or discussed in connection with FIG. 4 will not be repeated here. As shown in FIG. 5, the bottom end 34 of the antenna 21 is connected to a diode 28 which acts as a one-way door in a circuit 40a and then prevents electrical energy 27 from flowing or otherwise being communicated back into the antenna 21. Further, the bottom end 34 of the antenna 21 is in electrical communication with a switch 22 that can repeatedly open and close the antenna's 21 connection to terrestrial earth 25 ground 24. As also shown in FIG. 5, the top end 33 of the antenna 21 is also further connected to a diode 28 which acts as a one-way door in a circuit 40b and then prevents electrical energy 27 from flowing or otherwise being communicated back into the antenna 21.

When the receiver and harvesting device 20 including an antenna 21 shown in FIG. 5 is grounded the gradient of voltage in the atmosphere will be elevated relative to a normal state when there is no antenna 21 present and/or the antenna 21 is not connected to terrestrial earth 25 ground 24. However, when the receiver and harvesting device 20 and antenna 21 is suddenly disconnected from ground 24 the elevated electrical gradient in the atmosphere will move downwards and this will cause electrical energy 27 associated with the antenna 21 to flow, move, or change and create a DC pulse or wave of electrical energy 27 which will move towards the bottom 34 of the antenna 21. This electric energy 27 can then flow or otherwise pass through the diode 28 in circuit 40a that will prevent it from being returned to the antenna 21. In this regard, the diode 28 in circuit 40a can be connected by wires 35 or other conductors 72 to a capacitor 30 or battery 31 for storage, and/or to a resistor 32 or other electrical device which provides a load. Further, a resistor 32 having a desired value can be included and possibly be used between the diode 28 and at least one of a capacitor 30, a battery 31, a resistor 32 or other electrical device which provides a load, and it is here recognized that a wire 35 has some resistance.

When the switch 22 is subsequently closed and the receiver and harvesting device 20 and antenna 21 is once again in communication with terrestrial earth 25 ground 34, the atmospheric electrical gradient will once again move upwards and this will cause electrical energy 27 within or associated with the antenna 21 to flow, move, or change and create a DC pulse of electric energy 27 to move towards the top end 33 of the antenna 21. This electrical energy 27 can then flow through and be prevented from returning to the antenna 21 by diode 28 in circuit 40b. The output of pulsed DC current in circuit 40b as shown on an Oscilloscope 68 could then possibly resemble the images shown in drawing FIGS. 6 and 7, depending on the wiring of the probes and settings of the instrument, and in particular, see the image provided in FIG. 33. The diode 28 in circuit 40b can be connected by wires 35 or other conductors 72 to a capacitor 30 or a battery 31 for storage, and/or to a resistor 32 or other electrical device which can provide a load. Once again, a resistor 32 having a desired value can be further included and possibly be used between the diode 28 and at least one of a capacitor 30, a battery 31, and a resistor 32 or electrical device which can provide a load.

When the connection of a receiver and harvesting device 20 and antenna 2 to terrestrial earth 25 ground 24 is being opened and closed many times per second, the result will be the generation of a series of DC waves or pulses of electrical energy 27 which can be conducted from both the bottom end 34 of the antenna 21 and also the top end 33 of the antenna 21 and then be prevented from returning by the diodes 28 in circuits 40a and 40b, and the provided electrical energy 27 can then possibly be stored in a capacitor 30 or a battery 31, or be used to provide energy to a resistor 22 or other electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 5, the capacitor 30, battery 31, and/or resistor 32 or load can be in communication with a ground 24, and in particular, terrestrial earth 25 ground 24.

Drawing FIGS. 4 and 5 both show an antenna 21 in communication with an on and off switch 22, the speed and contact dwell and/or duty cycle of which can be manually or electronically tuned and/or controlled by a variable potentiometer or other speed control 23. The antenna 21 can then be alternatively placed in open and closed communication with terrestrial earth 25 ground 24. When a receiver and harvesting device 20 including an antenna 21 is switched on and off in connection with terrestrial earth 25 ground 24, the electrical gradients 38 as between the earth 25 and its atmosphere 26 will then alternate between and resemble the different states which are illustrated and shown in drawing FIGS. 2 and 3. In this regard, when the receiver and harvesting device 20 and antenna 21 is switched on and off from communication with terrestrial earth 25 ground 24, the gradients 38 of electrical potential present in the atmosphere 26 can be caused to rapidly move up and down along the length of the antenna 21. This causes a local change of electrical potential and a pulse or wave which can be associated with the movement of electrons, and changes in the electric field, magnetic field, voltage, current, and the resulting electrical energy 27 which is represented using a double headed arrow in drawing FIGS. 4 and 5 can then be caused to move up and down along the antenna 21

Figure 6:
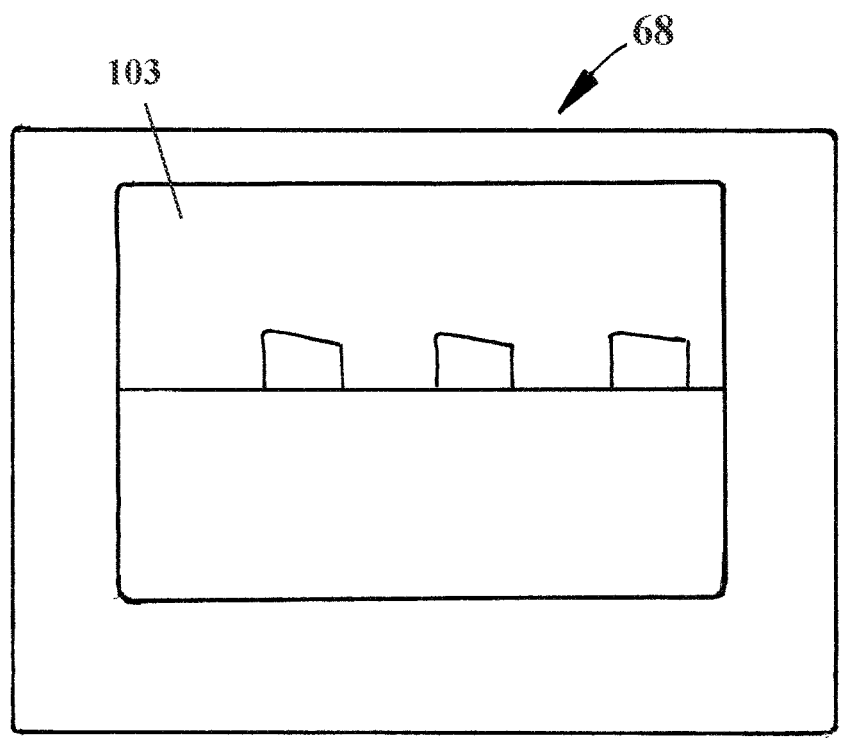
FIG. 6, shows a representation of a wave or pulse generated by the antenna, switch, terrestrial earth ground, diode, and circuit configuration 40a shown in drawing FIG. 4 which can appear on an Oscilloscope device.
Figure 7:
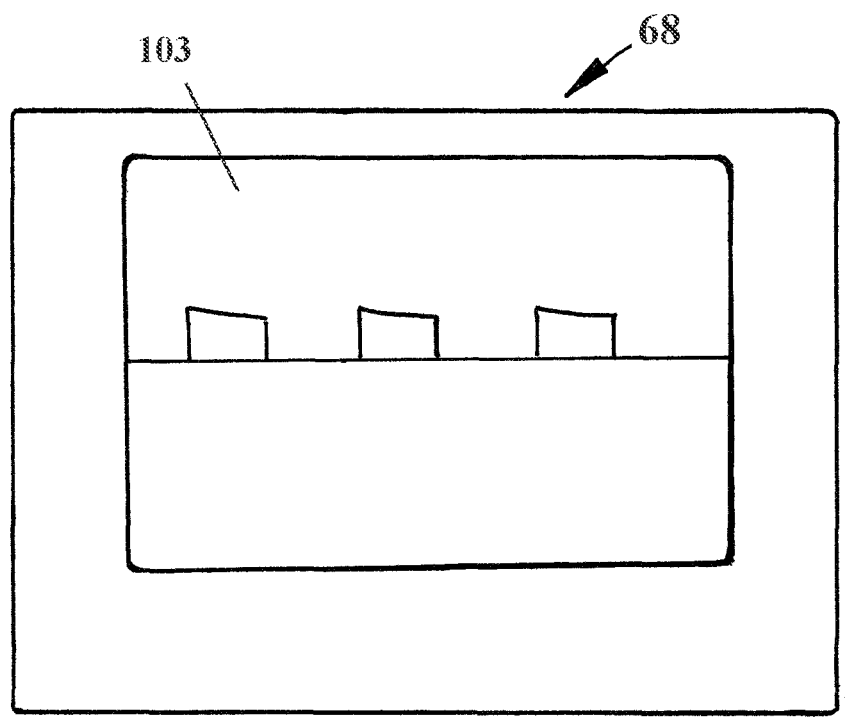
FIG. 7, shows a representation of the wave or pulse generated by the antenna, switch, terrestrial earth ground, diode, and circuit configuration 40b shown in drawing FIG. 5 which can appear on an Oscilloscope device.
Figure 33:
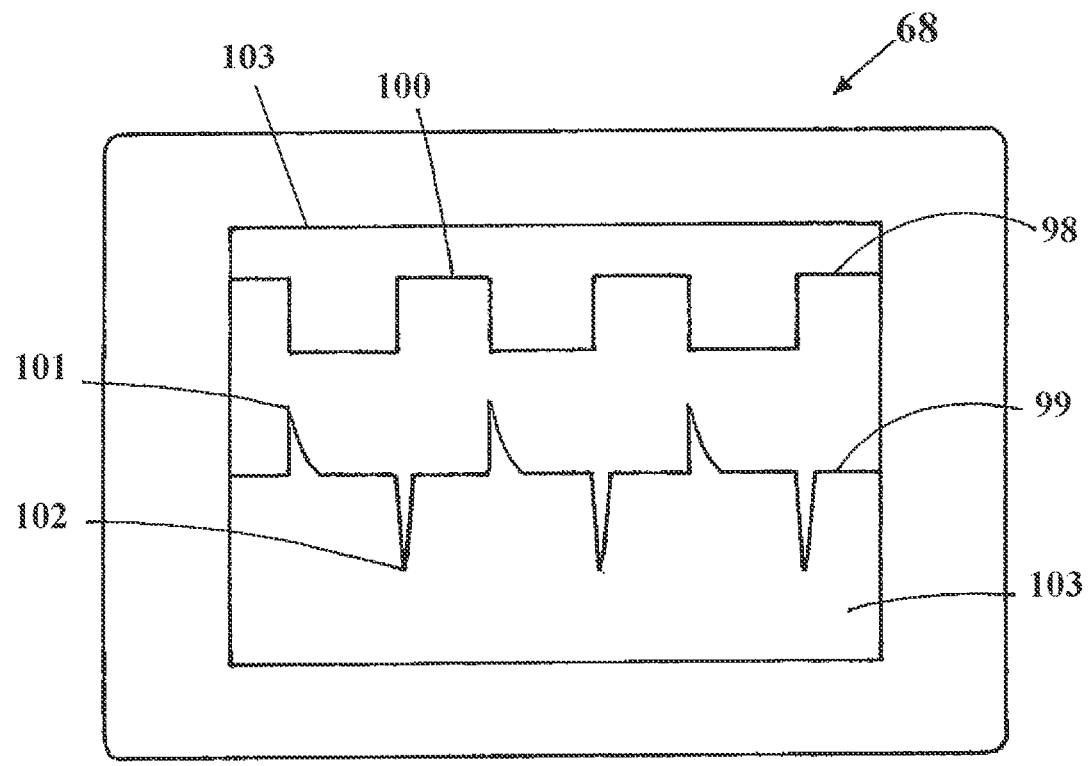
FIG. 33 shows typical waves and pulses from an antenna of a receiver and harvesting device which can appear on an oscilloscope screen.

As shown in drawing FIGS. 6 and 7, the two DC electrical energy pulses or waves which can include voltage and current that are obtained from the top end 33 of the antenna 21 in circuit 40b and bottom end 34 of the antenna 21 in circuit 40a can alternate in time and while not shown in these figures the DC electrical energy pulses can also then be out of phase and appear to be inverted, that is, one pulse can appear to be positive and above the zero center line, and the next pulse can appear to be negative and below the zero center line, and this pattern can be repeated, as shown in drawing FIG. 33.

Figure 8:
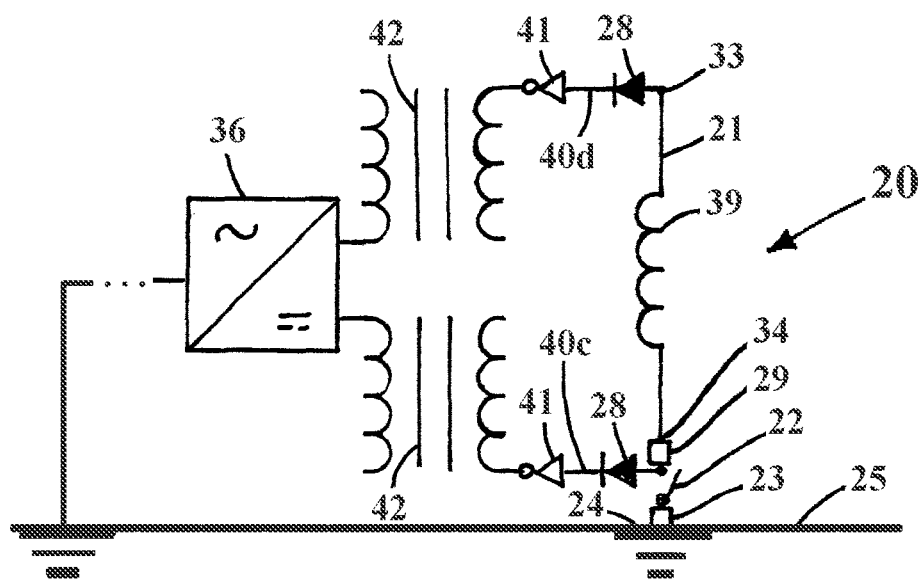
FIG. 8, shows a device for receiving and harvesting energy including two inverters to change the DC output of two circuits into AC current, and also a rectifier for changing AC to DC current so that the DC output of the two circuits can be combined.

As shown in drawing FIG. 8, it is possible to combine the two DC electrical energy outputs which can include voltages and currents that are obtained from the top end 33 and bottom end 34 of the antenna to produce a single DC output with the use of wires 35 or other conductors 72, two inverters 41, and two transformers 42 in two circuits 40c and 40d, which are then combined using a rectifier 36, such as a bridge rectifier in a receiver and harvesting device 20. In this regard, some relevant information on the structure and use of prior art rectifiers can be found on the website: https://en.wikipedia.org/wiki/Rectifier, https://en.wikipedia.org/wiki/Mercury-arc_valve, https://en.wikipedia.org/wiki/Thyratron, https://en.wikipedia.org/wiki/Thyristor, and, https://en.wikipedia.org/wiki/Power_MOSFET. In brief, the two DC currents can be changed to two AC currents using two inverters, and any possibly resulting mismatch in voltage and current between the two AC currents can then modified using two transformers so that they can be combined with the use of a rectifier 36, such as a bridge rectifier. The rectifier 36 can then be used to change the single provided AC current into a single DC electrical energy or current output. If desired, the electrical energy provided DC current can then be stored in a capacitor 30, a battery 31, or be used by a resistor 32 or other electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 8, the rectifier 36 can be in communication with a ground 24, and in particular, terrestrial earth 25 ground 24.

Alternatively, as shown in drawing FIG. 9, it is possible for the two out of time and possibly also out of phase DC electrical energy outputs obtained from the top end 33 and bottom end 34 of the antenna 21 to be combined in a single circuit 40e using a DC combiner 69 in a receiver and harvesting device 20. In this regard, a DC combiner 69 can possibly include a phase shifter 47 in order to efficiently combine the two DC electrical energy outputs and generate a single resulting DC electrical energy output. If desired, the DC electrical energy output can be stored in a capacitor 30, a battery 31, or be used by a resistor 32 or other electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 9, the DC combiner 69 can be in communication with a ground 24, and in particular, terrestrial earth 25 ground 24.

Figure 10:
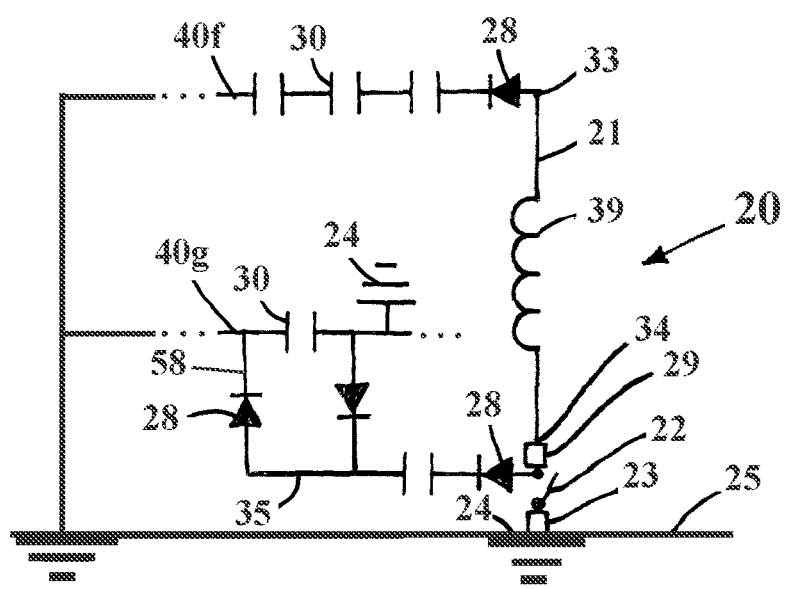
FIG. 10, shows a device for receiving and harvesting energy including a capacitor in a circuit, and a DC multiplier in another circuit.

As shown in FIG. 10, it can sometimes be useful to direct the DC pulse of electrical energy which can include voltage and current that is obtained from the bottom end 34 of the antenna 21 and the DC pulse of electrical energy which can include voltage and current that is obtained from the top end 33 of the antenna 21 into circuits 40f and 40g. In this regard, circuit 40f shows the possible use of capacitors 30 that are designed and engineered to store and release the provided electrical energy when it reaches a desired value and/or temporal interval. A resistor 32 can also possibly be included and used with the diode 28 and the capacitors 30 shown in circuit 40f. When DC voltage and current is directed into a capacitor, the anode and cathode sides of the capacitor will become filled with positive and negatively charged electrons. However, once the capacitor is filled the flow of current will stop and the accumulation of electrical potential and energy will then be stored, that is, unless the capacitor is subsequently discharged or placed in communication with an electrical load. In this regard, it is possible to use multiple capacitors in a series with each consecutive capacitor having at least equal or greater energy storage capacity in order to create a resulting large store of electrical energy and power as shown in circuit 40f. In some sense, his can be likened to using a quart container to fill a half gallon container, and then a half gallon container to fill a gallon container, and then a gallon container to fill a five gallon container, and then a five gallon container to fill a 55 gallon drum, as the capacitance is summed when the capacitors are configured in a series. When a 55 gallon drum, or large capacitor is filled and later suddenly discharged, it can provide more power or work per unit time than a small capacitor. For this purpose, an electrolytic capacitor or other capacitor which is designed and engineered to provide rapid charging and discharging of voltage and current can be used in circuit 40f. Some electrolytic capacitors can also provide a temporary electret effect, and/or can be caused to discharge by certain frequencies. Further, a capacitor or series of capacitors can be also selectively discharged with the use of a switching circuit. In drawing FIG. 10, one or more capacitors 30 which can be of the electrolytic type can be also be used in circuit 40g. A resistor 32 can be included and possibly be used between the diode 28 and the capacitors 30 which are included in circuit 40g. The electrical energy can be provided to a battery 30, an electric device, or be used by a resistor 32 or other electrical device which provides a load. As shown in drawing FIG. 10, the DC electrical energy present in circuit 40g can be increased in voltage by using a DC multiplier circuit 58 such as a duplex multiplier circuit as shown, or alternatively a triplex, quad or larger multiplier circuit including numerous diodes. Relevant information on prior art DC multiplier circuits can be found on the following website: https://www.electronics-tutorials.ws/blog/voltage-multiplier-circuit.html. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 10, in a receiver and harvesting device 20 the capacitor 30 in circuit 40*f* and DC multiplier circuit 58 in circuit 40*g* can be in communication with a ground 24, and in particular, terrestrial earth 25 ground 24.

Figure 11:
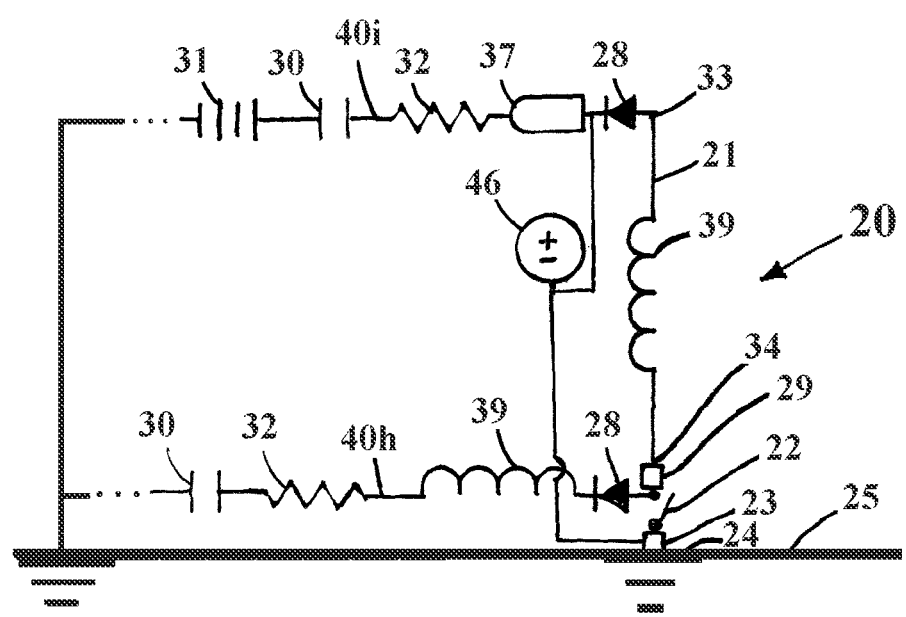
FIG. 11, shows a device for receiving and harvesting energy including an inductor in a circuit, and an amplifier in another circuit.

As shown in drawing FIG. 11, the pulse of DC electrical energy provided by circuit 40*h* can be increased in voltage with the use of a coil 39 or other inductor 59, e.g., an automotive ignition coil 60, a tesla coil 61, or a transformer 42 in a receiver and harvesting device 20. Relevant information on prior art induction coils can be found on the website: https://en.wikipedia.org/wiki/Induction_coil. Relevant information on prior art tesla coils can be found on the website: https://en.wikipedia.org/wiki/Tesla_coil. In this regard, a non-pulsed DC current will produce an electromagnetic field only for a short time when the associated circuit is turned on. However, a pulsed DC current can provide an electromagnetic field for a longer duration, and in particular, if the current output is modified for the sake of efficiency and power output with the use of a phase shifter 57. Automotive ignition coils 60 are known to take 12 Volts of DC current from a car battery, and provide between 15,000-40,000 Volts for discharging across the spark gap present in spark plugs for igniting gasoline fuel in internal combustion engines. Some ignition coils also include transformers which change DC to AC current.

Also shown in drawing FIG. 11, is the use of an amplifier 37 in circuit 40*i*. The amplifier 37 can be used to boost, filter, tune, or otherwise change and modulate electrical energy and the amplitude and/or frequency of an AC or DC signal or pulse. An amplifier 37 can be made of a single vacuum tube, e.g. a multipactor tube disclosed or made by Farnsworth, a photomultiplier tube, and/or can include multiple vacuum or gas filled tubes. Further, other electronic devices including but not limited to bolometers, oscillators, regulators, resonant circuits, indicators, controls, monitors, switches, transistors, capacitors, filters, resistors, diodes, chips, switching circuits, heat sinks, rectifiers, phase shifters, transformers, fuses, and power supplies, and computer chips or integrated circuits, can be used in various partial or complete combinations to make or modify an amplifier 37. In this regard, a warm cathode tube amplifier 37, or alternatively a so-called cold cathode tube amplifier 37, a solid state amplifier 37, or a hybrid amplifier 37 can be used in circuit 40*i* to increase the strength of the electromagnetic energy or signal, and/or to modify the voltage, current or phase of the electromagnetic energy or signal, and/or to create an oscillating or resonant circuit, and/or to rectify the electromagnetic energy or other form of electrical energy received or obtained by the receiver device 20 and antenna 21 which is being repeatedly switched open and closed to terrestrial earth 25 ground 34. In this regard, it can be necessary to initially provide a different external source of phantom electric power 46 such as an AC or DC power supply for starting or powering up a conventional warm cathode tube amplifier 37 and/or the switch 22, but less or even no phantom power can be needed or required for operation of a warm or cold cathode amplifier 37 and/or switch 22 once the receiver and harvesting device 20 is started and is then harvesting electrical energy because the use of electrical energy derived from the earth and its atmosphere provides an open as to a closed electrical system. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 11, the circuit 40*h* and the circuit 40*i* can be in communication with a ground 24, and in particular, terrestrial earth 25 ground 24.

Figure 12:
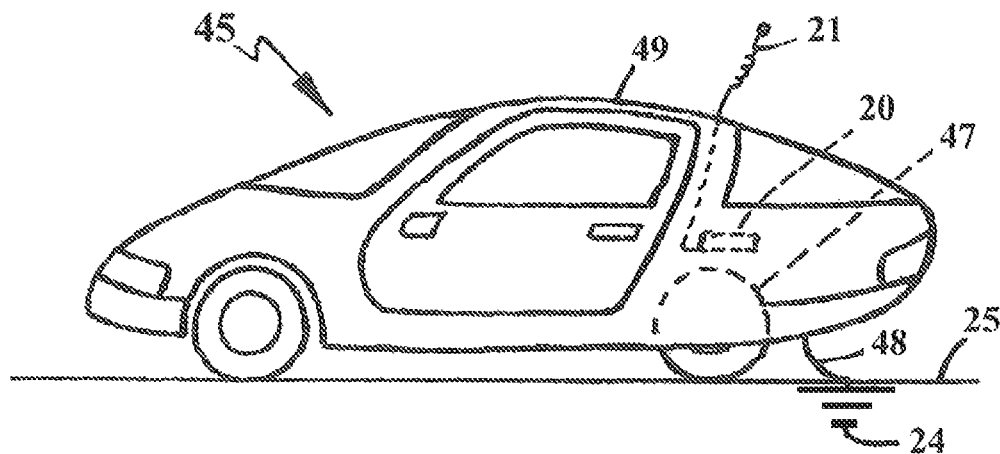
FIG. 12, shows an automotive application including an antenna and receiver and harvesting device.
Figure 12A:
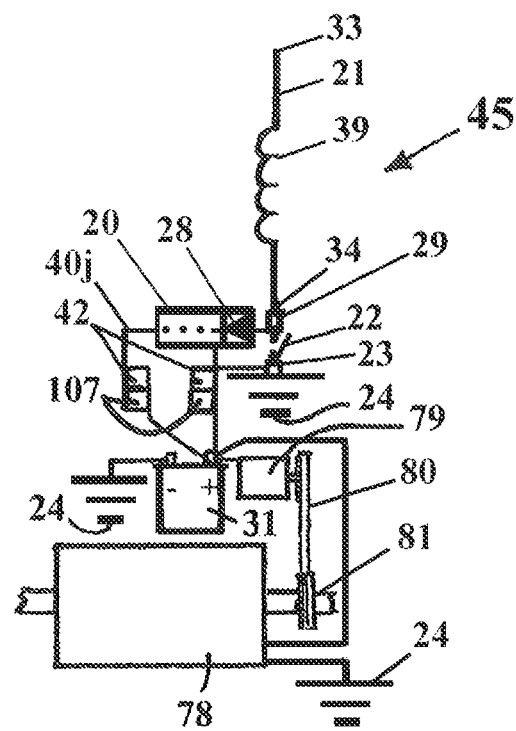
FIG. 12A, shows a schematic view of an automotive application including an antenna and a receiver and harvesting device.

As shown in drawing FIG. 12, in an automotive application of a receiver and harvesting device 20, a battery 31 can be used to provide a continuous and/or phantom source of electric power for an electric vehicle. As disclosed by Carlos Benitez in Great Britain Patents GB 121561A1, GB191514311A1, GB191417811A, and BG 191505591A, it is possible to generate electrical energy and to maintain the same in at least two batteries with relatively little or possibly no energy loss, and all of these patents are hereby incorporated by reference herein. As shown in drawing FIGS. 12 and 12*a*, a battery 31 can be connected in a circuit 40*j* to an ignition coil 60 for increasing the voltage of the provided current to a desired value, and/or to a transformer 42 for changing the values of the provided voltage and current provided to a receiver and harvesting device 20. A diode 28 can be connected to the bottom end 34 of the antenna 21 and be disposed inside the rectangular box representing a portion of the receiver and harvesting device 20 which can possibly also include other electrical components disclosed in this specification and the drawing figures, and this possibility is shown with the ellipsis symbol ( . . . ), which has also been used in some of the other drawing figures. The battery 31 can also provide a source of phantom electrical energy in order to at least initially power the switch 22 of the receiver and harvesting device 20. In FIG. 12*a*, this is shown using a separate wire coming from the positive terminal of the battery 31 for the sake of clarity, but the wire for providing power to the switch could alternatively come from the other wire which comes from the positive terminal of the battery 31 and which goes to the rectangular box which represents a portion of the receiver and harvesting device 20, or alternatively a wire which could come from the box representing a portion of the receiver and harvesting device 20 which could provide electric power to the switch 22. The battery 31 can be used to provide electrical energy for the electric motor 78 of the electric vehicle 45, but also for the use of electrical monitors, controls, instruments, amplifiers, and one or more of the circuits 40 disclosed herein, such as circuit 40*j*, and for other useful devices typically included in automotive vehicles such as lights, a radio, a heater, window openers, and power outlets. However, once the electrical energy receiver and harvesting device 20 including an antenna 21 which can possibly also include a coil 39 has been activated as a source of electrical energy and power by alternatively opening and closing the switch 22 to terrestrial earth 25 ground 24, and the gradient 38 of electrical energy provided by the earth and its atmosphere is caused to change in potential and move up and down in and/or about the antenna 21 resulting in the generation and harvesting of electrical energy in circuit 40*j*, the power initially provided by the battery 31 or a different source of phantom power 46 may not then be further required for the receiver and harvesting device 20 to operate because the use of electrical energy derived from the earth and its atmosphere provides an open as to a closed electrical system.

As shown in the schematic view drawing FIG. 12A of the electrical energy receiver and harvesting device 20 shown in drawing FIG. 12, the battery 31 can be maintained, at least in part, with the use of a generator or alternator 79 that is driven by the electric motor 78, drive shaft 81, or moving axle of the automobile using a belt 80, but can also possibly be maintained in whole or part by the electric power which is harvested and provided by the receiver device 20 which includes an antenna 21, and/or the structures and methods disclosed by Benitez in the aforementioned Great Britain Patents GB 121561A1, GB191514311A1, GB191417811A, and BG 191505591A. In FIG. 12*a*, a positive lead wire 35 can be seen coming from the generator or alternator 79 and going to the positive terminal of the battery 31, and it can be readily understood by persons of ordinary skill in the automotive art field that a negative lead wire 35 and/or the grounded case of the generator or alternator 79 can be secured to the frame, body, or other support structure of the electric vehicle 45 which is grounded, and in electrical communication with the negative pole of the battery 31. Further, a positive wire 35 can be seen coming from the positive terminal of the battery 31 and going to the electric motor 78, and another negative wire 35 can also be seen coming from the electric motor 78 and going to ground 24. In addition, it can also be seen that the switch 22 and also the battery 31 are in communication with a ground 24, and this can be done with a wire 35 or other connection to the frame or body of the electric vehicle 45 which serves as a ground 24, and which can also be in electrical communication with terrestrial earth 25 ground 24 because tires containing carbon black can be electrically conductive and the electric vehicle 45 can further include a grounding strap 48, as shown in FIG. 12.

In automotive applications, it can sometimes be useful to include other structures in order to provide for a good electric ground. The use of carbon black in automobile tires 47 can cause them to be electrically conductive. Further, it is also possible to provide a conductive ground lead 48 under a transportation vehicle 45 to maintain contact with the surface of the terrestrial earth 25 and ground 24. In addition, it is known that the roof and other portions of the chassis of an automobile can serve as a counterpoise 49 in order to improve the quality of electrical ground. In this regard, the Marine Corps "Antenna Handbook," MCRP 8-10B.11, published May, 2016, page 1-24, states: "A 1.5 meter tuned whip will deliver adequately all of the signals that can be received at frequencies below 1 MHz." The MCRP includes the following information on page 2-14: "Therefore, it is essential to provide as good a ground or artificial ground (counterpoise) connection as possible when using a vertical whip or monopole." The MCRP includes the following information on page 2-23: "In some VHF antenna installations on vehicles, the metal roof of the vehicle (or shelter) is used as a counterpoise for the antenna."

Accordingly, the roof and other portions of the body and chassis of an automobile or transportation vehicle 45 can be used as a counterpoise and/or in order to provide an enhanced ground connection, and then provide capacitance and a ready supply of electrons. However, there is a difference between an automobile that is wired positive ground as opposed to negative ground. Many of the automobiles made in America in the early $20^{th}$ century were wired positive ground and then used 6 Volt batteries. As a result of being wired positive ground, the lights of some vintage cars may not be as bright and the cranking power of their starters not be as high compared with modern 12 Volt batteries and negative ground wiring configurations, but the starters of these older vehicles can be cranked for a long time without so rapidly depleting their 6 Volt battery. While the United States largely switched to the use negative ground in automobiles by the 1950's, some automobiles made in England continued to be wired positive ground. One of the effects of being wired positive ground is that the entire chassis of the automobile is then used as a reservoir for electrons and is then potentially slowly being consumed. While the bodies of these cars can then be stressed and more subject to oxidation and corrosion, the wiring of these cars is not being used and consumed as a ready source of electrons as is the case when a car is wired negative ground. Depending upon the desires, intentions, and goals of the designer and end users, it could be advantageous to use positive ground in a transportation vehicle that would include an antenna 21 and receiver and harvesting device 20 and other related structures and devices that would provide a source of electric energy and power derived from the earth and its atmosphere.

In non-mobile applications, the quality of a ground connection can be improved with the use of many structures and methods known in the electrical art field, and which are also approved by the electric code of the locality or country in which the application is to be made. For example, a copper rod driven into the soil, a ground screen, and conductive plumbing pipes have sometimes been used with the electrical installations found in residential and commercial buildings. It is known that Tesla created and discharged the equivalent of lightning bolts in his Colorado Laboratory. He then dug deep into the earth and buried conductive metallic structures and also used carbon black in the form of coal dust, and continuously ran water over these areas to enhance the ground connection. Large radio antennas and stations commonly have substantial grounding structures to ensure a good ground connection.

Figure 13:
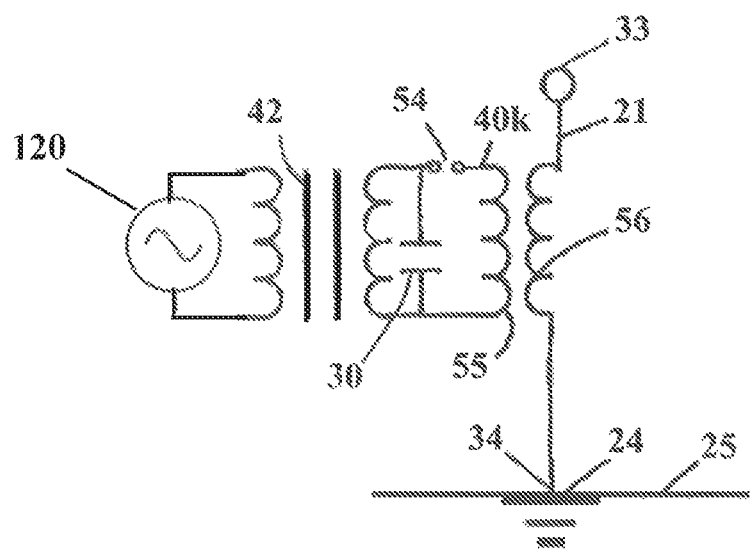
FIG. 13 shows a prior art electrical schematic of a conventional Tesla coil.

Drawing FIG. 13 shows a conventional prior art circuit 40*k* for a Tesla coil. In brief, the AC power source which is shown on the far left side of the drawing figure using an appropriate electrical symbol can provide electric power to an AC transformer 42 which is used to charge a capacitor 30. When the capacitor 30 is discharged by the AC current as it alternates this provides enough electrical potential to cause the available voltage and current to jump the spark gap 54. The primary coil 55 in the circuit 40*k* then imparts electrical energy by induction to the secondary coil 56 included in the antenna 21. At least a portion of the circuit 40*k*, and in particular, the antenna 21 will resonate and result in the antenna 21 accumulating substantial electric energy. When the electric charge builds to a high enough voltage and the dielectric properties of the surrounding local atmosphere break down, the top end 33 of the antenna 21 can discharge an electric steamer to a viable path to ground. It is important to recognize here that the spark gap 54 which Tesla used was essentially an air capacitor which had a relatively high dielectric in the form of air between the anode and cathode portions of the spark gap 54. A spark gap 54 can be adjustable using movable screws, nuts, and bolts, for changing the gap and amount of electrical potential and voltage required to jump the gap, and therefore also the frequency at which the gap is being jumped. In this regard, an automotive spark plug used in combustion engines is one well known example of a spark gap device.

Figure 14:
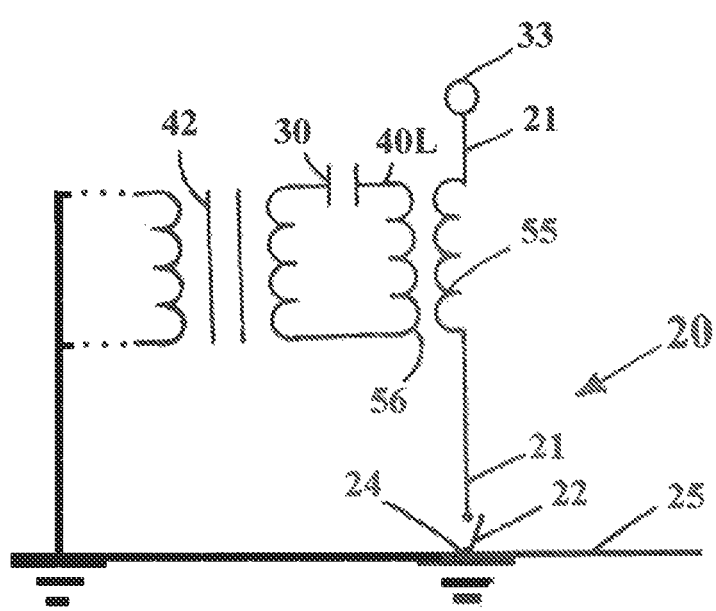
FIG. 14 shows a device for receiving and harvesting energy including an antenna including a primary coil in communication with a switch for opening and closing its conductive path to terrestrial earth ground.

Drawing FIG. 14 shows a receiver and harvesting device 20 including an antenna 21 including a primary coil 55 in communication with a conductive path to terrestrial earth 25 ground 24 which can be alternatively be opened or closed with a switch 22. The primary coil 55 associated with the antenna 21 can transfer AC electrical energy to the secondary coil 56 in circuit 40L which can be caused to resonate. In this regard, the capacitor 30 in circuit 40L can accumulate electrical energy and then discharge and provide a pulse of electrical energy which can be communicated using a wire 35 or other conductor 72 to a transformer 42, a battery 31, or be used by a resistor 32 or electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 14, the transformer 43 can be in communication with a ground 24, and in particular, terrestrial earth 25 ground 24.

Figure 15:
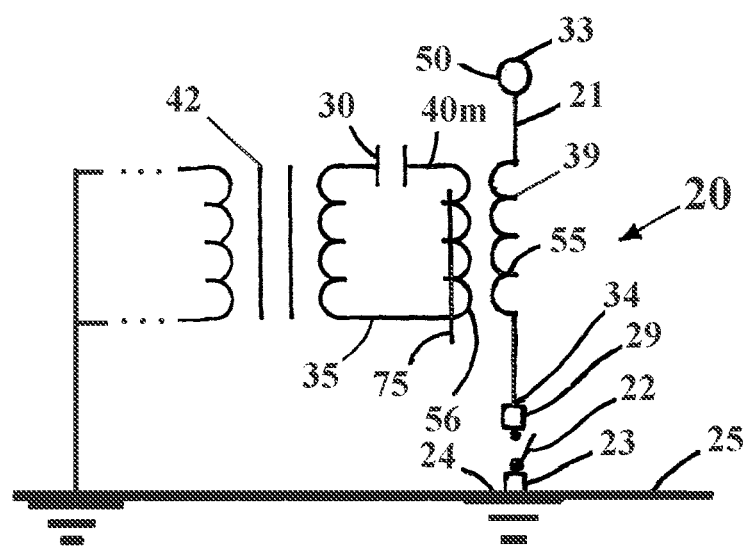
FIG. 15 shows a device for receiving and harvesting energy including an antenna including a primary coil in communication with a switch for opening and closing its conductive path to terrestrial earth ground and a magnetic amplifier.

Drawing FIG. 15 shows a receiver and harvesting device 20 including an antenna 21 including a primary coil 55 in communication with a switch 22 for opening and closing its conductive path to terrestrial earth 25 ground 34. When the antenna 21 is repeatedly switched on and off to terrestrial earth 25 ground 34, the atmosphere's 26 gradient of electrical potential 38 is caused to change and move upwards and downwards along the length of the antenna 21 which can result in the production and movement electrical energy. The primary coil 55 included in the antenna 21 can then transfer energy to the secondary coil 56 included in circuit 40*m*. The circuit 40*m* can be caused to resonate and its electrical potential can then increase until the capacitor 30 is caused to discharge. As a result, a relatively large and sudden DC pulse of electrical energy will be released which can if desired or required be changed or modified in voltage and current by a transformer, be stored in a capacitor 30, a battery 31, or be used by a resistor 32 or other electrical device which provides a load. In drawing FIG. 15, the possible use of a magnetic amplifier 75 is shown in relation to the secondary coil 56 in circuit 40*m*, but a magnetic amplifier 75 could also or alternatively be used in relation to the primary coil 55. Relevant information on prior art magnetic amplifiers can be found on the following website: https://en.wikipedia.org/wiki/Magnetic_amplifier. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 15, the transformer 42 can be in communication with a ground 24, and in particular, terrestrial earth 25 ground 24.

Figure 16:
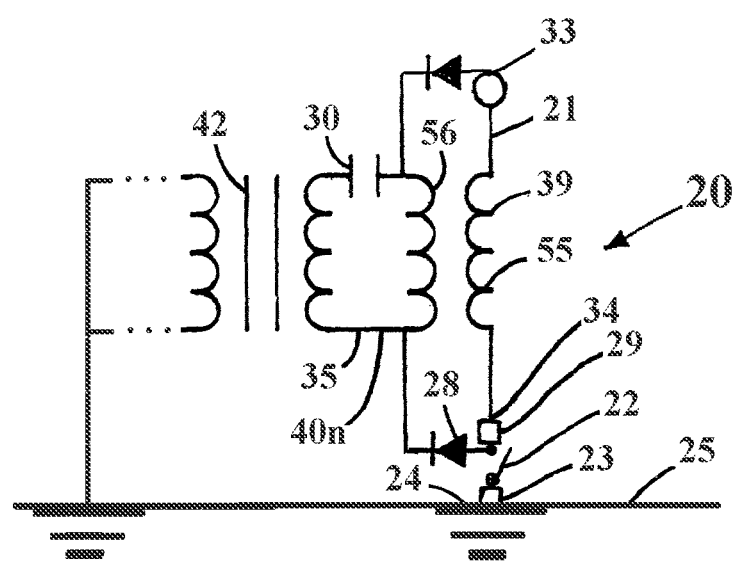
FIG. 16 shows a device for receiving and harvesting energy including an antenna including a primary coil in communication with a switch for opening and closing its conductive path to terrestrial earth ground.

Drawing FIG. 16 shows a receiver and harvesting device 20 including an antenna 21 including a primary coil 55 which is in communication with a switch 22 for opening and closing its conductive path to terrestrial 25 ground 34. The bottom end 34 of the antenna 21 and also the top end 33 of the antenna 21 can each be connected to at least one diode 28 in a circuit 40*n* which includes a secondary coil 56 and a capacitor 30. A resistor 32 having a desired value can be used between the at least one diode 28 and capacitor 30, and it is here recognized that even a wire 35 has resistance. When the antenna 21 is repeatedly switched open and closed to terrestrial earth 25 ground 34, the gradient of local electrical potential 38 in the atmosphere 36 can be caused to change and move upwards and downwards along the length of the antenna 21 which results in a corresponding change and movement of electrical energy in the antenna 21. The electrical energy provided to circuit 40*n* from the top end 33 and bottom end 34 of the antenna 21 will be out of phase and typically have a DC pulse waveform. A conventional capacitor 30 once filled with charge by DC current can prevent any more electrons from flowing and then essentially act as an off switch in an electrical circuit. However, some electrolytic capacitors can be discharged by certain frequencies, and other means for switching an electrolytic capacitor can also be used, e.g., a switching transistor circuit, an integrated circuit possibly including a timing chip such as a 555 or 955 integrated circuit timer, a spark gap, a vacuum tube such as a Western Electric 1B22 tube, or a hydrogen thyratron tube such as types 3C45, 4C35, 5C22 which can be used as switches and operate in micro or nanoseconds. Also shown is a variable speed control 23 for selectively changing and/or tuning the speed and/or contact dwell time of the switch 22. The switch 22 can cause the ground 24 connection of the antenna 21 to be controlled and opened and closed hundreds, thousands, tens of thousands, hundreds of thousands, and even millions of times per second.

In this embodiment, the primary coil 55 can also transfer AC voltage and current to the secondary coil 56 by magnetic inductance and cause the capacitor 30 to discharge. If and when the out of phase DC pulse waveforms coming from the top end 33 and bottom end 34 of the antenna 21 could possibly interfere with the AC current waveform provided by the primary coil 55 and secondary coil 56, or vice-versa, the speed and contact dwell of the switch 22 and resonant frequency of the antenna 21 and the primary coil 55 and secondary coil 56 and the electrical properties of the selected capacitor 30 and circuit 40*n* can be designed and engineered, or otherwise be modified with a phase shifter 57, magnetic amplifier 75, variable capacitor, variable resistor, tuner, or other electronic device in order to prevent the undesired loss of electrical energy. As a result, at least part of the electrical energy provided by the DC pulses and also the AC voltage and current transmitted by the primary 55 and secondary 56 coils 39 can be included in the output of circuit 40*n*. The circuit 40*n* can be caused to resonate and its electrical potential can increase and the capacitor 30 then be caused to discharge. Alternatively, a configuration which could include a capacitor 30 and spark gap 54 similar to circuit 40*v* shown in FIG. 38 could be used. As a result, a relatively large and sudden pulse of electrical energy can be released which can then be changed in voltage and current by a transformer 42, and/or be provided to a capacitor 30, a battery 31, or be used by a resistor 32 or other electrical device which provides a load. The electrical output could be in the form of AC current, DC current, or a combination of both, and if desired or required an inverter can then be used to change AC to DC so that the electrical energy can be stored in a battery 31. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 16, the transformer 42 can be in communication with a ground 24, and in particular, terrestrial earth 25 ground 24.

Drawing FIG. 17 shows a receiver and harvesting device 20 including an antenna 21 in communication with a coil 39 and a switch 22 for opening and closing its conductive path to ground 34. The bottom end 34 of the antenna 21 can be connected to a diode 28 which is connected to a circuit 40*o* including an amplifier 37. A resistor 32 having a desired value can be used between the diode 28 and capacitor 30, and it is here recognized that a wire 35 has resistance. When the antenna 21 is repeatedly switched open and closed to terrestrial earth 25 ground 24, the local atmosphere 36 electrical potential gradient 38 is caused to change and move upwards and downwards along the length of the antenna 21 which can result in the generation and movement of electrical energy 27. The electrical energy provided to circuit 40*o* from the bottom end 34 of the antenna 21 will typically be in the form of DC current and have a pulse waveform. The amplifier 37 can be used to modulate the electrical energy input and then create a desired or needed form of electrical energy output. Relevant information on prior art amplifiers and including those identified by different amplifier classes can be found on the following websites: https://en.wikipedia.org/wiki/Amplifier, https://www.electronics-tutorials.ws/amplifier/amplifier-classes.html, https://www.powerelectronictips.com/amplifier-classes-power-efficiencies-faq/, https://www.electronics-tutorials.ws/ amplifier/amp_5.html, and, https://www.electronics-tutorials.ws/amplifier/amp_6.html.

Further, a gas filled tube, a vacuum tube, a cold cathode vacuum tube, a multipactor tube as disclosed or made by Farnsworth, a photomultiplier tube, or a bolometer can be used as an amplifier 37. The antenna 31, coil 39, diode 28, amplifier 37, resistor 32, and capacitor 30 can be engineered and configured to be in resonance when in operation. Moreover, the capacitor 30 can be connected in series or parallel to another amplifier 37, resistor 32, and capacitor 30, and/or to another complete receiver and harvesting device 20 unit including an antenna 21, coil 39, switch 22, diode 28, amplifier 37, resistor 32 and capacitor 30. If desired or required, the output can be changed in voltage and current by a transformer 42. AC current can be changed to DC using an inverter so that it can be stored in a battery 31, or be used by a resistor 32 or other electrical device which provides a load, and conversely, DC current can alternatively be changed to AC current using a converter, and the electrical output can be used by used by a resistor 32 or other electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 17, the circuit 40o can be in communication with a ground 24, and in particular, terrestrial earth 25 ground 24.

Figure 18:
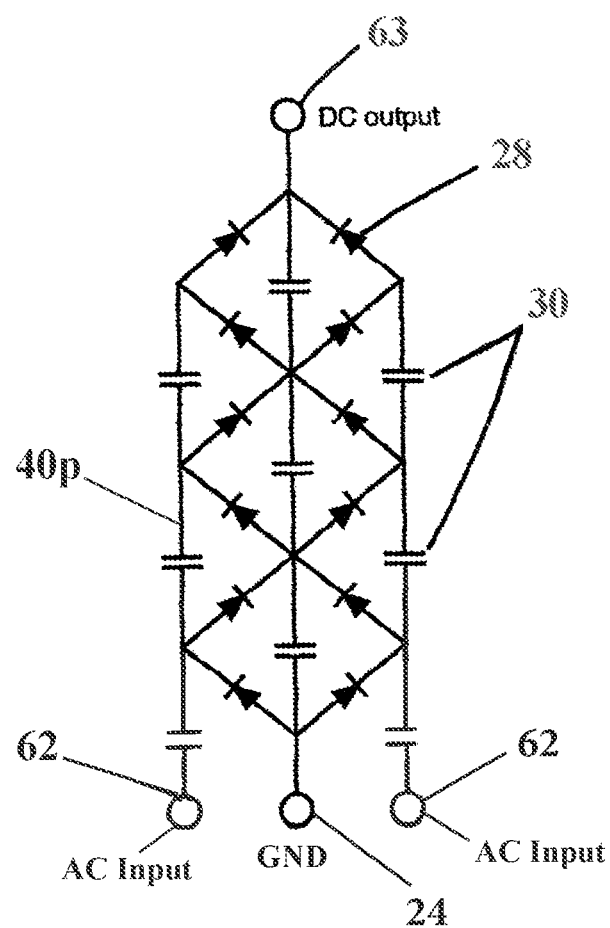
FIG. 18 shows a prior art DC multiplier circuit used in a Cockcroft-Walton generator.

Drawing FIG. 18 shows a prior art DC multiplier circuit 40p used in a Cockcroft-Walton generator 64. The circuit 40p can include a plurality of capacitors 30 and diodes 28, AC input 62, ground 24, and DC output 63 which can be placed in electrical communication with a battery 31, or a resistor 32 or other electrical device which provides a load. The circuit 40p can be in communication with a ground 24, and in particular, terrestrial earth 25 ground 24. Relevant information on prior art Cockcroft-Walton generators can be found on the following website: https://en.wikipedia.org/wiki/Cockcroft%E2%80%93Walton_generator.

Figure 19A:
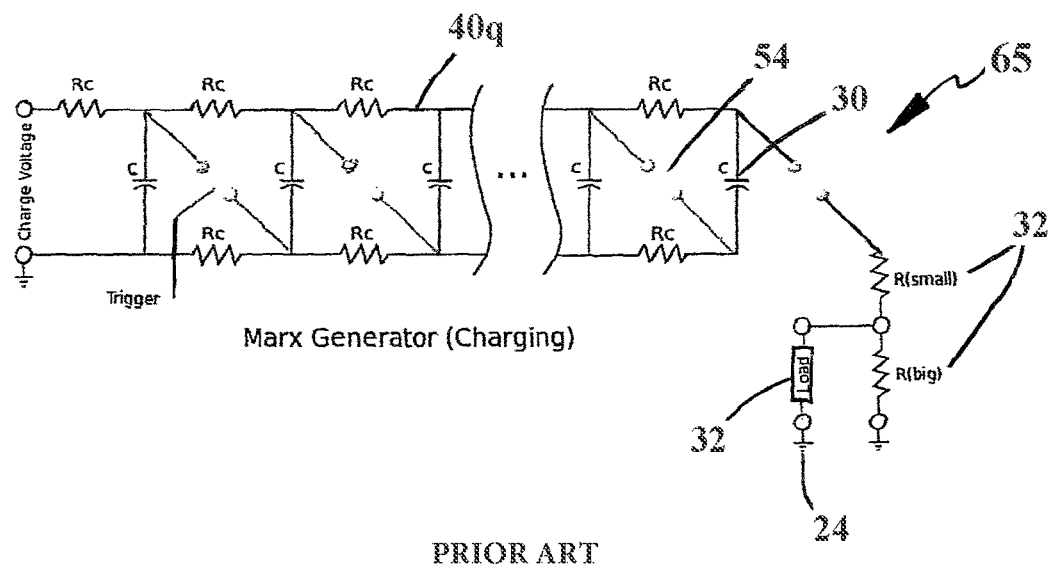
FIG. 19a shows a prior art circuit used in a Marx generator when it is charging.
Figure 19B:
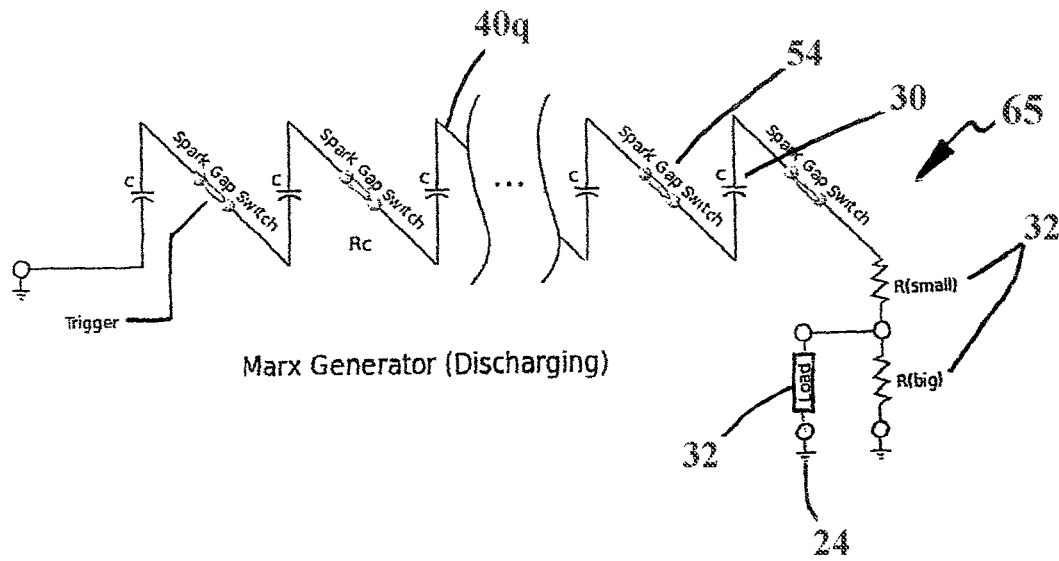
FIG. 19b shows a prior art circuit 40 used in a Marx generator when it is discharging.

Drawing FIG. 19a shows a prior art circuit 40q used in a Marx generator 65 when it is charging, and drawing FIG. 19b shows a prior art circuit 40q used in a Marx generator 65 when it is discharging. The prior art circuit 40q used in a Marx Generator 65 includes a plurality of capacitors 30, spark gaps 54, resistors 32, ground 24, and a load which is also represented using numeral 32. Relevant information on prior art Marx generators can be found on the following website: https://en.wikipedia.org/wiki/Marx_generator. The circuit 40q can be in communication with a ground 24, and in particular, terrestrial earth 25 ground 24.

Figure 20:
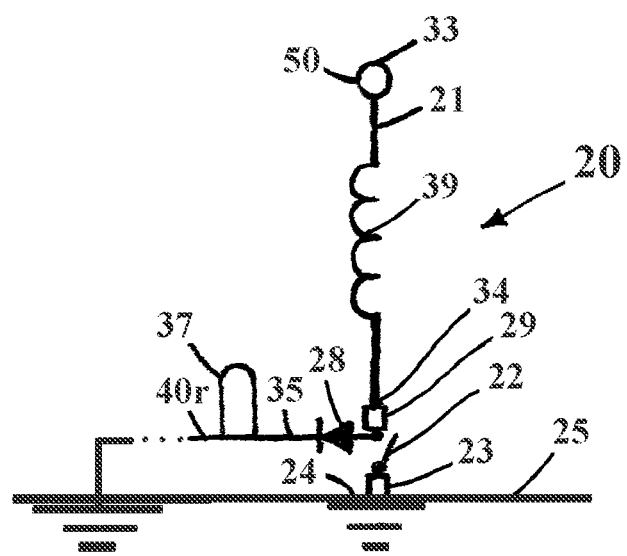
FIG. 20 shows a device for receiving and harvesting energy including an antenna that can be placed in direct communication with a circuit including an amplifier.

Drawing FIG. 20 shows a receiver and harvesting device 20 including an antenna 21 in communication with a switch 22 which can include an adjustable speed control 23 for opening and closing its conductive path to terrestrial earth 25 ground 34. The bottom end 34 of the antenna 21 can be connected to a diode 28 which is connected to a circuit 40r including an amplifier 37. As previously discussed, a multipactor tube disclosed or made by Farnsworth, a photomultiplier tube, or other cold cathode, warm cathode vacuum tube, or gas filled tube can be used as an amplifier. A resistor 32 can be included and possibly be used between the diode 28 and amplifier 37, and it is here recognized that a wire 35 has resistance. When the antenna 21 is repeatedly switched open and closed to terrestrial earth 25 ground 24, the atmospheric 36 gradient 38 of electrical potential is caused to change or move upwards and downwards along the length of the antenna 21 which results in the generation and movement of electrical energy 27. The electrical energy including voltage and current which is provided to circuit 40r from the bottom end 34 of the antenna 21 will typically be DC and have a pulse waveform. The amplifier 37 can be used to modulate the electrical input from the antenna and/or terrestrial earth 25 ground 24 and create a desired or needed form of electrical output. When the output is stored in a capacitor 30 and is then discharged, a relatively large and sudden pulse of electrical energy can be released. If desired or required, the output can be changed in voltage and current by a transformer 42. AC current can be changed to DC using an inverter so that it can be stored in a battery 31, or used by a resistor 32 or other electrical device which provides a load, and conversely, DC current can alternatively be changed to AC current using a converter, and the electrical output can be used by a resistor 32 or other electrical device which provides a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 20, the circuit 40r can be in communication with a ground 24, and in particular, terrestrial earth 25 ground 24.

Figure 21:
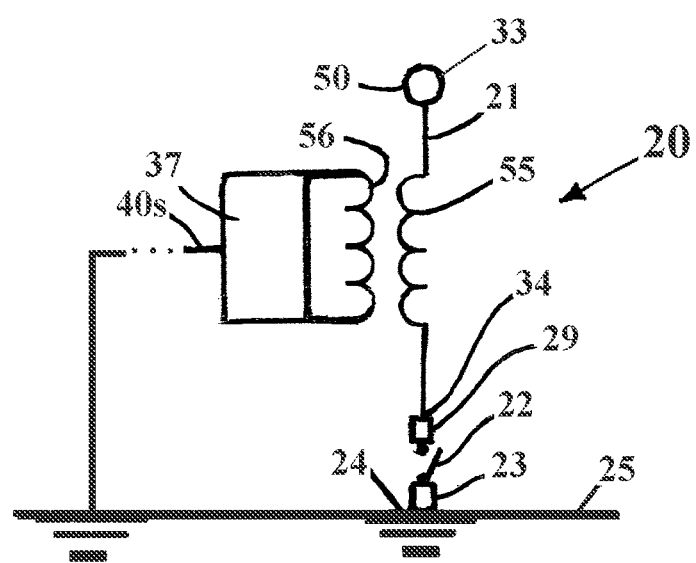
FIG. 21 shows a device for receiving and harvesting energy including an antenna that can be placed in electromagnetic communication with a circuit including an amplifier.

Drawing FIG. 21 shows a receiver and harvesting device 20 including an antenna 21 in communication with a switch 22 for opening and closing its conductive path to terrestrial earth 25 ground 34. When the antenna 21 is repeatedly switched open and closed to terrestrial earth 25 ground 34, the local atmospheric 36 gradient 38 of electrical potential is caused to change and move upwards and downwards along the length of the antenna 21 which results in the production and movement of electric energy 27 in the primary coil 55. The voltage and current provided by electromagnetic inductance to the secondary coil 56 and the amplifier 37 in circuit 40s will typically be AC and can have sinusoidal wave form. Circuit 40s can include a frequency tuner and/or a phase shifter for use with the receiver and harvesting device 20, antenna 21, primary coil 55, secondary coil 56, and amplifier 37. The amplifier 37 can be used to configure, manipulate, or modulate the electrical input and then provide a desired or needed form of electrical output. An electronic filter or choke can be used with the antenna 21, circuit 40s, or amplifier 37, but also with any of the antennas, circuits, amplifiers, or alternative embodiments of a receiver device 20 disclosed herein. When the electrical energy is stored in a capacitor 30 and is then discharged, a relatively large and sudden pulse of electrical energy can be released. If desired or required, the electrical output can be changed in voltage and current by a transformer. AC current can be changed to DC using an inverter so that it can be stored in a battery 31, or used by a resistor 32 or other electrical device which provides a load, and conversely DC current can alternatively be changed to AC current using a converter, and the electrical output can be used by a resistor 32 or other electrical device which can provide a load. As discussed above, it can be readily understood that a capacitor 30, a battery 31, and a resistor 32 or other electrical device or load can include an electrical connection to a ground 24 in an electrical device, and/or to terrestrial earth 25 ground 24. As shown in drawing FIG. 21, the circuit 40s can be in communication with a ground 24, and in particular, terrestrial earth 25 ground 24.

The antenna, circuit, and possible amplifier combinations disclosed herein which are part of a receiver and harvesting device 20 can provide electrical energy for use derived from the electrical potential which exists between the earth and its atmosphere. The electrical energy has been there for millions of years, but it has not been tapped and harvested to a significant degree. The possible inclusion of oscillating and/or resonating circuits and antenna in a receiver device, and the use of components which are consistent with the previously recited cold cathode vacuum or gas filled tubes invented by Farnsworth which can approximate and/or exceed unity can provide for an amplifier and receiver device which can be efficient and provide electrical energy that can stored for future use in a capacitor or battery, and/or be used by a resistor 32 or other electrical devices which can provide a load.

Figure 22:
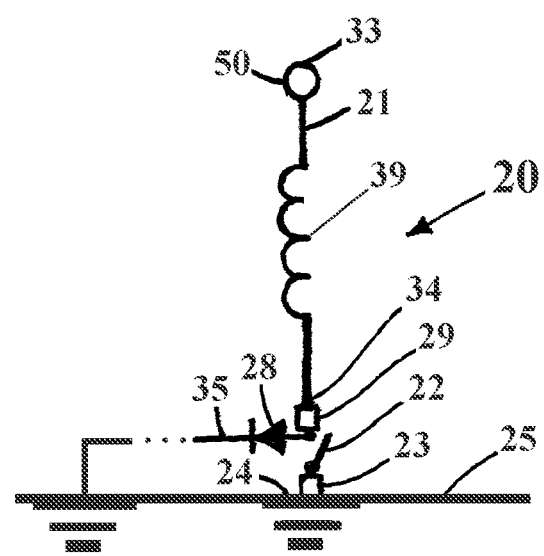
FIG. 22 shows a device for receiving and harvesting energy including an antenna having a sphere at the top end.

Drawing FIG. 22 shows a receiver and harvesting device 20 including a monopole antenna 21 having a sphere 50 at the top end 33. The inclusion of a sphere 50 can possibly enhance the capability of the antenna 21 to receive, collect, and harvest electrical energy.

Figure 23:
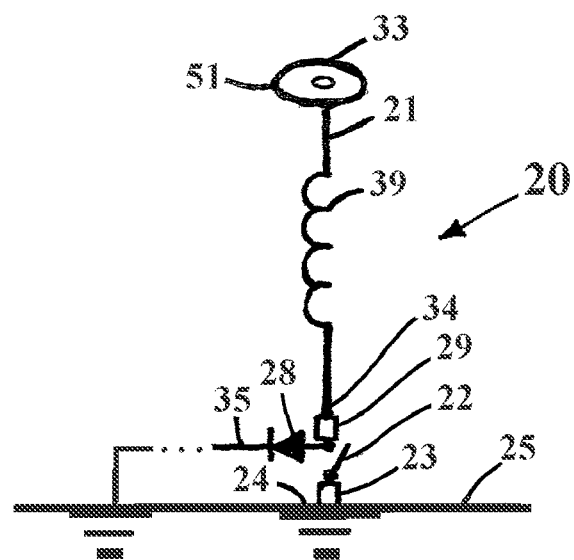
FIG. 23 shows a device for receiving and harvesting energy including an antenna having a toroid at the top end.

Drawing FIG. 23 shows a receiver and harvesting device 20 including a monopole antenna 21 having a toroid 51 at the top end 33. The inclusion of a toroid 51 can possibly enhance the capability of the antenna 21 to receive, collect, and harvest electrical energy. The toroid 51 configuration or shape can be associated with the so-called golden ratio or divine proportion number phi, which to the fifth decimal has a value of 1.61803. This number is generated by the ratio of sequential Fibonacci numbers, and can be associated with fractal geometric shapes and patterns. A toroid 51 can constitute and serve as a conventional or fractal antenna.

Figure 24:
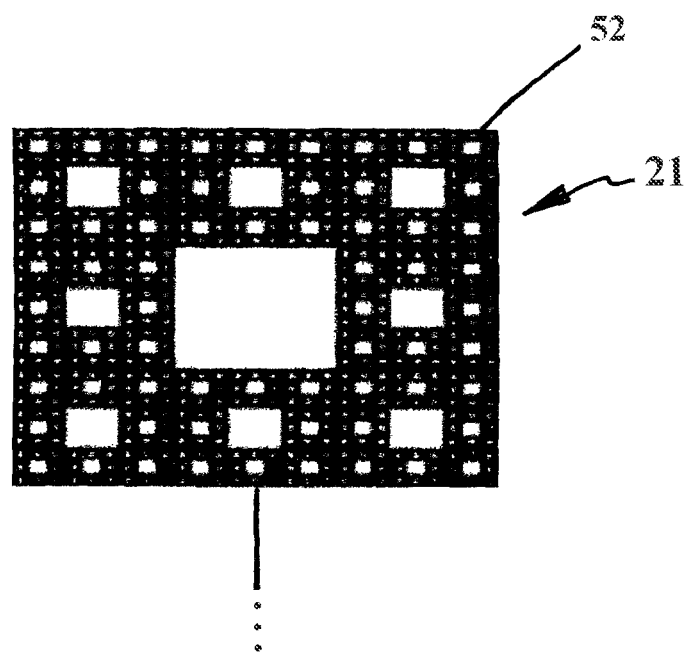
FIG. 24 shows a fractal antenna including a golden rectangle shape.

Drawing FIG. 24 shows a fractal antenna 21 including a golden rectangle 52 as the primary repeated shape in which the ratio of the length to the width of the rectangle 52 is the number phi which to the fifth decimal point is 1.61803. In this regard, a relatively small fractal antenna can receive a wide broadband of frequencies and behave like a much larger conventional antenna because of the shape and patterns which can potentially be infinitely repeated and decreased in size. An antenna 21 can be made in a logarithmic spiral, and in particular, a golden spiral, and the spiral can be followed in a Mandelbrot set, and then possibly be referred to as a Mandelbrot antenna. Prior art information on fractal antennas can be found in the article entitled "Fractal Antenna Engineering: The Theory and Design of Fractal Antenna Arrays," published in IEEE Antennas and Propagation Magazine, Vol. 41, No. 5, October, 1999, and also in the following patents granted to Nathan Cohen U.S. Pat. Nos. 6,476,766, 7,145,513, and 10,030,917, and these patents are hereby incorporated by reference herein.

Figure 25:
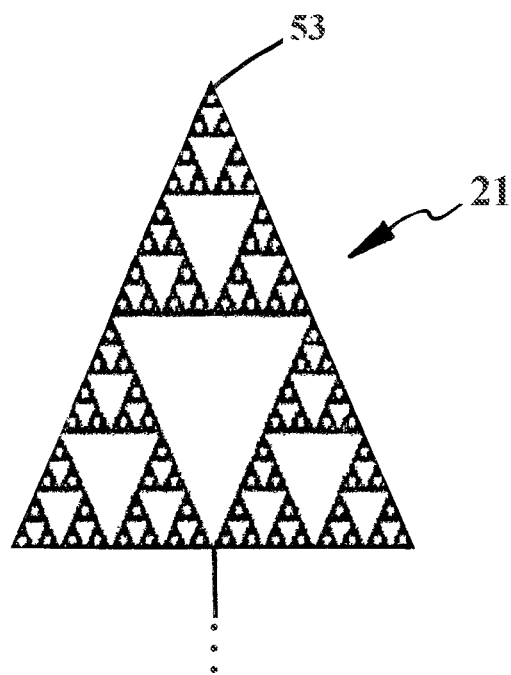
FIG. 25 shows a fractal antenna including a golden triangle shape.

Drawing FIG. 25 shows a fractal antenna 21 including a golden triangle 53 as the primary repeated shape in which the ratio of the length to the width of the triangle 53 is the number phi which to the fifth decimal point is 1.61803. In this regard, a relatively small fractal antenna can receive a wide broadband of frequencies and behave like a much larger conventional antenna because of the shape and patterns which can potentially be infinitely repeated and decreased in size.

Figure 26:
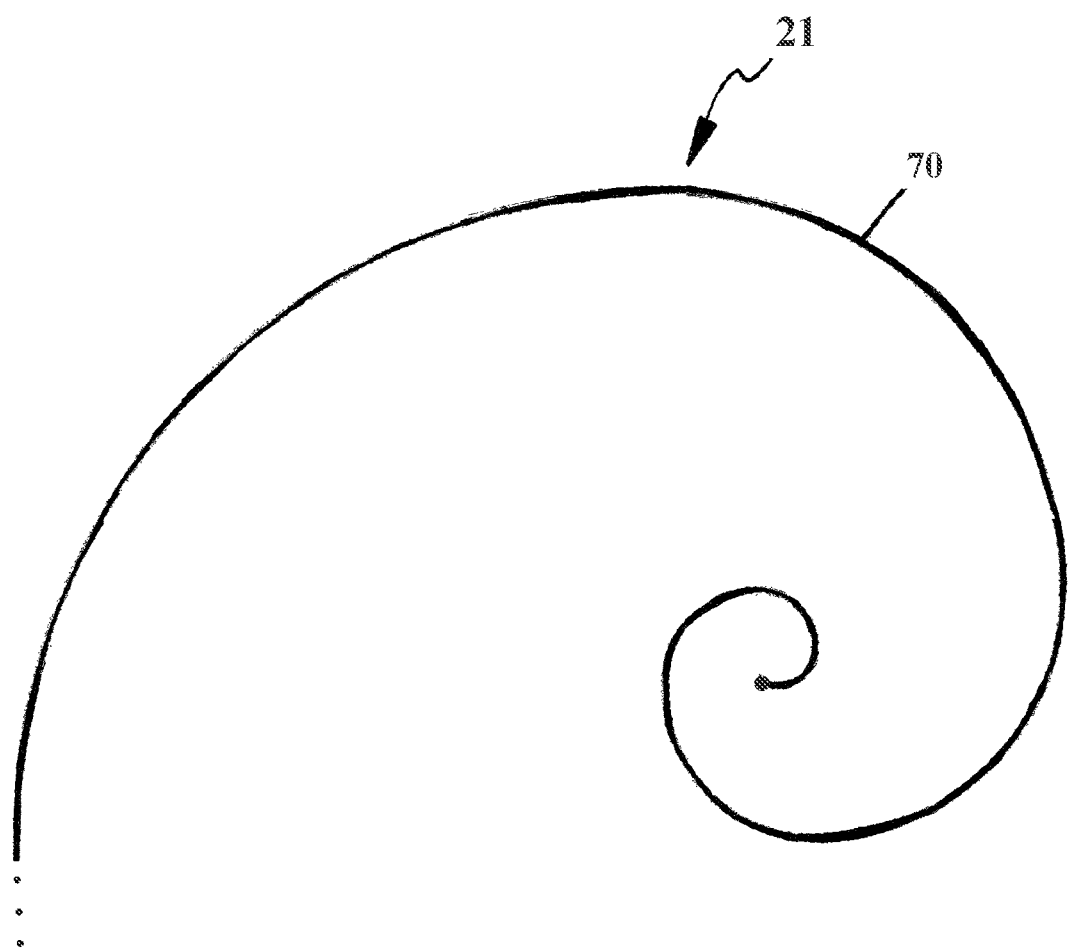
FIG. 26 shows a fractal antenna including a logarithmic spiral.

Drawing FIG. 26 shows a fractal antenna 21 including a logarithmic spiral 70. The antenna 21 can be made in a logarithmic spiral 70, and in particular, a golden spiral 73. A golden spiral 73 can be made in three dimensions and have an annular or conical structure 74 resembling a pine cone. A logarithmic and/or golden spiral 73 can be followed and configured in a Mandelbrot set 71, and can also then be referred to a Mandelbrot antenna. Prior art information on logarithmic spirals, golden spirals, and Mandelbrot sets can be found at the following websites: https://en.wikipedia.org/wiki/Logarithmic_spiral, https://en.wikipedia.org/wiki/Golden_spiral, and, https://en.wikipedia.org/wiki/Mandelbrot_set.

Figure 27:
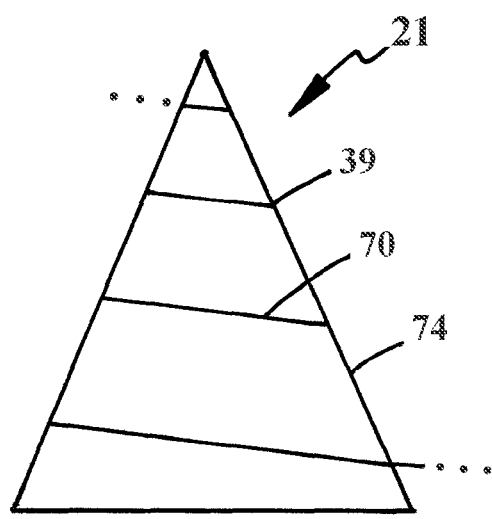
FIG. 27 shows a three-dimensional antenna including a logarithmic spiral.

Drawing FIG. 27 shows a three-dimensional antenna having a conical structure 74 including a coil 39 configured in at least one logarithmic spiral 70. Further, the conical structures 74 shown in drawing FIGS. 27-29 which can be used to make an antenna 21 and/or coil 39 can alternatively be configured in a phi geometry. This possibility is shown with a spiral shaped antenna 21 and/or coil 39 which is configured in a phi geometry and disposed about the conical structure 74 shown in FIG. 49. Further, a first conical structure 74 having a first height can include a primary coil 55, and a second conical structure 74 having a different height can include a secondary coil 56, and the secondary coil 56 can be disposed inside or outside of the first conical structure 74 and primary coil 55 in a nesting physical relationship like that of Russian Kabuki dolls. In addition, the nanostructures 104 and/or nanowires 93 shown in drawing FIGS. 35-37, and 46-48 can have a portion near their points 126 configured in and/or approximately consistent with a phi geometry.

Figure 28:
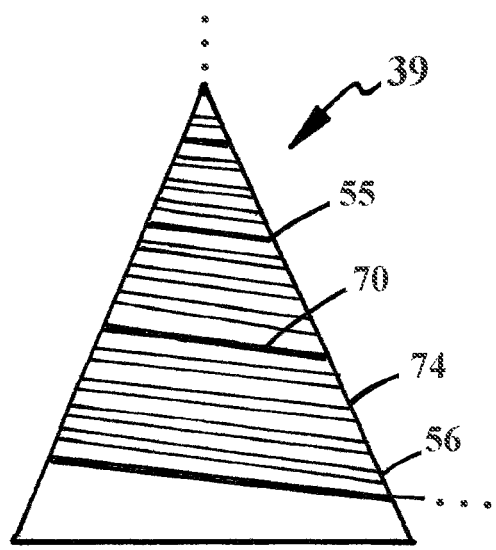
FIG. 28 shows a coil having a conical shape.

Drawing FIG. 28 shows a three-dimensional coil 39 having a conical structure 74 configured in at least one logarithmic spiral 70 including a primary coil 55, and also a secondary coil 56. The mass of the primary coil 55 and secondary coil 56 wires or conductive materials can be made to be approximately the same. Further, the ratio of the length of the secondary coil 56 wire or conductive material to the primary coil 55 wire or conductive material can correspond to the golden ratio phi 1.61803 . . . /1, and in order to do this the relative gauges of the wires or other conductive materials can be specifically selected. The direction of the electrical voltage and current or pulses in the primary coil 55 and secondary coil 56 can be engineered and configured to travel in the same direction, or alternatively the electrical voltage and current or pulses can be configured to run in opposite directions in the primary coil 55 and secondary coil 56. The coil 39 can be part of a larger circuit 40 which is in communication with a receiver and harvesting device 20 which can include an antenna 21, diode 28, resistor 32, capacitor 30, transformer 42, battery 31, a resistor 32 or other electronic devices which can provide a load, whether in partial or complete combination. Accordingly, a resonating circuit 40 generally similar to those which are disclosed herein can be configured and made to include a coil 39 having a phi geometry.

Figure 29:
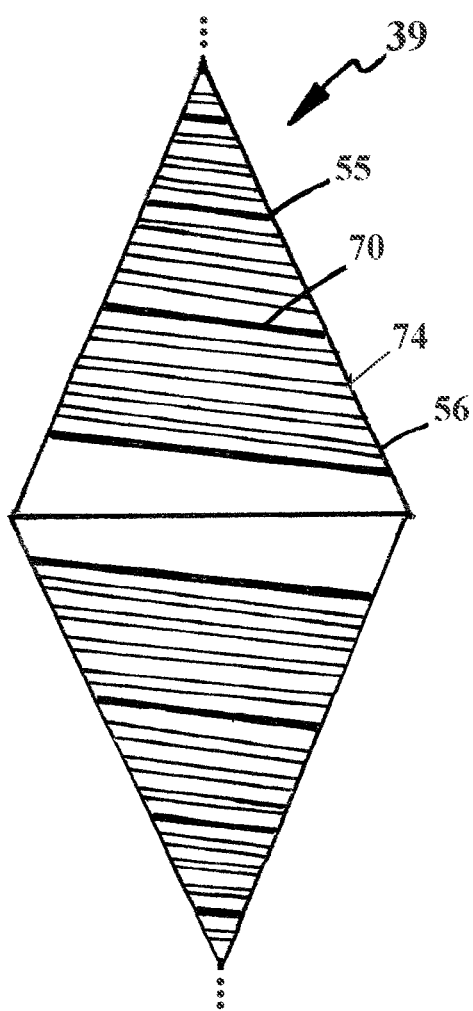
FIG. 29 shows a coil have two conical shapes.

Drawing FIG. 29 shows a three-dimensional coil 39 having two conical structures 74 each configured in at least one logarithmic spiral 70, a primary coil 55, and a secondary coil 56. The mass of the primary coil 55 and secondary coil 56 wires or conductive materials used to make the coil 39 can be made to be approximately the same. Further, the ratio of the length of the secondary coil 56 wire or conductive material to the primary coil 55 wire or conductive material can correspond to the golden ratio phi 1.61803 . . . /1, and in order to do this the relatively gauges of the wires or other conductive materials can be specifically selected. The direction of the electrical current or pulses in the primary coil 55 and secondary coil 56 can be engineered and configured to travel in the same direction, or alternatively the current or pulses can be configured to run in opposite directions in the primary coil 55 and secondary coil 56. The coil 39 can be part of a larger circuit 40 which is in communication with a receiver and harvesting device 20 which can include an antenna 21, diode 28, capacitor 30, transformer 42, battery 31, resistor 32 or other electronic device which can provide a load, and in partial or complete combination. Accordingly, a resonating circuit 40 generally similar to those which are disclosed herein can be configured and made to include a coil 39 having a phi geometry.

Figure 30:
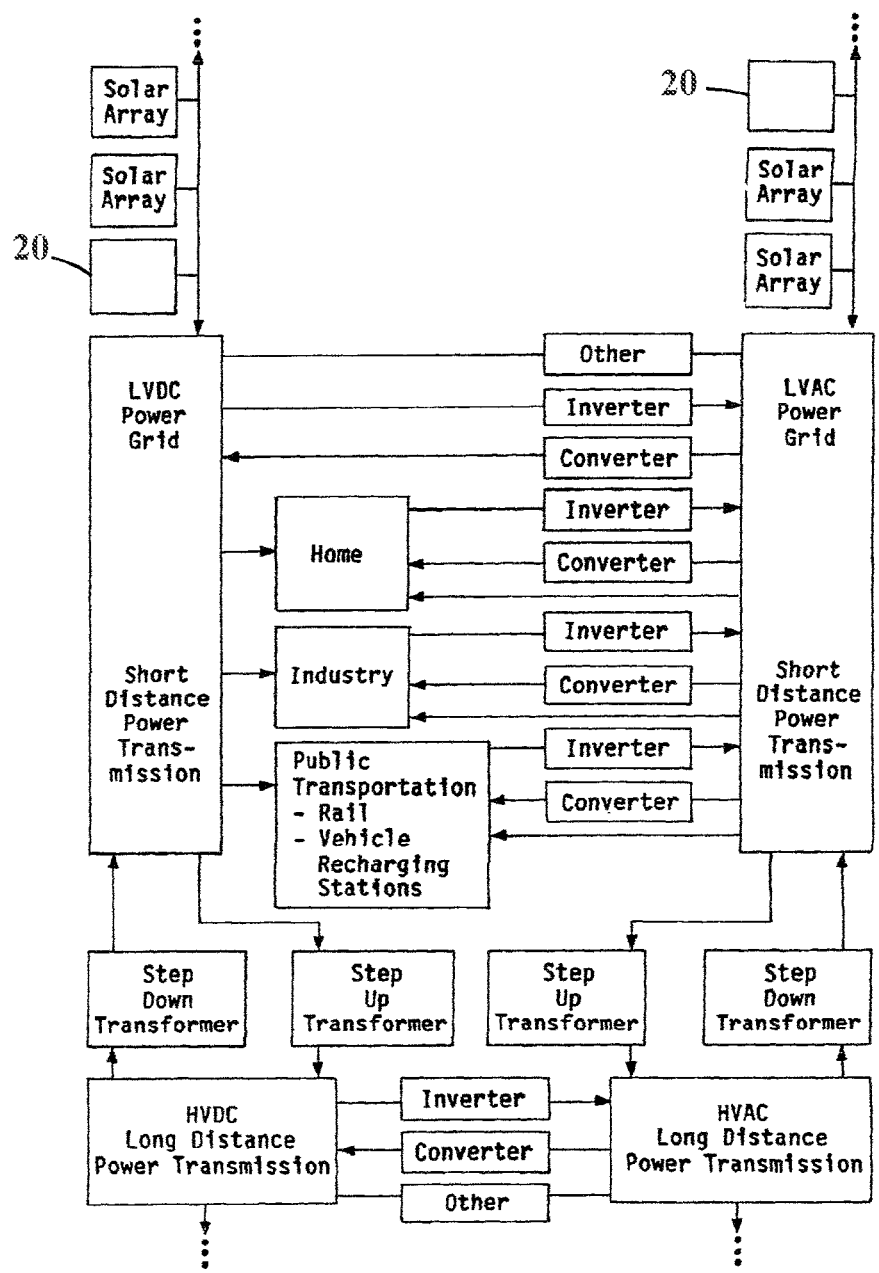
FIG. 30 shows a device for receiving and harvesting electrical energy from the terrestrial earth and its atmosphere connected to an electric power grid.

Drawing FIG. 30 shows a receiver and harvesting device 20 for receiving and harvesting electrical energy from the earth and its atmosphere connected to an electric power grid 67.

Electronic Controller, Timer, and Switch

The receiver and harvesting device 20 including an antenna 21 can be switched on and off to terrestrial earth 25 ground 24 with the use of an electronic switch 22 having a circuit 40t which includes a 555 IC, that is, a 555 integrated circuit timer chip, or the like, and in particular, a NTE 955 MC IC CMOS timer chip, hereinafter simply referred to as a "NTE 955" timer chip which has 8 pins. As shown in drawing FIGS. 31, 32, 43 and 44, when using a breadboard 95 including at least one circuit 40t or 40u to make and test an electronic switch 22 including a NTE 955 timer chip, the positive lead from a 9 Volt (V) battery is connected to the positive power supply bar 96, and the negative lead from the battery is connected to the negative ground bar 97 on the breadboard 95. The required voltage for a NTE 955 timer chip is typically at least 4.5 V and less than 15 V. In this regard, four AA or AAA batteries providing 6V or a single 9V battery can be used. The NTE 955 timer chip, pin 1, is connected to the negative ground bar 97 on the breadboard 95. The NTE 955 timer chip, pin 2, is the trigger and causes the output pin 3 to be energized when its voltage drops below one third of the supply voltage, and pin 2 is connected to capacitor C1 on the side closest to the connection with pin 6. When using a typical 555 timer chip, it could possibly be useful to include a small capacitor C2 having a value of 0.1 microfarads (μF) between pin 1 and pin 2 of the 555 timer chip in order to level out any fluctuations in the supply voltage which could affect its operation, but this is typically not required when using a NTE 955 timer chip. The NTE 955 timer chip, pin 3, is the output pin, and it is connected to the gate of a MOSFET transistor such as a NTE 2395 MOSFET or NTE N 7000 MOSFET N-channel transistor. The NTE 955 timer chip, pin 4, is the reset pin which is used to restart the NTE 955's timing circuit and it is connected to the positive power supply bar 96 on the breadboard 95. The NTE 955 timer chip, pin 5, is the control pin, and it can be left unconnected, or alternatively, it can be connected to a small 0.01 μF capacitor C3 that goes to the negative ground bar 97 on the breadboard 95 and can then serve to level out any fluctuations in the supply voltage which could affect the operation of the NTE 955 timer. The NTE 955 timer chip, pin 6, is the threshold pin and its purpose is to monitor the voltage across the capacitor C1 that is discharged by pin 7. In this regard, when the voltage reaches two thirds of the supply voltage the timing cycle ends and the output on pin 3 goes low. The NTE 955 timer chip, pin 7, is connected to resistor R1 which is connected to the positive bar 96 on the breadboard 95. Resistor R2 is connected between resistor R1 and capacitor C1 on their sides which are closest to pins 6 and 7 of the NTE 955 timer chip. The possible use of a diode D1 connected between resistor R1 and capacitor C1 on their sides which are closest to pins 6 and 7 of the NTE 955 timer chip can double the frequency of the output of the NTE timer chip on pin 3. Diode D1 can be a NTE 583 Schottky diode. The NTE 955 timer chip, pin 8, is connected to the positive power supply bar 96 on the breadboard 95.

The NTE 955 timer chip is then configured to operate in what is called astable mode, and the selections made with regards to the values of capacitor C1, resistor R1, and resistor R2 can determine the period and frequency of the duty cycle, that is, the period and frequency of the oscillation of the astable circuit and its switching, and the amount of time the output pin 3 will provide electrical energy and then be high or on, and also the time the output pin 3 will be low or off. In this regard, the webpage entitled Ohmslawcalculator.com/555-astable-calculator, and also the webpage entitled bowdenshobbycircuit.infor/555.htm provide calculators for determining what combination of values for capacitor C1, resistor R1, and resistor R2 will provide different period and frequency of duty cycles and including the amount of time the output will be high or on and low or off. In this regard, capacitor C1 is connected between the negative ground bar 97 of the breadboard 95 and pin 6 of the NTE 955 timer chip. Increasing the capacitance value of capacitor C1 will increase the cycle time and hence decrease the output frequency. Resistor R1 is connected between the positive supply bar 96 and is connected to resistor R2 and then also to pin 7 of the NTE 955 timer chip. Resistor R1 can have a value of 4.67 KiloOhms (KΩ) or 51 KΩ, or other selected values. In this regard, increasing the value of resistor R1 will increase the time high, but leave the time low unaffected. Resistor R2 is connected on one end between resistor 1 before it is in communication with pin 7 and on its other end between capacitor 1 before it is in communication with pin 6 of the NTE 955 timer chip. Resistor R2 can have a value of 51 KΩ, or other values. In this regard, increasing the value of resistor R2 will increase time high, and increase time low and decrease the duty cycle down to a minimum of 50%. For example, a combination of a resistor R1 having a value of 4.67 KΩ, and a resistor R2 having a value of 51 KΩ, and capacitor C1 having a value of 1.727 μF will produce an oscillating or switching frequency of about 7.833 Hz which is the approximate average value of Schumann resonance. A combination of resistor R1 having a value of 4.67 KΩ, and resistor R2 having a value of 51 KΩ, and capacitor C1 having a value of 1 μF will produce a switching frequency of about 13 Hertz (Hz). If desired, a diode D1 such as a NTE 583 Schottky diode can be connected between resistor R1 and capacitor C1 on the sides proximate pins 7 and 6 of the NTE 955 timer chip, and this can serve to double the provided switching frequency, e.g., from 13 Hz to 26 Hz. A combination of resistor R1 having a value of 4.67 KΩ, and resistor R2 having a value of 51 KΩ, and capacitor C1 having a value of 0.1 μF will produce a switching frequency of about 135 Hz. A combination of resistor R1 having a value of 4.67 KΩ, and resistor R2 having a value of 51 KΩ, and capacitor C1 having a value of 0.01 μF will produce a switching frequency of about 1,350 Hz. A combination of resistor R1 having a value of 4.67 KΩ, and resistor R2 having a value of 51 KΩ, and capacitor C1 having a value of 0.001 μF will produce a switching frequency of about 13.5 KHz.

Figure 31:
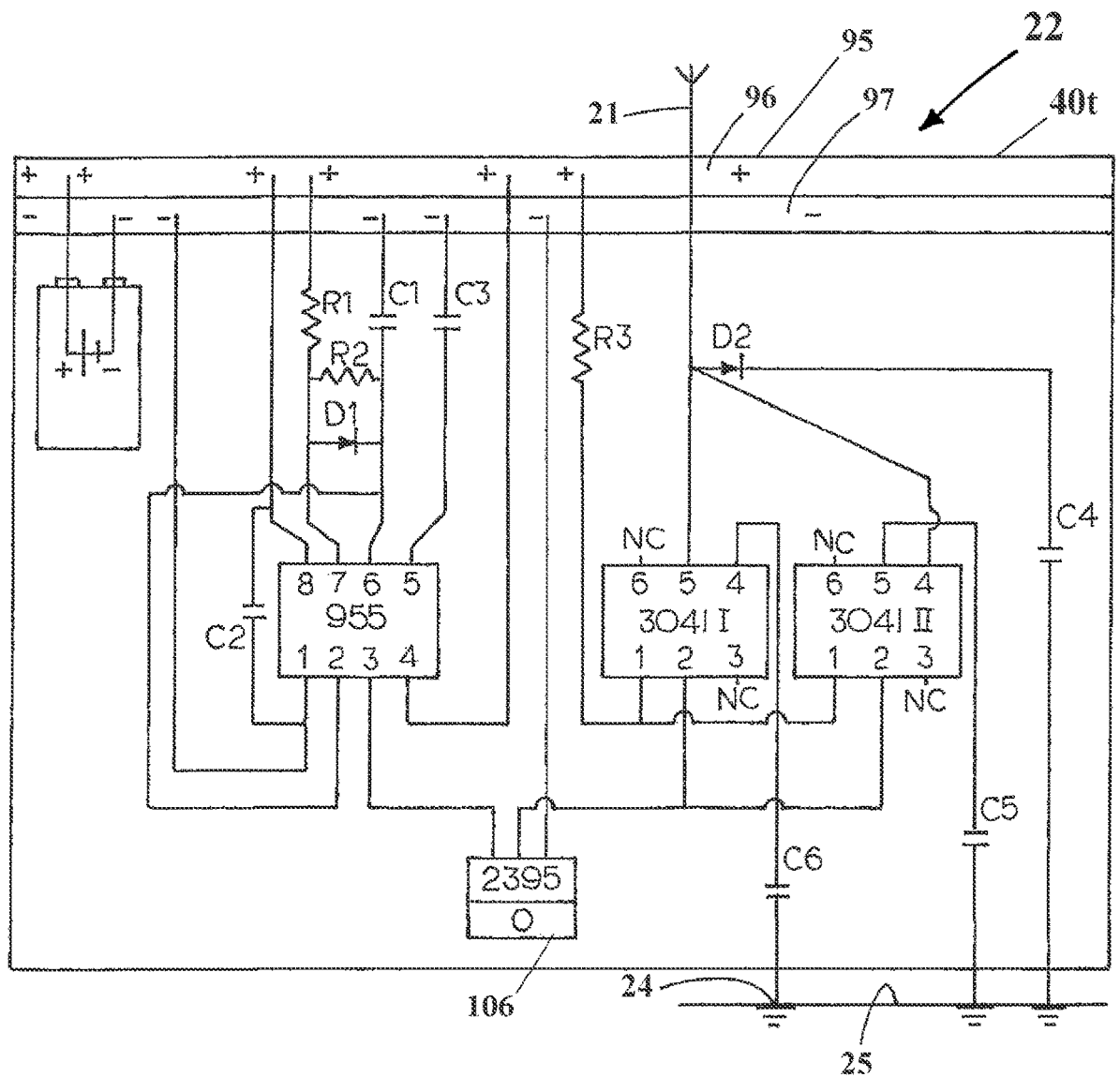
FIG. 31 shows a timer circuit for use in a device for receiving and harvesting energy.
Figure 32:
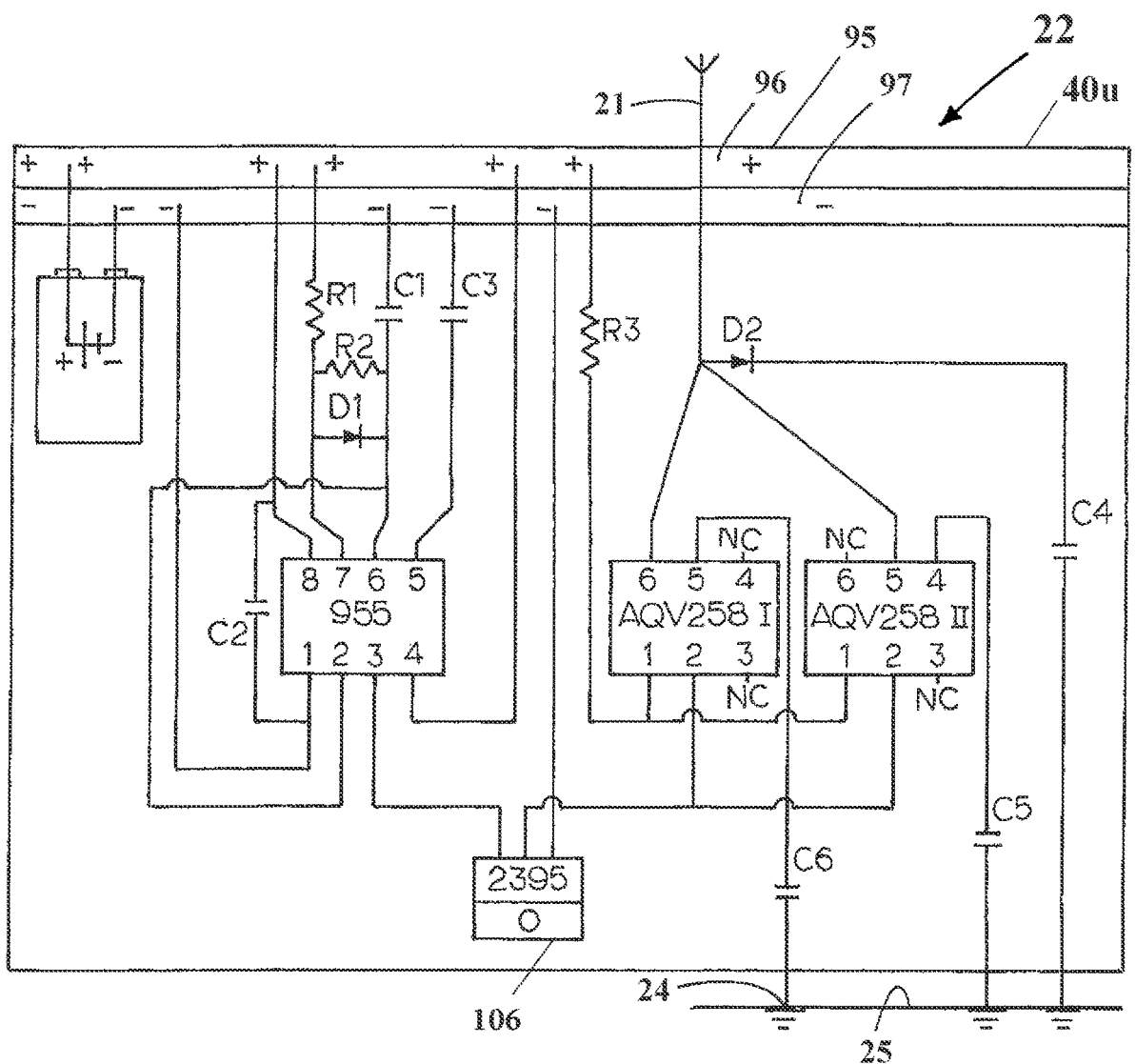
FIG. 32 shows an alternative timer circuit for use with a device for receiving and harvesting energy.

If desired, the output pin 3 can be connected to a resistor R4 having a value between 470 K-2 KΩ which can permit a small LED light to be powered before the transistor 106, which can be an NTE 2395 as shown in drawing FIGS. 31 and 32, receives power for the purpose of providing a visual display of switching frequency. However, this is not required and is typically not advisable when the switching frequency during operation is going to be high because the LED light will draw energy and then also appear to be constantly on. For this reason, pin 3 of the NTE 955 timer chip is typically connected to the gate or base of the transistor 106 which is indicated as being an NTE 2395 in drawing FIGS. 31 and 32. Suitable transistors for use can be a NTE 2N 7000 MOSFET, or NTE 2395 MOSET, and other suitable transistors can be used. With a NTE 2N 7000 MOSFET transistor 106, when the flat face of the transistor is facing the observer, the source or collector pin is on the left, the gate or base pin is in the middle, and the drain or emitter pin is on the right. With a NTE 2395 MOSFET transistor 106, when the side including the projecting body of the transistor 106 is facing the observer, the gate or base is on the left, the drain or emitter is in the middle, and the source or collector is on the right. As shown in drawing FIG. 31 the source or collector of the transistor 106 is connected to the negative ground bar 97, and the drain or emitter is connected to the negative cathode pin 2 of the two NTE 3041 opto-isolators, number 1 being indicated by Roman numeral I, and number 2 being indicated by Roman numeral II in circuit 40t. Alternatively, as shown in circuit 40u shown in drawing FIG. 32, the source or collector of the transistor 106 is connected to the negative ground bar 97, and the drain or emitter is connected to the negative cathode pin of the two Panasonic AQV258 PhotoMOS HE isolators, hereinafter simply referred to as the Panasonic AQV258 I and AQV258 II. As shown in drawing FIG. 43 the source or collector of the transistor 106 is connected to the negative ground bar 97, and the drain or emitter is connected to the negative cathode pin 2 of the single NTE 3041 opto-isolator, number 1, being indicated by a Roman numeral I in circuit 40x. As shown in drawing FIG. 44 the source or collector of the transistor 106 is connected to the negative ground bar 97, and the drain or emitter is connected to the negative cathode pin 2 of the single Panasonic AQV258 I opto-isolator, number 1, being indicated by a Roman numeral I in circuit 40y.

With reference to drawing FIG. 31, when the NTE 955 timer chip, pin 3, sends electric power to the gate of the transistor 106 the path to the negative ground bar from the cathode pins 2 of the NTE 3041 opto-isolators will be switched on and the NTE 3041 opto-isolators will then be able to close the circuit between their pins 4 and 5. Resistor R3 can have a value of 620Ω and is connected between the positive supply bar 96 and anode pins 1 of the two NTE 3041 opto-isolators. The optocouplers which are sometimes also called or known as opto-isolators, photocouplers, or optical isolators are used because they can permit complete oscillation or switching between on and off with little or no forward bias being present. In this regard, most transistors do not completely switch off, but rather will maintain a small positive forward voltage, and this can compromise being able to completely switch to and from terrestrial earth 25 ground 24. The NTE 3041 opto-isolators include an NPN transistor which behaves as diode between pins 4 and 5 and which faces pin 4, thus current typically flows only in the direction from pin 5 to pin 4. When the antenna 21 is connected to the NTE 3041 opto-isolator, number I, an electric pulse and/or current coming from the antenna 21 can be caused to pass between pin 5 to pin 4 and then to terrestrial earth 25 ground 24. However, if the traditional model of electricity which focuses on particles would possibly be more accurate to use here than the modern model of electricity which focuses more on pulses, waves, and changes in the electrical and magnetic fields, then negative ions, cations, or electrons from terrestrial earth 25 ground 24 would possibly not then able to readily pass backwards from terrestrial earth 25 ground 24 through pin 4 to pin 5 and then to the top end of the antenna 21 because of the NPN transistor which also behaves like a diode. For this reason, a second NTE 3041 opto-isolator, number II, is used in drawing FIG. 31 and terrestrial earth 25 ground 24 is then connected to pin 5 which can be placed in communication with pin 4 which in turn is connected at or proximate to the bottom end 34 of the antenna 21. In this way, NTE 3041 opto-isolator number I will permit positive ions or cations and protons in the antenna 21 to have a path to terrestrial earth 25 ground 24 when it is switched on, and NTE 3041 opto-isolator number II will permit negative ions or anions and electrons associated with terrestrial earth 25 ground 24 to have a path to the bottom end 34 or proximate the low end of the antenna 21 and then also continuing to the top end of the antenna 33. Because a typical breadboard 95 includes electrically conductive metal which bridges a plurality of openings for making multiple electrical connections on vertical rows, and this conductive metal could possibly function as a short antenna, pins 4 and pins 5 of the two NTE 3041 opto-isolators are typically not connected to the openings and metal conductors on the breadboard, but rather they are connected directly to the wires or other electrical connections which go to the antenna 21 and/or terrestrial earth 25 ground 24, and their connections are then also covered or sealed and electrically isolated.

In this regard, when the NTE 955 timer circuit provides electric power to the gate of the transistor 106, the circuit through the anodes and cathodes of the NTE 3041 opto-isolators numbers I and II are closed and the lights or LEDs inside their opto-diodes turn on and this causes the connections between their pins 5 and pins 4 to close causing the antenna to be placed in communication with terrestrial earth 25 ground 24, and in particular, by the path which is provided by NTE 3041 opto-isolator, number II, from terrestrial earth 25 ground 24 to the antenna 21. At that moment, the electrical potential gradient 38 having a value of approximately 100 Volts that is normally located about three feet above the earth's surface is caused to suddenly jump up the length of the antenna 21 to a position about three feet above it because the antenna 21 has then effectively elevated the normal position of terrestrial earth 25 ground 24. When this takes place, a capacitor C5 connected between terrestrial earth 25 ground 24 and pin 5 on the NTE 3041 opto-isolator, number II, or alternatively between pin 4 of the NTE 3041 opto-isolator and the bottom end 34 of the antenna 21, can collect electrical energy. In this regard, there is always an abundant supply of negative charge associated with terrestrial earth 25 ground 24 and there is relatively little resistance between terrestrial earth 25 ground 24, capacitor C5, pins 5 and 4 of the NTE 3041 opto-isolator, number II, and the antenna 21. All things being equal, the greater the effective working surface area that exists near or at the top end of the antenna 33 for negative charge to be located and nest when the antenna 21 is connected to earth ground 24, and/or on other portions of the antenna 21 depending upon its design and structure, the more substantial will be the pulse and/or flow of negative charge from earth ground 24 through capacitor C5. Capacitor C5 can be used to measure and also store electrical energy which has then been collected. Alternatively, and/or in addition, a battery 31 can be used to store the electrical energy which can been collected. Alternatively, and/or in addition, a resistor 32 or other electrical device providing a load can be placed in communication with one or more of the diode D2, capacitor C5, battery 31, and terrestrial earth 25 ground 24, and this possibility is shown with resistor R5 in the drawing figures.

As described above, when the path between pins 4 and pins 5 of the two NTE 3041 opto-isolators, number I and number II are closed and the antenna 21 is then placed in communication with terrestrial earth 25 ground 24, positive electrical charge can suddenly be conducted down the antenna 21 through pin 5 and pin 4 of NTE 3041 opto-isolator, number I, and then through capacitor C6 to terrestrial earth 25 ground 24. Capacitor C6 can be used to measure and also store electrical energy which has then been collected. Alternatively, and/or in addition, a battery 31 can be used to store the electrical energy which can be collected. Alternatively, and/or in addition, a resistor 32 or other electrical device providing a load can be placed in communication with one or more of capacitor C6, battery 31, and terrestrial earth 25 ground 24, and this possibility is shown with resistor R6 in the drawing figures.

The normal concentration and density of positive ions and electrical charge in the atmosphere 26 can be relatively low and the resistance of ambient air in the atmosphere 26 near the surface of the terrestrial earth 25 can be relatively high and this can make the flow of positive charge from the antenna 21 to terrestrial earth 25 ground 24 through NTE 3041 opto-isolator number I, pins 4 and 5, and capacitor C6 to become relatively low shortly after the moment when this path to terrestrial earth 25 ground 24 is provided, that is, under normal circumstances when there is no ionization of the air, a corona, or a plasma condition present. Likewise, the flow of negative charge from terrestrial earth 25 ground 24 to the antenna 21 through NTE 3041 opto-isolator number II, pins 4 and 5, and capacitor C5 can be relatively low shortly after the moment when this path from terrestrial earth 25 ground 24 to the antenna 21 is provided, that is, under normal circumstances when there is no ionization of the air, a corona, or a plasma condition present. Accordingly, at the moment when the antenna 21 is switched on and is then in connection with terrestrial earth 25 ground 24, there will typically be a relatively large visible negative spike having a peak 101 and value associated with the electrical pulse and associated voltage and current when using and viewing the screen of an oscilloscope 68 which is then followed by less negative current flow while the NTE 3041 opto-isolators are still on, but then there will be another relatively large positive spike and peak 102 associated with an electrical pulse and associated voltage and current visible at the moment when the antenna 21 is disconnected from terrestrial earth 25 ground 24, as shown in FIG. 33.

In this regard, at the moment when the electric power to the gate or base of the transistor 106 coming from the NTE 955 timer chip, pin 3, is switched off, and the path between the drain or emitter and the source or collector of the transistor 106 is then caused to be open thereby interrupting the circuit between the power supply bar, the anode pins 1 and cathode pins 2 of the two NTE 3041 opto-isolators and the negative ground bar 97 on the breadboard 95, the two NTE 3041 opto-isolators will then be turned off since the path between their pins 5 and 4 will be caused to be open so that no current or pulse can be communicated between them. The two NTE 3041 opto-isolators are then effectively rendered inoperative and so cannot provide a path to or from the antenna 21 to terrestrial earth 25 ground 24. When this happens and the antenna 21 is no longer in communication with the terrestrial earth 25 ground 24, the 100 Volts gradient of electrical potential 38 that was temporarily elevated about 3 feet above the top end of the antenna 21 when it was still in communication with terrestrial earth 25 ground 24 will then suddenly drop down to its original position at about three feet above the surface of the terrestrial earth 25 and ground 24. This results in a sudden positive DC pulse and/or current to flow down the antenna 21 and through diode D2 and capacitor C4 and to terrestrial earth 25 ground 24. Capacitor C4 can be used to measure and also store electrical energy which has then been collected. Diode 2 can be a NTE 583 Schottky diode. Alternatively, and/or in addition, a battery 31 can be used to store the energy which can be collected. Alternatively, and/or in addition, a resistor 32 or other electrical device providing a load can be placed in communication with one or more of the diode D2, Capacitor C4, battery 31, and/or terrestrial earth 25 ground 24, and this possibility is shown with resistor R4 in the drawing figures.

The NTE 3041 opto-isolators are not rated to handle high voltages, and so they are best used with relatively small antennas 21 and receiver devices 20. However, the Panasonic AQV258 PhotoMOS HE, hereinafter simply referred to as the Panasonic AQV258, is a solid-state relay which includes an LED and it is rated to 1500 Volts (V) and 30 milliamp (mA). In this regard, two of the Panasonic AQV258 relays can be used in place of the NTE 3041 opto-isolators, but the circuit 40u configuration and wiring of the 6 pins which are included on the Panasonic AQV258 chips is different than the circuit 40t including the two NTE 3041 opto-isolators which have been shown in FIG. 31. As shown in drawing FIG. 32, with respect to the Panasonic AQV258 number I, the antenna 21 is instead connected to pin 6, and the lead from pin 5 is instead connected to capacitor C6 which is connected to terrestrial earth 25 ground 24, and with respect to the Panasonic ACV258, number II, the lead from terrestrial earth 25 ground 24 and capacitor 5 is instead connected to pin 4, and then pin 5 is instead connected to the bottom 34 or near the base of the antenna 21. With this being said, the function and operation of the NTE 955 timer chip, transistor 106, and the two Panasonic ACV258's with respect to switching the antenna 21 on and off from being in communication with terrestrial earth 25 ground 24 is similar to that described above with reference to the use of the NTE 3041 opto-isolators shown in drawing FIG. 31. Moreover, with reference to the circuits 40t and 40u shown in drawing FIGS. 31 and 32, at least one variable capacitor can alternatively be used in the position of C1 and/or at least one variable resistor can alternatively be used in the position of resistor(s) R1 and/or R2 in order to make the switching speed and frequency and/or the length of the dwell and duty cycle easy to manipulate and change as desired.

Figure 34:
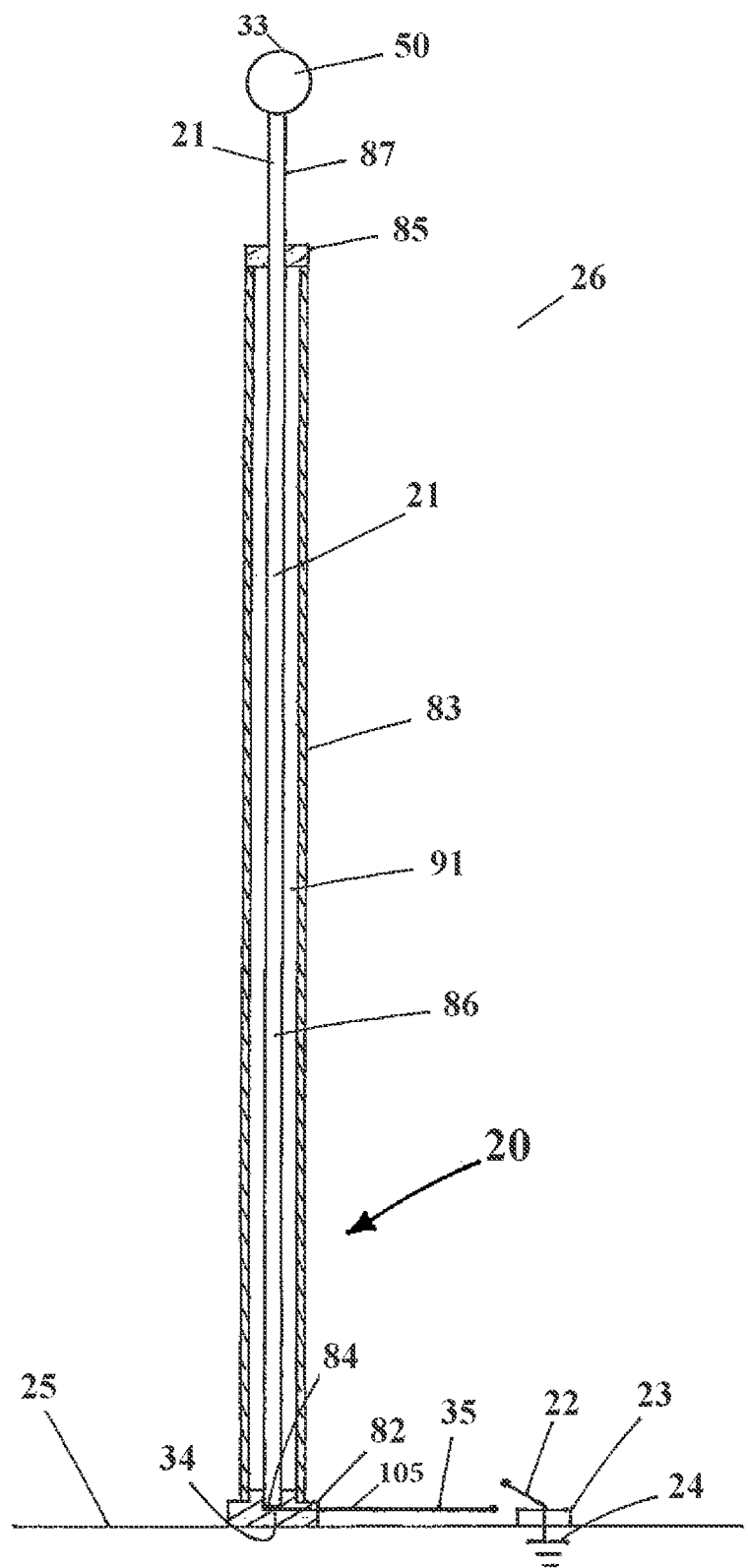
FIG. 34 shows a device for receiving and harvesting energy including an antenna that is substantially shielded and substantially isolated from terrestrial earth ground and also the atmosphere for most of its length, and a switchable connection to terrestrial earth ground.

When using a monopole antenna 21 having a structure which includes a top end 33 elevated approximately 8 feet above the ground similar to the one shown in drawing FIG. 34 is used with the circuit 40u including the Panasonic AQV258 relays shown in drawing FIG. 32, and then using a combination of capacitor C1 with resistor R1 and resistor R2 having values such as to provide a switching frequency of 133 Hz, capacitor C5 exhibited a positive peak 101 voltage was observed at the moment when the Panasonic AQV258 relays were switched off and the elevated 100 V gradient of electrical potential 38 suddenly dropped from about 3 feet above the 8 foot height of the antenna 31 back to about 3 feet above the surface of the terrestrial earth 25, as shown in drawing FIG. 33. At the moment when the Panasonic AQV258 relays were switched back on and the gradient of electrical potential 38 of 100 V at 3 feet was caused to be suddenly elevated to about 3 feet above the 8 foot high antenna 21, a negative peak 102 voltage was observed, as shown in FIG. 33. When using an oscilloscope 68, the typical output of positive and negative pulses will typically appear to be out of time and also out of phase as shown in drawing FIG. 33. In this regard, the screen 103 on an oscilloscope 68 can show two channels with channel one 98 corresponding to the electric power supply coming from the NTE 955 timing chip circuit and Panasonic AQV258 relay which has and appears in the form of a repeating square wave 100, and channel two 99 which shows a positive peak 101 voltage at the moment when the antenna 21 is switched off from communication with terrestrial earth 25 ground 24, and also a negative peak 102 voltage at the moment the antenna 21 is switched to be in electrical communication with terrestrial earth 25 ground 24.

At about the same time, capacitor C4 exhibited a positive peak 101 voltage having about half the value of the peak positive voltage observed at C5 at the moment when the Panasonic AQV258 relays were switched off and the elevated 100 V gradient of electrical potential 38 suddenly dropped from about 3 feet above the 8 foot height of the antenna 21 back to about 3 feet above the surface of the terrestrial earth 25, and then at the moment when the Panasonic AQV258 relays were switched back on and the gradient of electrical potential 38 of 100 V at 3 feet was caused to be suddenly elevated to about 3 feet above the 8 foot antenna 21, a negative peak 120 voltage was observed.

At about the same time, capacitor C6 exhibited a positive peak 101 voltage at the moment when the Panasonic AQV258 relays were switched off and the elevated 100 V gradient of electrical potential 38 suddenly dropped from about 3 feet above the 8 foot height of the antenna 21 back to about 3 feet above the surface of the terrestrial earth 25, and then at the moment when the Panasonic AQV258 relays were switched back on and the gradient of electrical potential 38 of 100 V at 3 feet was caused to be suddenly elevated to about 3 feet above the 8 foot antenna 21, a negative peak 102 voltage was observed.

At about the same time, when capacitor C4 was disconnected and only capacitor C5 and capacitor C6 were then being used, capacitor C5 exhibited a positive peak 101 voltage at the moment when the Panasonic AQV258 relays were switched off and the elevated 100 V gradient of electrical potential 38 suddenly dropped from about 3 feet above the 8 foot height of the antenna 21 back to about 3 feet above the surface of the terrestrial earth 25, and then at the moment when the Panasonic AQV258 relays were switched back on and the gradient of electrical potential 38 of 100 V at 3 feet was caused to be suddenly elevated to about 3 feet above the 8 foot antenna 21, a negative peak 102 voltage was observed. When an 8 foot antenna 21 which was made to be generally similar in configuration to the one shown in drawing FIG. 34 was replaced with an insulated wire having an exposed terminal end which was connected to a balloon that was elevated between 20-30 feet above the surface of the earth and terrestrial earth 25 ground 24, then higher peak voltage was observed. The relative values in this experiment were obtained without the use of a resistor 32 R4, R5, and R6 or other electrical load being used to draw voltage and current, that is, aside from conductive wires 35 being positioned between capacitors C4, C5, or C6 and terrestrial earth 25 ground 24.

Drawing FIG. 33 shows typical waves and pulses from an electrical energy receiver and harvesting device 20 including an antenna 21 which can appear on the screen 103 of an oscilloscope 68. Two channels are being shown on the screen 103, namely, a first channel 98 and a second channel 99. The first channel 98 shows a square wave 100 that is associated with electric energy being provided to the switch 22 and shows when it being turned on and is closed and is alternatively off and open with regards to being in electrical communication with terrestrial earth 25 ground 24. As shown in FIG. 33, depending upon the timer circuit being used, e.g., circuit 40t shown in FIG. 31, circuit 40u shown in FIG. 32, circuit 40x shown in FIG. 43, or circuit 40y shown in FIG. 44, and where the leads of an oscilloscope are placed relative to the timer circuit there is typically a spike peak 101 when the switch 22 is turned off and the antenna is then isolated from terrestrial earth 25 ground 24, and then another spike peak 102 when the switch 22 is turned on and the antenna 21 is placed in communication with terrestrial earth 25 ground 24. In drawing FIG. 33, the first spike peak 102 is positive, and the second spike peak 103 is negative.

As shown in drawing FIG. 34, an electrical energy receiver and harvesting device 20 can include an antenna 21 including an electrically conductive structure such as a rod 86 or wire 35 that is electrically isolated from the atmosphere 26, except for a possible exposed shaft portion 87 which is at or near the top end 33 of the antenna 21 and/or a desired geometric object which is disposed on the top end 33 of the antenna 21. The top end 33 of an antenna 21 can include a sphere 50 or a toroid 51, or other geometric shape, and can be configured in a phi geometry and/or fractal configuration such as those shown in drawing FIGS. 24-26, and/or a Mandelbrot set to configure a Mandelbrot antenna 21. The electrically conductive structure, e.g., a rod 86 or wire 35 can be electrically isolated from the outer jacket or antenna container 83 by at least one of an isolator plug 85, an isolator base 82, and isolator material or portion 91, and this is shown with parts being broken away and/or what is sometimes called an x-ray view in drawing FIG. 34, and likewise in drawing FIGS. 40, 48, 50, and 53-55. The isolator material or portion 91 can be a captive gas such as SF6, a vacuum, or a non-conductive tube of plastic or other electrically non-conductive material. The bottom end 34 of the antenna 21 can include an electrical connection 84 to a wire 35 or other electrical conductor which leads to a switch 22. In this regard, the wire 35 is typically electrically isolated with a layer of insulation 105 except for its connection point 84 with the bottom 34 of the antenna 21, and the switch 22, and these connection points are then also typically covered with a material which provides for electrical insulation from the atmosphere and terrestrial earth. In this regard, with the exception of the top end 33 of the antenna 21, and other related structures such as the possible inclusion of nanowires which are exposed at a desired vertical elevation above the surface of terrestrial earth 24 ground 25 as shown, e.g., in drawing FIGS. 35 and 48, the rest of the antenna 21, connecting wires 35, and switch 22 which can include an electrical controller including an integrated circuit and speed control 23, can be substantially or completely covered or encapsulated with a non-conductive and electrically insulating material using, e.g., potting compounds, glob tops, and molding encapsulates which can be made of acrylic, elastomers, compounds, epoxy, polyurethanes, polyesters, polyamides, silicones, resins, rubber, thermosets, thermoplastics, and some of the aforementioned materials can be cured using room temperature vulcanization, or visible and/or ultraviolet light. ASTM F641 provides a standard specification concerning implantable epoxy electronic encapsulants. Companies which can provide such materials and/or services include 3M, Henkel Adhesives, Geospace, Loctite, the Lord Corporation, Panacol, and the Robert McKeowne Company, Inc. Further, it can be readily understood by a person of ordinary skill in the electrical art field that a switch 22 typically includes structure and means for electrically isolating its electrically conductive contact points from one another and also the surrounding environment, as can be desired and required. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. In this regard, one example of a variable resister is a potentiometer, and one example of a variable capacitor is an air capacitor. With reference to the embodiment of a receiver device 20 shown in drawing FIG. 34, can be readily understood that a circuit selected from circuits 40*a-i* and 40*k-w* shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom side or end 34 of the antenna 21, and/or a switch 22, and terrestrial earth 25 ground 24. Further, the switch 22 can be made using at least a portion of one of the electronic timer circuits 40*t*, 40*u*, 40*x*, and 40*y* shown and discussed in drawing FIGS. 31, 32, 43, and 44, respectively.

Figure 35:
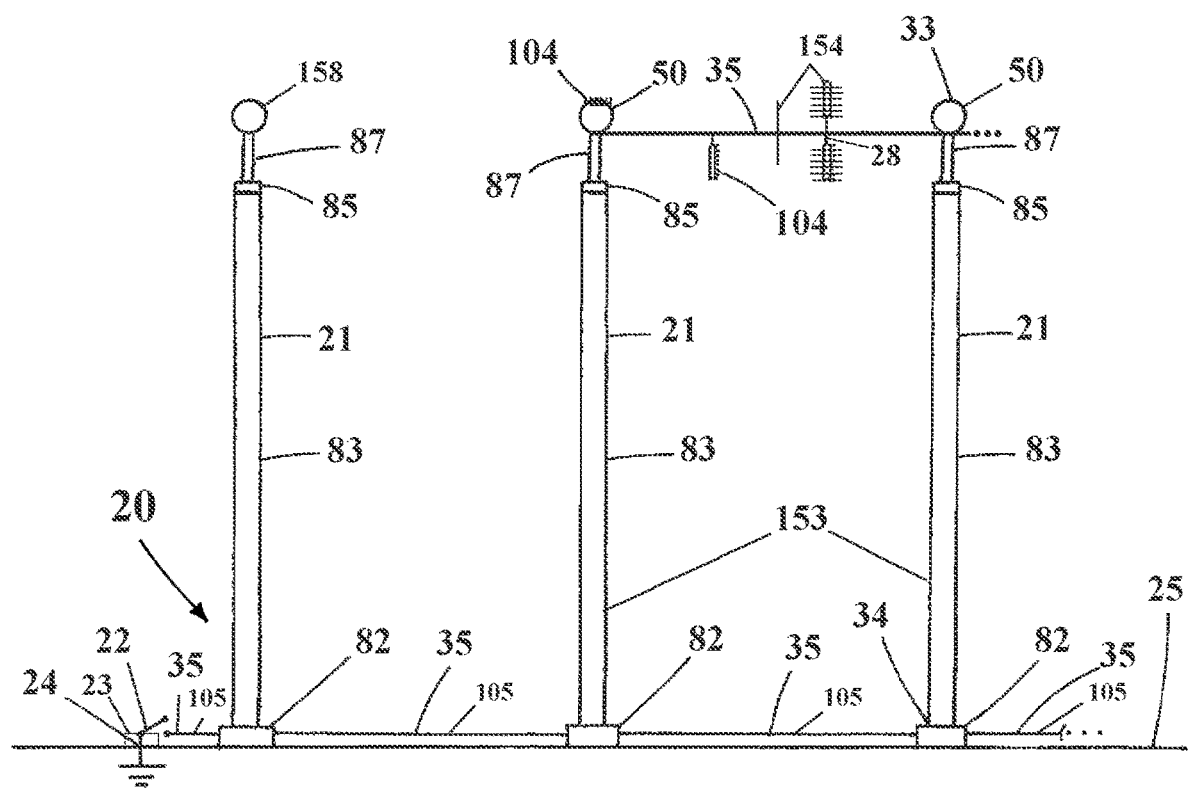
FIG. 35 shows a device for receiving and harvesting energy including plurality of antennas generally similar to the one shown in Drawing FIG. 34 connected in a series, and a switchable connection to terrestrial earth ground.

As shown in drawing FIG. 35, an energy receiver and harvesting device 20 can include a plurality of antennas 21 generally similar to the one shown in drawing FIG. 34, or other ion collecting structures which are connected either in a series or parallel using an electrically conductive structure or wire 35 and then be caused to alternate between being in a state of isolation from terrestrial earth 25 ground 24 and being in communication with terrestrial earth 25 ground 24 with the use of a single switch 22. The symbol for an ellipses ( . . . ) is here used to indicate that the number, series and/or length of the antenna structures can be made larger and continued. Again, the electrically conductive structure or wire 35 is typically electrically isolated except for its connection points 84 with the bottom end 34 of the antennas 21, and the switch 22, and as previously discussed above, these connections and other desired portions of the receiver and harvesting device 20 can also be covered and/or encapsulated with an electrically insulating material using, e.g., potting compounds, glob tops, and molding encapsulates which can be made of acrylic, elastomers, compounds, epoxy, polyurethanes, polyesters, polyamides, silicones, resins, rubber, thermosets, thermoplastics, and some of the aforementioned materials can be cured using room temperature vulcanization, or visible and/or ultraviolet light. ASTM F641 provides a standard specification concerning implantable epoxy electronic encapsulants. Companies which can provide such materials and/or services include 3M, Henkel Adhesives, Geospace, Loctite, the Lord Corporation, Panacol, and the Robert McKeowne Company, Inc. It can be readily understood by a person of ordinary skill in the electrical art field that a switch 22 typically includes a structure and configuration and means for electrically isolating its electrically conductive contact points from one another and also the surrounding environment, as can be desired and required. The switch 22 can include a device and means for providing a variable speed control 23, as previously discussed in this specification and such could possibly include a 555 or 955 timer integrated circuit having at least one variable capacitor in the position of C1 and/or at least one variable resistor in the position of R1 and/or R2. In addition, the exposed portion of the antenna shaft 87 and/or top ends 33 of two or more antennas 21 can be placed in electrical communication with an elevated electrically conductive structure or wire 35 and one or more electrically conductive nanostructures 104 or nanowires 93 can be connected to the wire 35 and/or to the top 33 of the antenna 21 which can include a sphere 5, toroid 51, a loop 158, at least one dipole 154 or other geometric shape. FIG. 35 shows both a simple dipole 154 antenna 21 structure, but also more complex one which includes a plurality of dipole 154 antenna 21 structures. In this regard, it is possible for a dipole structure to be made in a phi configuration, and further a dipole 154 structure can be made in a phi fractal configuration and/or a Mandelbrot set. A dipole 154 antenna 21 structure can include a plurality of nanostructures 104 and/or nanowires 93. The suspended wire 35 is typically not insulated in this location, and can include electrically conductive nanostructures 104 or nanowires 93 can be made of an electrically conductive metal including a plurality of points and/or nesting places for ions, an electrically conductive textile, e.g., a woven or a nonwoven material such as a felt, which includes a plurality of points and/or nesting places for ions which includes an electrically conductive metal, e.g., nickel, copper, aluminum, silver, gold, or alternatively the nanostructures 104 or nanowires 93 can be made of an electrically conductive material such as carbon fiber, or other carbon based materials such as graphene. The electrically conductive nanostructures 104 or nanowires 93 can possibly be in electrical communication with a diode 28 for rectification of electrical energy, and/or at least one permanent magnet to which a plurality of electrically conductive spike shaped or pointed conductive particles such as iron oxide or graphene are attached. Further, a radioactive material 116 such as technetium, promethium, polonium, radium, actinium, thorium, protactinium, uranium, neptunium, plutonium, americium, curium, berkelium, californium, or einsteinium can be located proximate to and/or be coated or otherwise disposed upon one or more of the electrically conductive nanostructures 104 or nanowires 93 in order to increase the local production of ions and/or lower the local breakdown voltage of gases which are present in the atmosphere. The reasons for including an electrically conductive nanostructure 104 or nanowires 93 having a plurality of pointed structures are discussed in more detail below in the section on breakdown voltage, corona, and plasma. Further, the bare elevated wire 35 which extends between the antennas 21 can be made of a non-ferrous or alternatively a ferrous metal such as steel piano wire which is made and widely available for use in many different gauges. The possibility of oxidation or corrosion can possibly increase the effective working surface area of the wire 35 and/or increase the relaxation time, i.e., the time it takes for an electric field and/or magnetic field associated with a voltage, current, or pulse of electrical energy to move from being predominantly communicated inside of the core of a wire 35 and instead become communicated to a larger degree on or about its surface in what is known as the skin effect. In this regard, a wire or other conductor which is made of multiple strands can also possibly provide a more substantial skin effect. In addition, the top 33 of the antenna 21 which can be sphere 50 or other geometric shape and/or the shaft 87 of the antenna 21 can be made of a ferrous metal such as steel. In this regard, the use of ferrous metal can have an influence upon the magnetic field which can be present and/or generated in and about an antenna 21, and in particular, an antenna 21 which includes or is in electrical communication with a coil 39 or other form of inductor which can serve to create or increase the magnetic field which is present. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. With reference to the embodiment of a receiver and harvesting device 20 shown in drawing FIG. 35, can be readily understood that a circuit selected from circuits 40*a-i* and 40*k-w* shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21, and/or a switch 22, and terrestrial earth 25 ground 24. Further, the switch 22 can be made using at least a portion of one of the electronic timer circuits 40t, 40u, 40x, and 40y shown and discussed in drawing FIGS. 31, 32, 43, and 44, respectively.

Breakdown Voltage, Corona, and Plasma

Ambient air is typically a good resistor, that is, it has a high resistance value, and so it can possibly be advantageous for the antenna 21 or other ion, electron, and electric charge collection structure or device to generate or otherwise take advantage of a corona and/or plasma state because in these states ambient air becomes much more conductive. This can permit more electrical energy to be collected and harvested per unit time and then be stored in a capacitor 30, a battery 31, and/or be used to provide electrical power to a resistor 32 or other electrical device which provides a load. The gradient of electrical potential 38 at 3 feet above the surface of the terrestrial earth 25 at sea level is about 100 Volts and increases with greater altitude above the terrestrial earth 25 such that at about 50,000 meters above the terrestrial earth 25 the ionosphere is highly if not perfectly conductive. For a detailed discussion of this phenomenon, see Chapter 20, entitled "Atmospheric Electricity" by R. C. Sagalyn, H. K. Burke, and D. R. Fitzgerald, which can be found on the Internet by searching for the title Atmospheric Electricity and the website https://www.ngdc.noaa.gov/stp/space-weather/online . . . , and also see Chapter 9, Electricity in the Atmosphere, by Richard Feynman, from the Feynman Lectures on Physics, which can also be found on the Internet by searching for the website https://www.feynmanlectures.caltech.edu . . . . According to the data of F. W. Peek, Jr. which is provided in his book "Dielectric Phenomenon," published by McGraw-Hill Book Company, The Maple Press, York, PA, 1920, page 124, the sphere gap spark over voltage required when using two 25 centimeter (cm) spheres separated by 0.5 cm/5 millimeters (mm)/0.197 inches is 11 kV, and as discussed therein on page 87, the needle gap spark over voltage require when using two No. 00 needles separated by 1.19 cm is 10 kV. This makes clear that it takes less voltage to spark over between two pointed needle like structures than two annular shaped structures. One question is whether the spark over voltage would have been only about 5 kV if the needles had been separated by only 0.5 cm/5 mm/0.197 inches instead of 1.19 cm. According to the article "Corona Discharge" which can be found on Wikipedia.com, "on sharp points in air, corona can start at potential of 2-6 kV." According to Professor Suna Bolat Kroger of the Department of Electric & Electronic Engineering, Eastern Mediterranean University, in the article entitled "High Voltage Breakdown Phenomenon," which can be found on the website, https://faraday.emu.edu.tr/eeng451/HIGH%20VOLTAGE-%20L8-BreakdownBehaviour4cylinder.pdf, in stormy weather, the greater number of ions present in the air can also cause the required voltage to produce corona and cause the breakdown voltage to be decreased to 80% of the fair-weather value. In this regard, the Applicant has found at some peril that over 10 times the amount of electrical energy can sometimes be collected by an antenna 21 and receiver device 20 when it begins to rain during a storm, and this is due to the greater number of ions which are then present and higher conductivity of the air. Plasma conditions can be associated with electron particle waves, and ion acoustic waves, e.g., see the USYD—Senior Plasma Physics Lecture series: https://youtu.be/zi5N5FLh4Bg. In addition, see the following lecture on breakdown voltage in air entitled "8.20x—Lect 6—High-voltage Breakdown, Lightning, Sparks, . . . " by Walter Lewin at MIT which can be found on the website: https://youtu.be/ww0XJUqFHXU. This lecture provides the following information relating to breakdown voltage and how to make approximate calculations of the breakdown voltage associated with anodes and cathodes which are separated by various distances. In this regard, an irregularly shaped solid object will have a higher surface charge density on those locations which are more pointed. Given dry air at room temperature an electron will have to travel about 1 micron (μ) which is 1000 nanometers (nm) in order to have a collision. Two of the main gases present in ambient air are oxygen and nitrogen. In order to ionize oxygen O2, 12.5 electron Volts (eV) are required, and in order to ionize Nitrogen N2, 15 eV are required. 1 eV=1.6×10 to the minus −19 Joules (J). Accordingly, a very strong electric field of about 3 million Volts per meter is normally required to cause breakdown of ambient air. When two parallel plates are separated by $\frac{1}{10}^{th}$ of a mm (one millimeter is 1,000,000 nanometers and so $\frac{1}{10}^{th}$ of a mm is 100,000 nanometers) an electrical potential of 300 V is required for automatic breakdown and a constant discharge to take place between the two plates, but it is typical for breakdown to occur at a little greater distance because of surface imperfections in the plates. If a nano gap device would include anode and cathode spheres that would be separated by approximately 82.6 nanometers (nm), then the required voltage to cause a corona effect or breakdown could possibly be even less than 1 V, and approximately 0.2478 V. In this regard, it is possible with the use of electrically conductive nanostructures 104 or nanowires 93 to reduce the breakdown voltage required to cause a corona effect and/or plasma condition.

If a nanostructure 104 or nanowire 93 array includes a cathode with columns having a diameter of approximately 200 nm and a height between 500 and 1000 nm with the individual columns of the cathode being separated from one another by approximately 400-600 nm, and the opposing anode surface is flat, and the cathode and anode surfaces are separated by 50 microns or 50,000 nm, then the required voltage to cause a corona effect or breakdown is approximately 150 V.

If a nanostructure 104 or nanowire 93 array includes a cathode with columns having a diameter of approximately 200 nm and a height between 500 and 1000 nm with the individual columns of the cathode being separated from one another by approximately 400-600 nm, and the opposing anode surface is flat, and the cathode and anode surfaces are separated by 20 microns or 50,000 nm, then the required voltage to cause a corona effect or breakdown is approximately 60 V.

If a nanostructure 104 or nanowire 93 array includes a cathode with columns having a diameter of approximately 200 nm and a height between 500 and 1000 nm with the individual columns of the cathode being separated from one another by approximately 400-600 nm, and the opposing anode surface is flat, and the cathode and anode surfaces are separated by 10 microns or 10,000 nm, then the required voltage to cause a corona effect or breakdown is approximately 30 V.

If a nanostructure 104 or nanowire 93 array includes anode and cathode columns having a diameter of approximately 200 nm and a height between 500 and 1000 nm and these individual columns of the anodes and cathodes are separated from one another by approximately 400-600 nm, and the opposing anode and cathode surfaces are separated by 600 nm, then the approximate required voltage to cause a corona effect or breakdown is approximately 1.8 V.

If a nanostructure 104 or nanowire 93 array includes anode and cathode columns having a diameter of approximately 200 nm and a height between 500 and 1000 nm and these individual columns of the anodes and cathodes are separated from one another by approximately 400-600 nm, and the opposing anode and cathode surfaces are separated by 400 nm, then the required voltage to cause a corona effect or breakdown is approximately 1.6 V.

However, the actual shape of the top portion of these columns can be pointed and so there would typically be greater local surface charge, and so the required breakdown voltage to cause a corona effect or plasma condition is less than the above values, and typically only about one third of those values. Such a nanostructure 104 or nanowire 93 cathode array material can be made and obtained from the InRedox company located in Longmont, Colorado. Further, it is possible to cause what is called a Townsend discharge or Townsend avalanche which is a gas ionization process where free electrons are accelerated by an electric field, and then collide with gas molecules and then free other electrons. Those electrons are then also accelerated and free additional electrons. This exponential avalanche multiplication can permit electrical conduction through a gas or mixture of gases such as ambient air.

Figure 36:
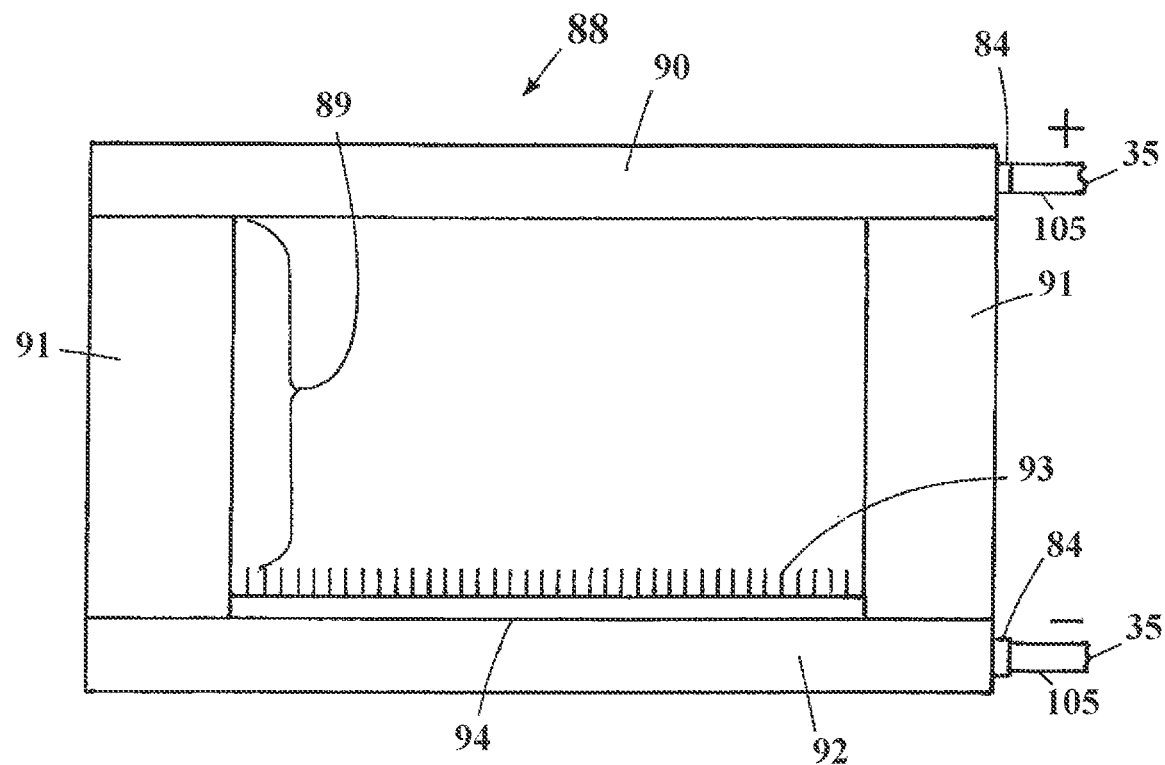
FIG. 36 shows an ion generator including electrically conductive nanostructures or nanowires and an anode and a cathode for use with a device for receiving and harvesting energy.

Drawing FIG. 36 shows an ion generator 88 for possible use with and/or in a receiver and harvesting device 20 which includes a nano gap 89 for producing sufficient electrical breakdown for inducing a corona effect and/or plasma condition in ambient air, individual gases, or a select combinations of gases. Alternatively, an ion generator 88 including a nano gap 89 can be used in liquid fluids to cause the separation of electrons from atoms and/or complex molecules. In this regard, an ion generator 88 can then be used for electrolysis and include inert precious metals like platinum, iridium, and gold, and/or other less inert metals such as silver, nickel, copper, aluminum, and iron on its anode and cathode in order to cause individual elements or molecules to be separated and harvested, e.g., the electrolysis of water into hydrogen and oxygen. In this regard, see the following patents regarding the electrolysis of water and/or the combustion of hydrogen and oxygen fuel mixtures: U.S. Pat. Nos. 2,006,676, 3,262,872, 3,980,053, 4,014,777, 4,107,008, 4,124,463, 4,394,230, 4,726,888, 5,087,089, 5,089,107, 5,178,118, 5,399,251, 5,852,993, 6,119,651, 6,790,324, U.S. 20220290317A1, EP 90306988.8, EP 1043425 A1, and, UK 2,324,307, and all of these patents and patent applications are hereby incorporated by reference herein. As shown in drawing FIG. 36, the ion generator 88 includes a nano gap 89 and a flat positive anode 90 which can be made of an electrically conductive metal such as aluminum, copper, silver, or gold, as well as other materials. The anode 90 is separated by an insulating material 91 such as mica or Teflon from the cathode 92 which can include an electrically conductive nanostructure 104 such as a multiplicity of nanowires 93 in the form of columns or projections having points 126 which extend from a nanowire base 94.

Figure 37:
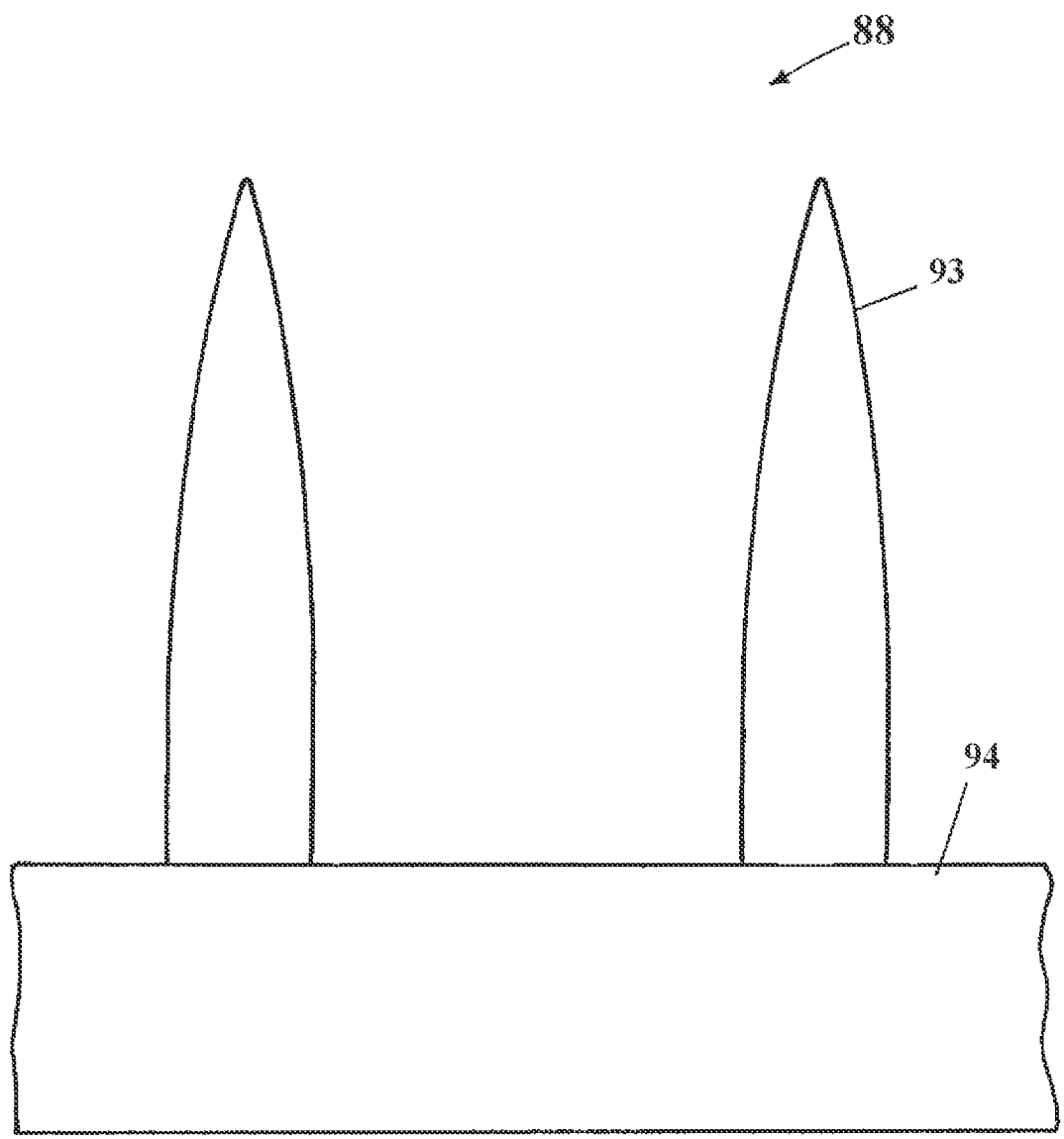
FIG. 37 shows a close-up view of the nanostructure or nanowire portion of an ion generator show in drawing FIG. 36.

As shown in drawing FIG. 37, which is a close-up view of the electrically conductive nanostructures 104 or nanowires 93 shown in FIG. 36, the nanostructures 104 or nanowires 93 have a typical height between 0-1000 nm and more typically between about 400-1000 nm, a diameter at their base which is typically between 100-300 nm, and more typically between about 150-250 nm, and which are typically separated from one another by two or three times the measure of their diameter, thus about 400-600 nanometers apart. The nanostructures 104 or nanowires 93 can be made of an electrically conductive metal such as aluminum, copper, silver, or gold, as well as other materials. The nano gap 89 and distance between the anode 90 and cathode 92 can be predetermined, or alternatively, can be adjusted by removing and inserting different alternative insulating material 91 portions having different thicknesses. A typical ion generator 88 having a nano gap 89 of 10-50 microns which is 10,000-50,000 nm can be made, and even smaller nano gaps 89 are possible. The anode 90 can include an electrical connection 84 to a source of positively charged ions or cations such as the top end 33 of the antenna 21 and/or another source which can be connected by an electrically conductive structure or wire 35, whereas the cathode 92 can include an electrical connection 84 to a source of negatively charged ions or anions which can be connected by an electrically conductive structure or wire 35 to terrestrial earth 25 ground 24. Again, the use of an ion generator 88 can make it possible to induce a corona effect and/or plasma condition with the use of lower voltage and less electrical energy than would otherwise be possible. When a corona and/or plasma state is obtained it is then possible to receive and harvest more electrical energy during a given time period.

An ion generator 88 including an anode 90, and a cathode 92 including a plurality of electrically conductive nanostructures 104 or nanowires 93 which are separated by a nano gap 89 and an insulating material 91 can be disposed proximate to at least one antenna 21 of a receiver and harvesting device 20. In this regard, the ion generator 88 can be located near the antenna 21 and then disposed at equal or less height relative to the surface of the earth. Alternatively, an antenna 21 can include an ion generator 88 for use with a receiver and harvesting device 20, as shown in drawing FIG. 48. The ion generator 88 can then be disposed at or near the top end 33 of the antenna 21 and can either be electrically isolated from the antenna 21 with the use of an insulator 82, as shown in drawing FIG. 46, or be configured to be in electrical contact with the antenna 21, as shown in drawing FIG. 48. In this case, it is possible for the ion generator 88 to be switched on and off from a remote phantom source of AC or DC electric power, or be provided with electric power from a portion of the energy harvested by the receiver and harvesting device 20. Alternatively, it can be readily understood that the ion generator 88 which is electrically isolated with the use of an insulator 82, e.g., as shown in drawing FIG. 46, can be disposed at or near the top end 33 of an antenna 21 generally similar to the configuration shown in drawing FIG. 48. It is possible to dispose the nanostructures 104 or nanowires 93 of an ion generator 88 and also an antenna 21 in a fractal configuration, such as those shown in drawing FIGS. 24-26, and also in various fractal Mandelbrot set configurations. Ion generators, and in particular, negative ion generators are often used to remove odors and also clean or filter the air within hotels, homes, and businesses. Some individuals believe and there are scientific studies which show there can be possible health benefits from using a negative ionizer. Examples of commercially available ion generations which serve air purifiers for use in the home include, e.g., the Clarifion GL-139, the Comfort Zone CZAP102WT, the POMORON MJ002H, the InvisiClean IC-5018-White-V2, and also the website: https://aniongenerator.com. Further, a Tesla coil can be used to generate ions and plasma conditions, as discussed above with reference to FIG. 13. In particular, an ultra high frequency solid state Tesla coil such as those which are disclosed on the following websites can be used for this purpose: https://teslauniverse.com/build/plans/solid-state-tesla-coil-0; https://www.instructables.com/Simplest-POWERFUL-Solid-State-Tesla-Coil-SSTC/; https://youtu.be/wWIeUs-nqkRk; and, see the disclosures and videos provided by the Plasma Channel@plasmachannel, by Jay Bowles, at https://www.youtube.com/@PlasmaChannel.

Figure 45:
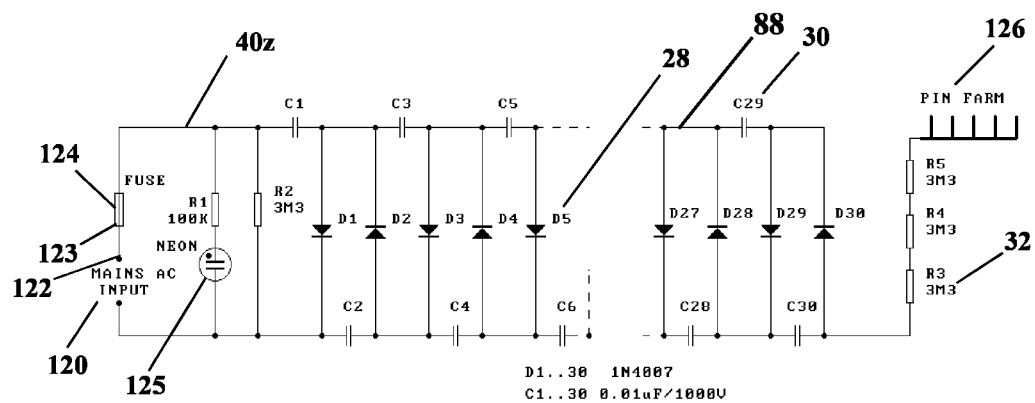
FIG. 45 shows a prior art schematic diagram for an ion generator.

A prior art schematic diagram of a simple ion generator 88 identified as "Kit 57. Ion Generator" is shown in drawing FIG. 45, and on the 2022 Communica (PTY) Ltd. website: http://archive.communica.co.za/Catalog/Details/P3315168235. The ion generator 88 shown in this prior art schematic diagram includes a configuration of capacitors 30 and diodes 28 that is known as a Cockroft-Walton multiplier circuit 40z. As shown, the schematic and "Kit 57" includes a breadboard 95, or alternatively a printed circuit board 119 (PCB) K57 PCB X including a circuit 40z which includes an AC power source 120, a 2 pole terminal block 122, a fuse holder and cap 123, a 0.1 Amp (A) Fuse 124, a Neon light 125, thirty 0.01 µF 1 KV ceramic capacitors 30, thirty 1N4007 diodes 28, a pin farm including a plurality of points 126, and five resistors 32, 5%, ¼ Watt (W): four 3M3 orange, orange, green; and, one 100K brown, black, yellow. The orientation of the thirty diodes 28 included in the ion generator 88 shown in drawing FIG. 45 is such that it is largely produce negative ions or anions and function as a negative ion generator 88. However, simply reversing the orientation, direction, and connection of the positive and negative leads of the thirty diodes 28 included in the ion generator 88 shown in drawing FIG. 45 causes it to largely produce positive ion or cations and function as a positive ion generator 88, and this can be advantageous for harvesting energy from the electrical potential of the earth and its atmosphere with the use of an antenna 21 that is part of a receiver and harvesting device 20. The ion generator 88 including a plurality of nanostructures 104 or nanowires 93 shown and discussed in drawing FIGS. 36 and 37 can be disposed and used as or in place of the pin farm including a plurality of points 126 shown in the schematic diagram of an ion generator 88 provided in drawing FIG. 45. In this regard, it can be advantageous to produce corona and/or plasma conditions and also generate positive ions near the top end 33 of the antenna 21 because the local resistance of the air in the atmosphere 26 close to the earth 25 is often high and the local density of positive ions is often low given normal and dry atmospheric conditions.

The following U.S. patents disclose ion generators, or other electrical devices which can possibly also be used in association with a receiver device to produce and/or harvest energy: U.S. Pat. No. 1,767,218 by Kunsman, U.S. Pat. No. 2,460,707 by Moray, U.S. Pat. No. 3,393,316 by Carr, U.S. Pat. No. 4,522,510 by Cap, U.S. Pat. No. 4,897,592 by Hyde, U.S. Pat. No. 5,018,180 by Shoulders, U.S. Pat. No. 5,416,391 by Correa, U.S. Pat. No. 5,449,989 by Correa, U.S. Pat. No. 6,208,061 by Jong-Sok, U.S. Pat. No. 6,208,061 by Bedini, U.S. Pat. No. 6,362,718 by Patrick et al., U.S. Pat. No. 7,091,481 by Miller et al., and U.S. 20070007844 by Barbat, and all of these patents are hereby incorporated by reference herein.

Figure 46:
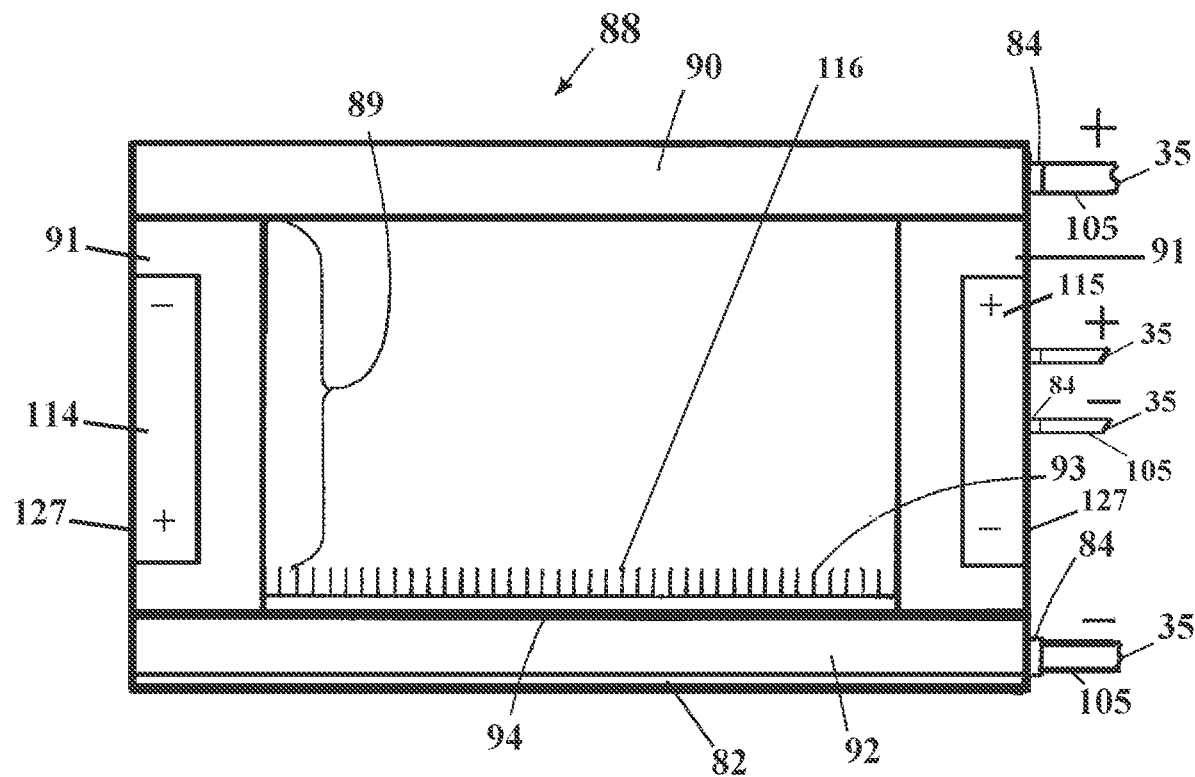
FIG. 46 shows an ion generator including magnets for use with an antenna of a receiver and harvesting device.
Figure 47:
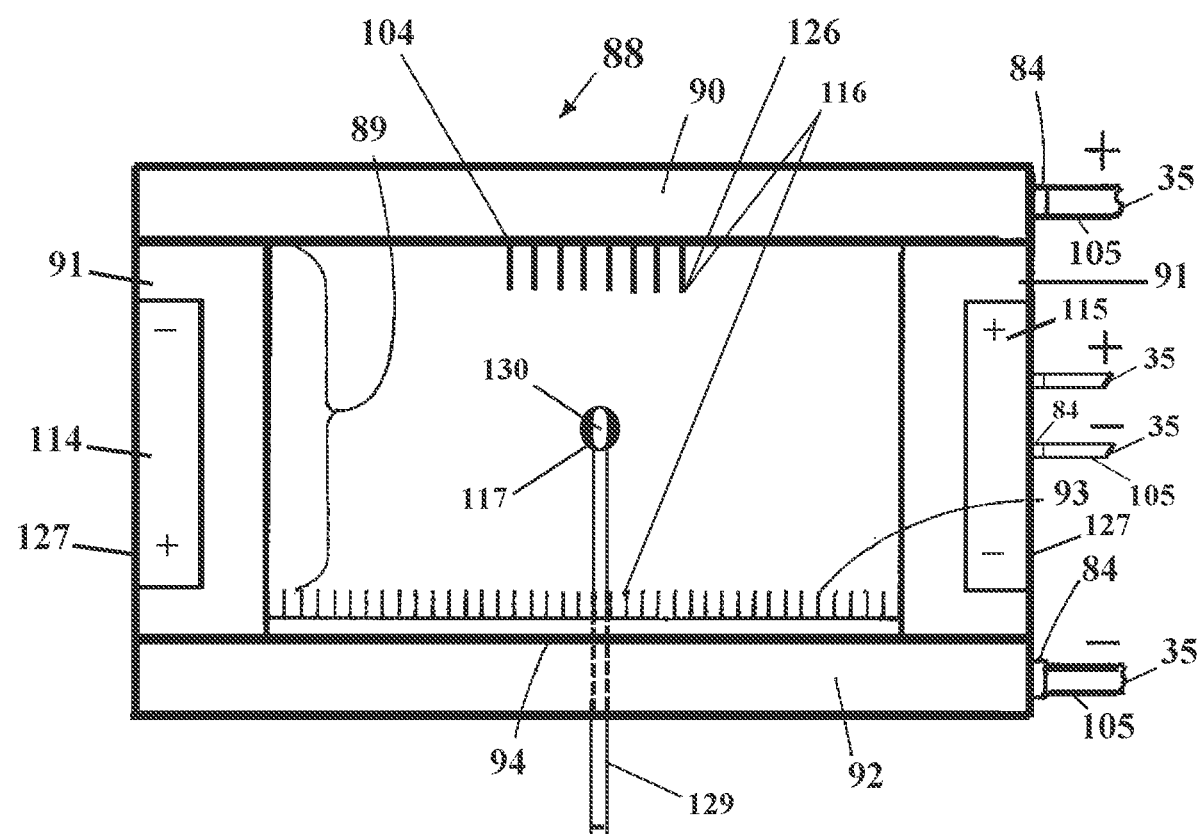
FIG. 47 shows an ion generator including a humidifier or fogger for use with an antenna of a receiver and harvesting device.

In addition, as shown in drawing FIG. 46, and FIG. 47, a radioactive material 116 such as technetium, promethium, polonium, radium, actinium, thorium, protactinium, uranium, neptunium, plutonium, americium, curium, berkelium, californium, or einsteinium can be located proximate to and/or be coated or otherwise disposed upon at least one of the anode 90 and/or the cathode 92 portions of an ion generator 88 which includes a plurality of electrically conductive nanostructures 104 or nanowires 93 in order to increase the local production of ions and/or lower the local breakdown voltage of gases in the atmosphere 26. Likewise, a radioactive material can also be disposed and used on the electrically conductive nanostructures 104 or nanowires 93 associated with the antennas 21 shown in drawing FIG. 35. See, e.g., "On Radium Antennae (Influence of the proximity of Radium upon signal reception) by E. Leimer (Elckt. Zets. 86. P. 94, Feb. 25, 1915. The following patents disclose the use of radioactive materials to facilitate or increase ion and/or electron emissions and/or to decrease the local breakdown voltage: U.S. Pat. No. 1,540,998 and UK 299,735 by Plauson, French patents 565,395 and 551,882 by Guillot, U.S. Pat. No. 1,723,422 by Hubbard, U.S. Pat. No. 2,460,707 by Moray, U.S. Pat. No. 2,263,032, "Cold Cathode Electron Discharge Tube" by Farnsworth, U.S. Pat. No. 3,393,316 by Carr, U.S. Pat. No. 4,835,433 and U.S. 2002169351 by Brown, and all of these patents are hereby incorporated by reference herein.

As previously discussed, the presence of atmospheric conditions which include water vapor, fog, humidity, rain, or snow, and/or fine particles or dust can be associated with a higher number of ions being present and/or a decrease in the local breakdown voltage which is required, that is, relative to normal clear and dry weather conditions. The so-called salt air found near oceans can also be associated with a higher number of ions being present in the local atmosphere. The presence of water vapor, fog, humidity, and/or solid particles in the air or atmosphere 26 near an antenna 21 and receiver and harvesting device 20 can then also be used to increase the amount of electrical energy which can be harvested. Accordingly, as shown in drawing FIG. 47, a humidifier or fog providing device 117 including a conduit 129 having an opening 130 for providing humidity and water vapor disposed proximate to an antenna 21 and/or an ion generator 88 can serve to increase the amount of electrical energy harvested by a receiver and harvesting device 20. Further, the water contained and used by the humidifier or fog providing device 117 can be treated with and/or include a salt such as NaCl or other ionizing substance to enhance its effect on increasing the number of ions present in the local atmosphere proximate to the antenna 21 of a receiver and harvesting device 20. Examples of commercially available humidifiers for use in the home include, e.g., the Stadler Form Emma E031, the Honeywell HUL430, and the Lasko UH300, and fog producing devices are made by the companies ADJ, Fanstek, Electpro, JDR, and Donner. Other devices which relate to the vaporization of fluids include, e.g., U.S. Pat. No. 4,428,193 by Papp, U.S. Pat. No. 5,794,601 by Patone, U.S. Pat. No. 6,971,594 by Polifka, and U.S. Pat. No. 10,648,430 by Jenkins, and all of these patents are hereby incorporated by reference herein. Furthermore, the use of a lawn sprinkler which can introduce water vapor in the air near at least one antenna 21 of a receiver and harvesting device 20 can serve to increase the local number of ions and/or reduce the breakdown voltage of the air and local atmosphere.

As shown in drawing FIG. 46 and FIG. 47, at least one permanent magnet 114 and/or electromagnet 115 can also be disposed in proximity to an antenna 21 which includes a plurality of electrically conductive nanostructures 104 or nanowires 93, and also an ion generator 88 in order to further increase the flow and availability of ions in the air. In this regard, a phenomenon that is generally associated with magnetohydrodynamics can be used to increase the flow and availability of ions because a gas and atmospheric air is also a fluid, e.g., see the video by "The Action Lab" on Facebook: https://fb.watch/gr5UVDyZ_q/.

Accordingly, an antenna 21 can include electrically conductive nanostructure 104 or nanowires 93 and/or an ion generator 88 which can be configured and disposed in a fractal configuration. Further, a permanent magnet 114 or electromagnet 115 can be disposed in proximity to the nanostructures 104 or nanowires 93 of an antenna 21 and/or an ion generator 88 to create a magnetofluiddynamic drive 127 that will increase the local circulation of ions. In addition, the electrically conductive nanostructure 104 or nanowires 93, and/or the anode 90 and cathode 92 of the ion generator 88 can include or be disposed near a radioactive material 116 which can serve to increase the local number of ions and/or decrease the local required breakdown voltage of a gas or air in the atmosphere. An ion generator 88, and in particular, a positive ion generator 88 can be placed in proximity to the antenna 21 to increase the number of ions and/or decrease the local breakdown voltage of a gas or air in the atmosphere 26. Furthermore, a source of water vapor such as a humidifier or fogger 117, or other like device such as a lawn sprinkler can be disposed proximate to the antenna 21, and so can an ion generator 88, in order to increase the local number of ions in the air and atmosphere, or other local gaseous environment which is provided proximate to the antenna 21, and/or in order to reduce the local breakdown voltage. In this regard, it is possible to introduce certain gases such as helium, hydrogen, and noble gases which are commonly used in neon lights such as argon and neon proximate to an antenna 21 in order to reduce the local breakdown voltage. Alternatively, it is also possible to use a fluorescent light bulb, a so-called vacuum tube, or other gas filled chamber or tube such as an electronic tube, and which has an enclosed environment characterized by a reduced breakdown voltage and/or higher transmissibility of ions or electrons, and which can also possibly serve as an amplifier. In this regard, see the patents and Fusor devices of Philo T. Farnsworth including U.S. Pat. No. 3,258,402, "Electric Discharge Device For Producing Interactions Between Nuclei, and U.S. Pat. No. 3,386,883, "Method And Apparatus For Producing Nuclear-Fusion Reactions," and also see U.S. Pat. No. 3,530,497, "Apparatus For Generation Fusion Reactions" and U.S. Pat. No. 3,533,910, "Lithium Ion Source In Apparatus For Generating Fusion Reactions," by his former associate R. L. Hirsch.

Increasing the local number of ions, and in particular, positive ions, and also reducing the local breakdown voltage of air or local atmosphere 26, and creating a local corona and/or plasma state or phenomenon can serve to increase the amount of energy which can be harvested by a receiver and harvesting device 20. The ion generator 88 and humidifier or fogger 117 can be provided with electrical power from a remote AC power source 120 or a DC power source 121 such as a battery 31 and/or from a portion of the energy harvested by the receiver and harvesting device 20. Likewise, a remote or phantom source of AC or DC electric power can be provided to operate a switch 22 to initially provide electrical energy to a receiver and harvesting device 20 in order to begin its operation, but once the receiver and harvesting device 20 is operational then the remote source of electrical energy can possibly be turned off or otherwise disconnected. While the use of one or more of the aforementioned ion generator 88 and also humidifier or fogger 117 devices to increase the amount of electrical energy collected by a receiver and harvesting device 20 could possibly require more electrical energy than could be produced by a single and relatively small antenna 21, this would not necessarily be the case when a larger antenna 21 having greater vertical elevation and/or a plurality of antenna structures having greater surface areas are placed in electrical communication with a receiver and harvesting device 20.

Figure 38:
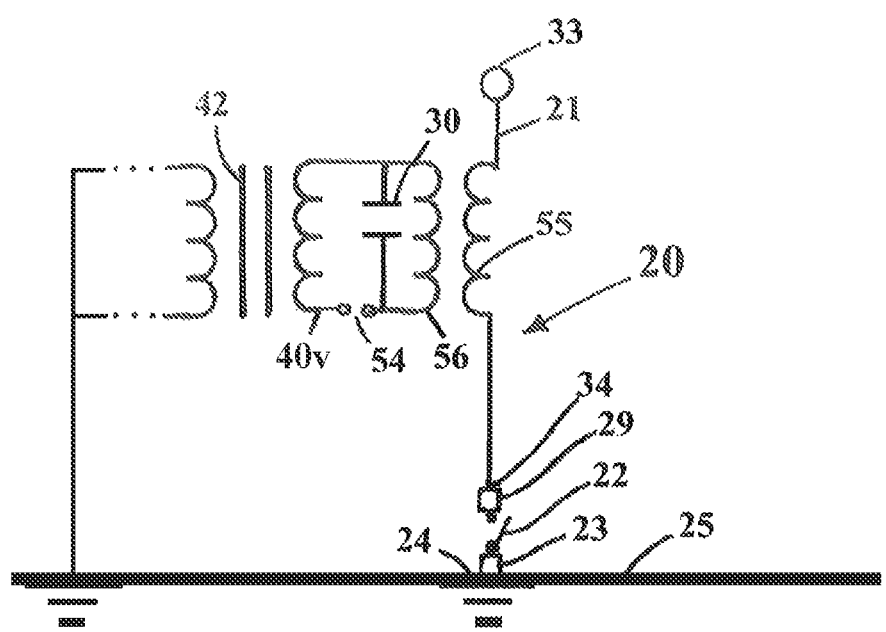
FIG. 38 shows a modification to the schematic of the receiver and harvesting device shown drawing FIG. 14 showing a device for receiving and harvesting energy including a circuit including a capacitor and spark gap.

Drawing FIG. 38 shows a modification to the schematic of the receiver and harvesting device 20 shown in drawing FIG. 14. In particular, circuit 40v shown in FIG. 38 includes a capacitor 30 and spark gap 54, and also an antenna 21 which is in electrical communication with a switch 22 to terrestrial earth 25 ground 24. In this regard, the capacitor 30 is located on the side of the circuit 40v which is proximate to the primary coil 55 and secondary coil 56, and the spark gap 54 is located on the side of the circuit 40v which is proximate to the transformer 42. As discussed above, it can be readily understood that a capacitor 30, a battery 31, and a resistor 32 or other electrical device or load can include an electrical connection to a ground 24 in an electrical device, and/or to terrestrial earth 25 ground 24. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. It can be readily understood that a circuit selected from circuits 40a-s and circuit 40v can be included between the switch 22 and terrestrial earth 25 ground 24. Further, the switch 22 can be made using at least a portion of one of the electronic timer circuits 40t, 40u, 40x, and 40y shown and discussed in drawing FIGS. 31, 32, 43, and 44, respectively. As shown in drawing FIG. 38, the circuit 40v can be in communication with a ground 24, and in particular, terrestrial earth 25 ground 24.

Figure 39:
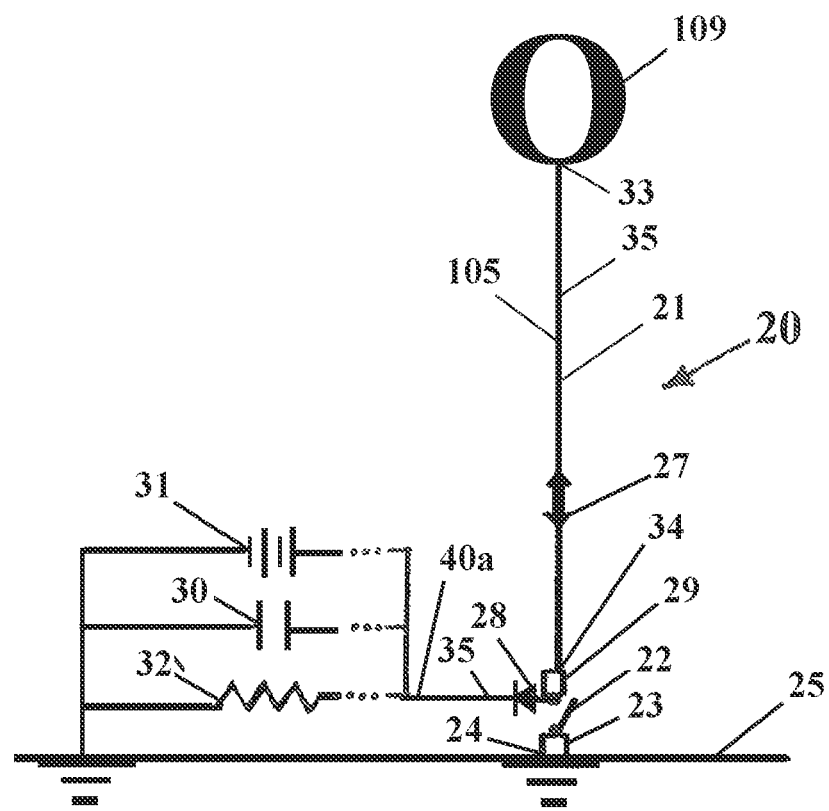
FIG. 39 shows an electrical energy receiver and harvesting device which includes a balloon for suspending an antenna.

Drawing FIG. 39 shows a receiver and harvesting device 20 that is generally similar to the one shown in drawing FIG. 4, but which further includes a balloon 109 for suspending a wire 35 to an antenna 21. In this regard, the wire 35 can include a shield of electrical insulation 105 between the location of the switch 22 and the bottom of the balloon 109, but an electrical connection is then made between the top end 33 of the wire 35 and the balloon 109 which can be made of and/or include an electrically conductive material such as aluminum or copper foil. All things being equal, the amount of electrical energy which can be received and harvested per unit time is increased by suspending or otherwise locating the top end 33 of the antenna 21 at higher elevations relative to terrestrial earth 25 ground 24 because the gradients of electrical potential 38 between the earth 25 and atmosphere 26 are such that there is an increase of approximately 100 Volts every three feet above terrestrial earth 25 ground 24 when located close to the earth's surface. As discussed above, it can be readily understood that a capacitor 30, a battery 31, and a resistor 32 or other electrical device or load can include an electrical connection to a ground 24 in an electrical device, and/or to terrestrial earth 25 ground 24. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. With reference to the embodiment of a receiver and harvesting device 20 shown in drawing FIG. 39, can be readily understood that a circuit selected from circuits 40a-i and 40k-w shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21, and/or a switch 22, and terrestrial earth 25 ground 24. Further, the switch 22 can be made using at least a portion of one of the electronic timer circuits 40t, 40u, 40x, and 40y shown and discussed in drawing FIGS. 31, 32, 43, and 44, respectively. As shown in drawing FIG. 39, the circuit 40a can be in communication with a ground 24, and in particular, terrestrial earth 25 ground 24.

Figure 40:
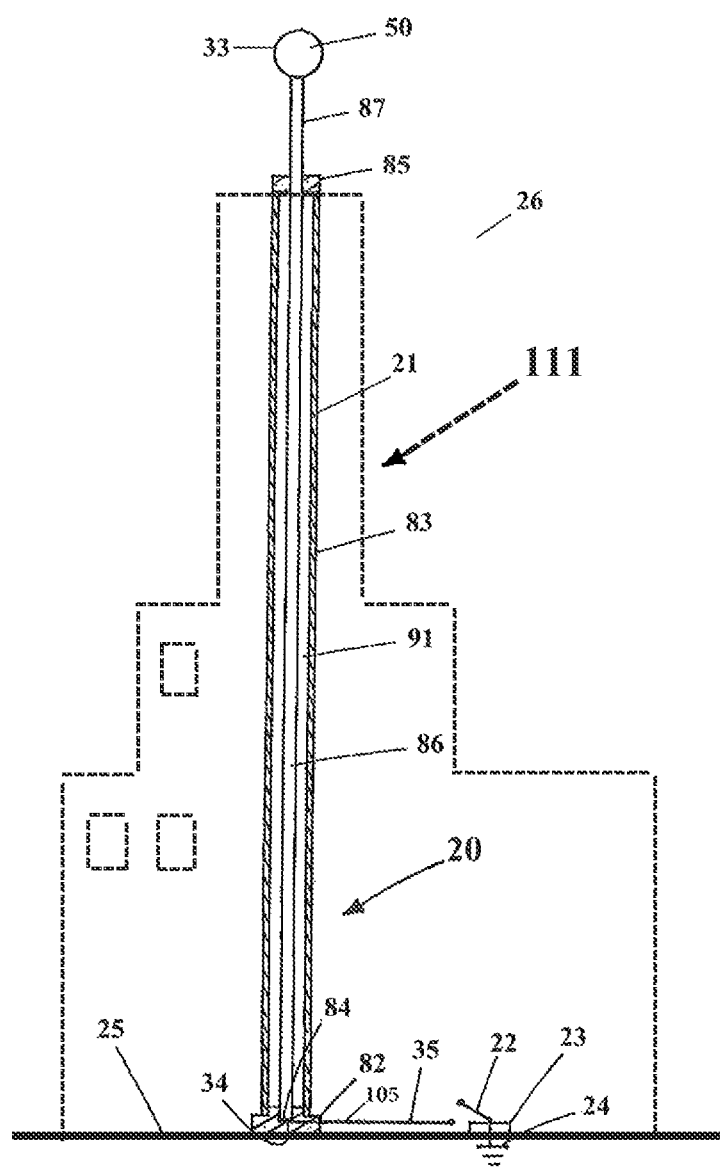
FIG. 40 shows a receiver and harvesting device which is included in a tall building.

Drawing FIG. 40 shows a receiver and harvesting device 20 generally similar to the one shown in drawing FIG. 34 which is included in a tall building 111 shown in dashed lines. While the relative scale of various portions of the receiver device 20 are enlarged in order to show detail, it can be advantageous for the height of the antenna 21 to extends to or above the top of the building 11. In this regard, if the height of an antenna 21 which is supported by a building 111 is 1200 feet above the surface of the earth, given that the electrical potential of the earth and its atmosphere increases about 100 Volts every 3 feet, there would be about 400 such gradients and an electrical potential of approximately 40,000 Volts at the top 33 of the antenna 21. As discussed above, it can be readily understood that a capacitor 30, a battery 31, and a resistor 32 or other electrical device or load can include an electrical connection to a ground 24 in an electrical device, and/or to terrestrial earth 25 ground 24. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. With reference to the embodiment of a receiver device 20 shown in drawing FIG. 40, it can be readily understood that a circuit selected from circuits 40*a-i* and 40*k-w* shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21, and/or a switch 22, and terrestrial earth 25 ground 24. Further, the switch 22 can be made using at least a portion of one of the electronic timer circuits 40*t*, 40*u*, 40*x*, and 40*y* shown and discussed in drawing FIGS. 31, 32, 43, and 44, respectively.

Figure 41:
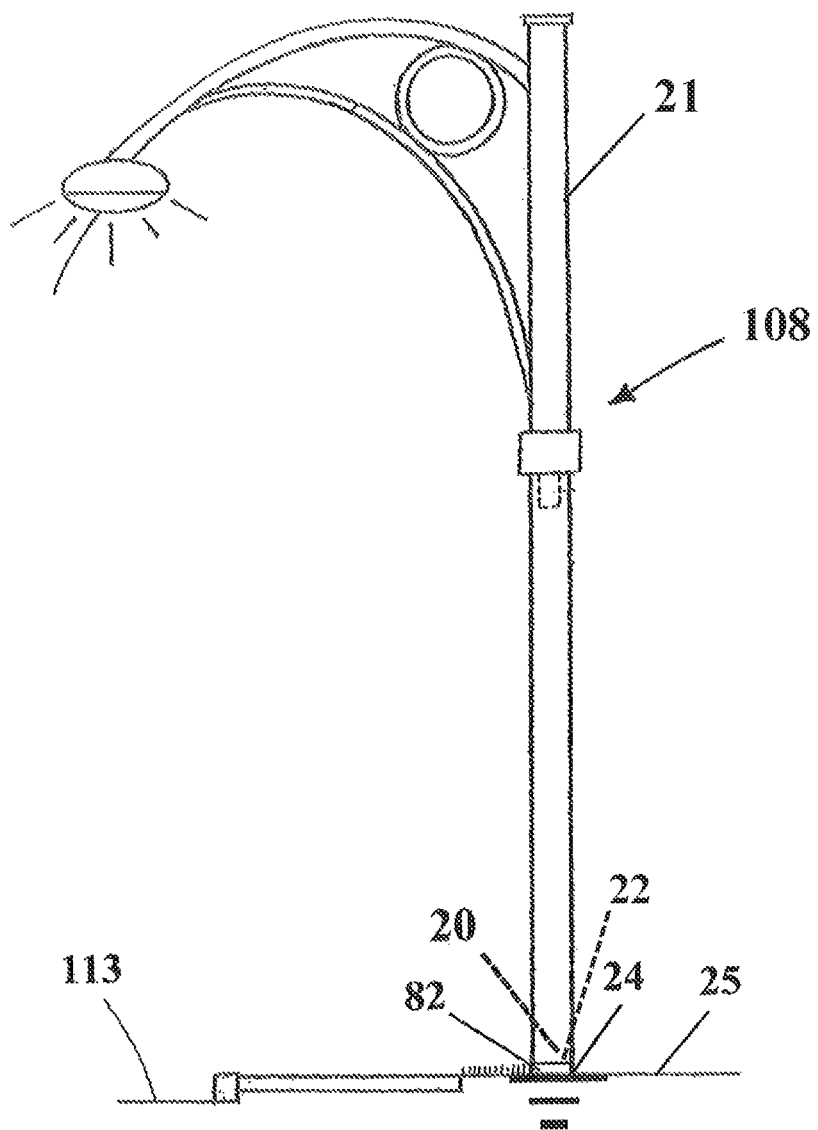
FIG. 41 shows a utility pole including a receiver and harvesting device.

Drawing FIG. 41 shows a receiver and harvesting device 20 having a switch 22 which is included in a utility light pole 108 located near a road or street 113. In this regard, the antenna 21 portion is electrically isolated from terrestrial earth 25 ground 24 with the use of a switch 22, e.g., as shown in drawing FIGS. 4 and 40, but also an electrical isolator 82 which is disposed between the utility light pole 108 and terrestrial earth 25 ground 24. As shown in drawing FIG. 35, if desired, a plurality of antennas 21 and/or light poles 108 can be electrically connected to one another and to a single receiver and harvesting device 20, and its electrical connection to terrestrial earth 25 ground 24 can then be made using a single switch 22. Drawing FIG. 41 is adapted from drawing FIG. 136 in U.S. Pat. Nos 10,840,707, and 11,207,988 by the Applicant, and these patents are hereby incorporated by reference herein. As discussed above, it can be readily understood that a capacitor 30, a battery 31, and a resistor 32 or other electrical device or load can include an electrical connection to a ground 24 in an electrical device, and/or to terrestrial earth 25 ground 24. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. With reference to the embodiment of a receiver device 20 shown in drawing FIG. 41, can be readily understood that a circuit selected from circuits 40*a-i* and 40*k-w* shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21, and/or a switch 22, and terrestrial earth 25 ground 24. Further, the switch 22 can be made using at least a portion of one of the electronic timer circuits 40*t*, 40*u*, 40*x*, and 40*y* shown and discussed in drawing FIGS. 31, 32, 43, and 44, respectively.

Figure 42:
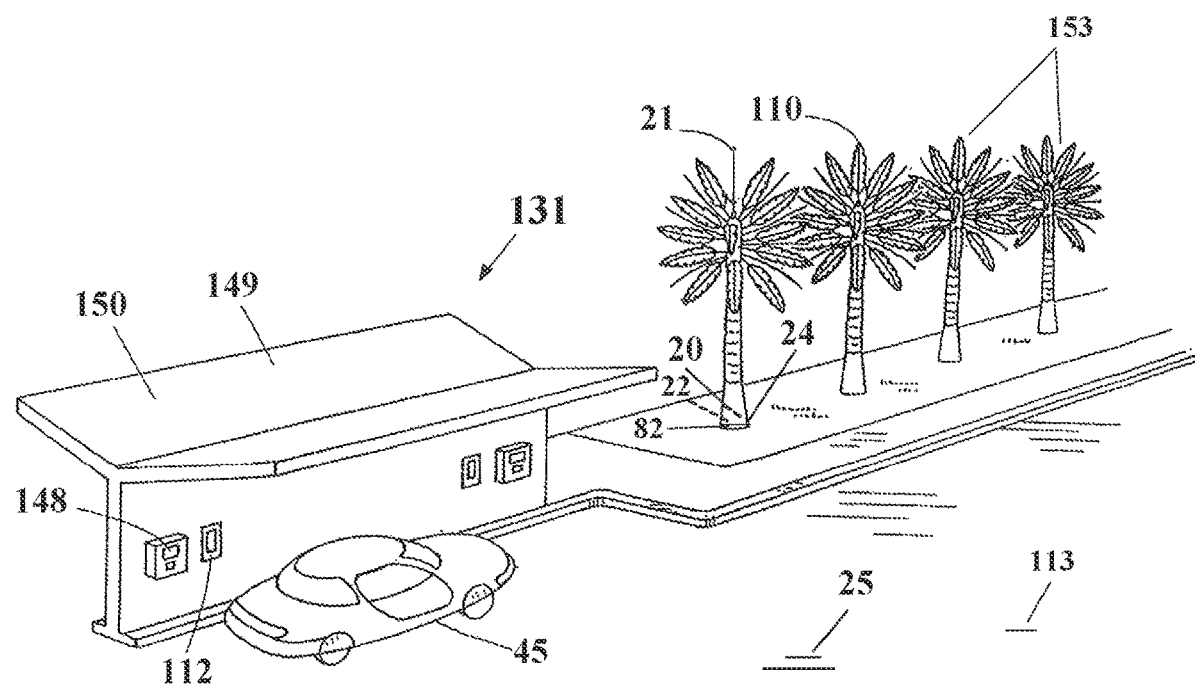
FIG. 42 shows a plurality of three-dimensional artificial solar palm trees including receiver and harvesting devices which are in electrical communication with a recharging station for electrical vehicles.

Drawing FIG. 42 shows a receiver and harvesting device 20 and switch 22 which can be included inside of one or more, that is, a plurality of three-dimensional artificial solar palm trees 110 which form an array 153. The artificial palm trees 110 can include an antenna 21 and also a receiver and harvesting device 20 generally similar to the one shown in drawing FIG. 4, or one of the other alternative embodiments of a receiver device 20 including a switch 22 disclosed in this Application, and also an electrical isolator 82 disposed near terrestrial earth 25 ground 24. As shown in drawing FIG. 35, if desired, a plurality of antennas 21 and/or three-dimensional artificial solar palm trees 110 can be electrically connected to one another and also to a single receiver and harvesting device 20, and its electrical connection to terrestrial earth 25 ground 24 can then be made with a single switch 22. Also shown in Drawing FIG. 42 is a street or road 113 and an electric vehicle 45 which is parked next to a recharging station 131. The recharging station 131 has a roof 150 which includes solar panels 149, but also a vending device 148, and an electrical power recharging cord 112. Drawing FIG. 42 is adapted from drawing FIG. 22 in U.S. Pat. Nos. 7,888,584, 8,319,091, 8,957,301, 10,840,707, and 11,207,988 by the Applicant, and all of these recited patents are hereby incorporated by reference herein. Accordingly, the solar palm trees 110, recharging station 131, and/or road 113 can include in partial or complete combination wired structures and/or wireless structures and means for recharging and powering electric and hybrid vehicles 45, and also receiver and harvesting devices 20 for providing electrical energy. As discussed above, it can be readily understood that a capacitor 30, a battery 31, and a resistor 32 or other electrical device or load can include an electrical connection to a ground 24 in an electrical device, and/or to terrestrial earth 25 ground 24. The switch 22 can include a device and means for providing variable speed control 23, as previously discussed in this specification and this could possibly include a 555 or 955 timer integrated circuit having at least one variable capacitor in the position of C1 and/or at least one variable resistor in the position of R1 and/or R2. With reference to the embodiment of a receiver and harvesting device 20 shown in drawing FIG. 42, can be readily understood that a circuit selected from circuits 40*a-i* and 40*k-w* shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21, and/or a switch 22, and terrestrial earth 25 ground 24. Further, the switch 22 can be made using at least a portion of one of the electronic timer circuits 40*t*, 40*u*, 40*x*, and 40*y* shown and discussed in drawing FIGS. 31, 32, 43, and 44, respectively.

Figure 43:
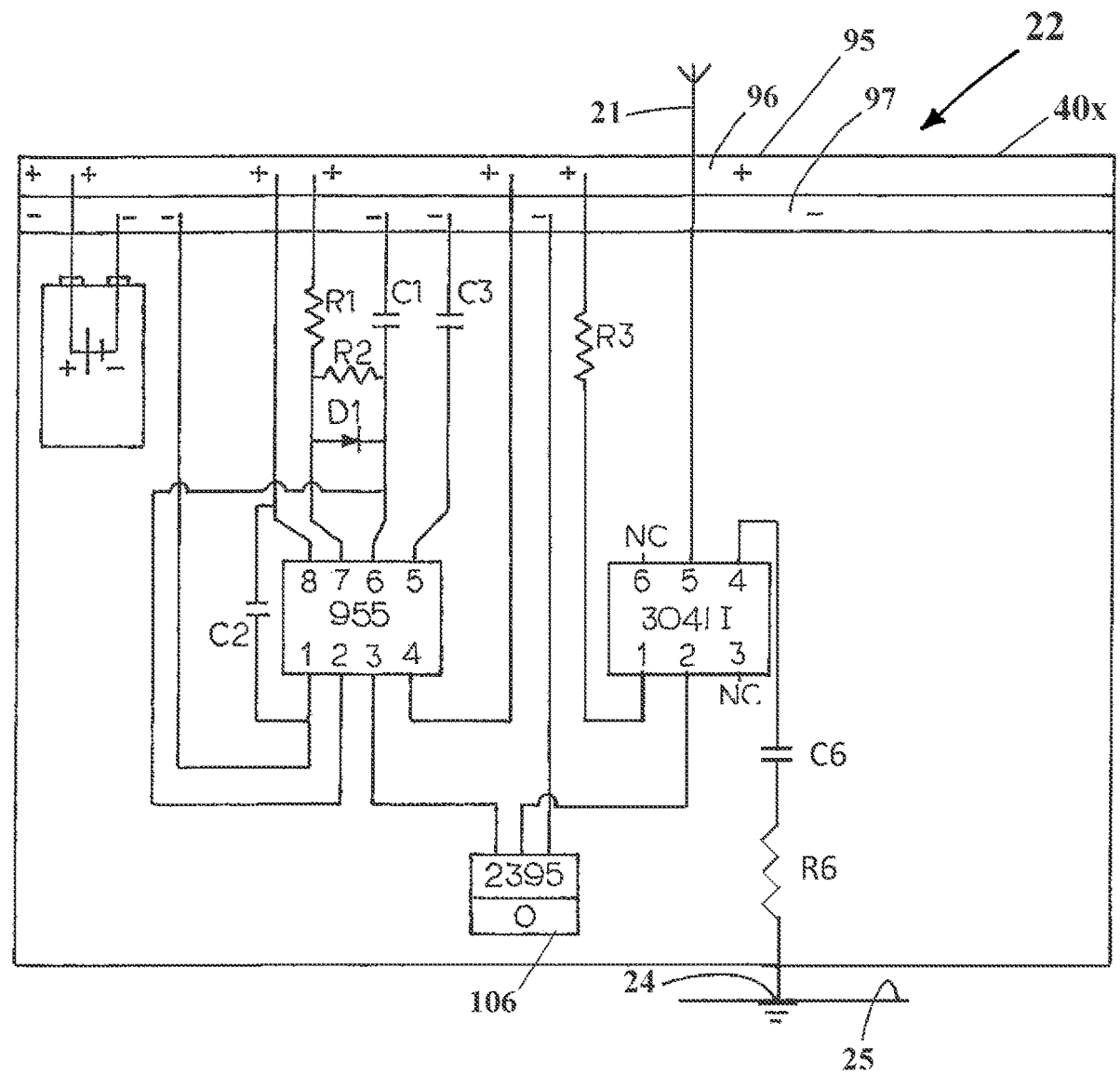
FIG. 43 shows another alternative timer circuit for use in a device for receiving and harvesting energy.

Drawing FIG. 43 shows an electronic switching circuit 40*x* for use in a receiver and harvesting device 20 which is generally similar to a portion of circuit 40*t* shown in drawing FIG. 31, but which does not include the second NTE 3041 II opto-isolator and the associated path which includes capacitor C5 and resistor R5, nor the path from the antenna 21 though diode D2, capacitor C4, and resistor R4. Instead, the circuit 40*x* shown in drawing FIG. 43 shows an electrically conductive path from pin 4 of the NTE 3041 I opto-isolator which can include a capacitor C6 and a resistor R6 before reaching terrestrial earth 25 ground 24. In this regard, the capacitor C6 can possibly be omitted from circuit 40x, but when it is present the capacitor C6 can serve to smooth the electrical output before it reaches a resistor 32 such as resistor R6, and here it can be readily understood that a resistor 32 such as resistor R6 can be an electrical device or load. The electronic switch 22 including switching circuit 40t shown in drawing FIG. 31 was made and tested to determine to what degree the aforementioned traditional model of electricity would possibly be applicable and affect the amount of electrical energy that could be collected and harvested using a receiver device 20 from the electrical potential as between the terrestrial earth ground and the surrounding atmosphere. However, it has been found that the simpler configuration associated with circuit 40x shown in drawing FIG. 43 also enables a receiver and harvesting device 20 including an electronic switch 22 and to collect and harvest electrical energy, and at least in part because the aforementioned modern model of electricity is a viable one for electrical engineering.

Figure 44:
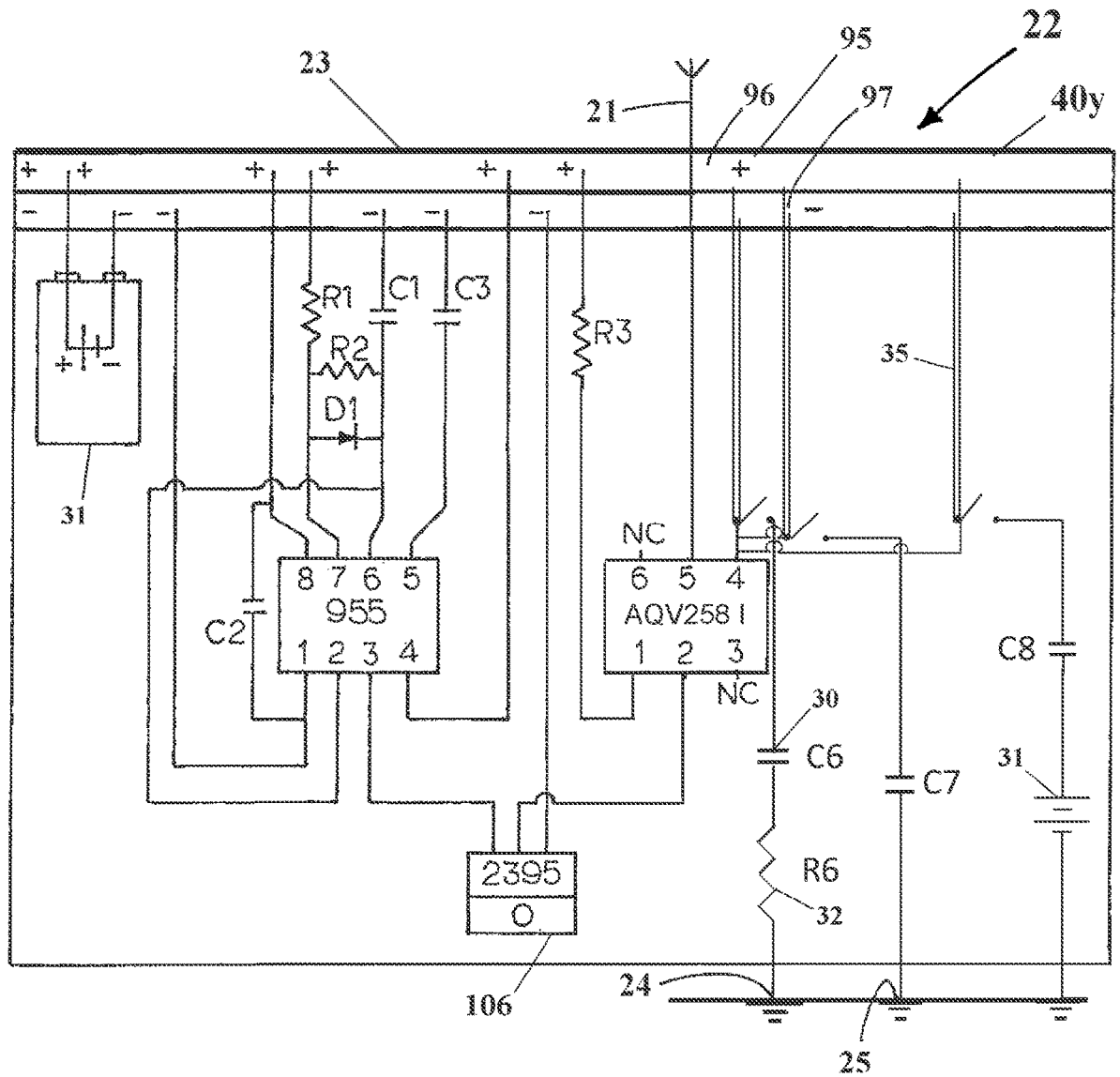
FIG. 44 shows another alternative timer circuit for use with a device for receiving and harvesting energy.

Drawing FIG. 44 shows an electronic switching circuit 40y for use in a receiver and harvesting device 20 which is generally similar to a portion that shown in drawing FIG. 32, but which does not include the second Panasonic AQV258 II opto-isolator and the associated path which includes capacitor C5 and resistor 5, nor the path from the antenna 21 though diode D2, capacitor C4, and resistor R4. Instead, the circuit 40y shown in drawing FIG. 44 shows an electrically conductive path from pin 4 of the AQV258 I opto-isolator which can include a capacitor C6 and a resistor R6 before reaching terrestrial earth 25 ground 24 much like circuit 40x shown in drawing FIG. 43. However, circuit 40y also includes two possible additional conductive paths to terrestrial earth 25 ground 24, that is, one path through C7, and another through C8 and battery 31. The capacitor C6 can possibly be omitted from circuit 40y, but when it is present the capacitor C6 can be used serve to smooth the current output before it reaches a resistor 32 such as resistor R6, and here it can be readily understood that a resistor 30 such as resistor R6 can be an electrical device or load. Likewise, the capacitor C8 can possibly be omitted from circuit 40y, but when it is present the capacitor C8 can be used serve to smooth the current output before it reaches a battery 31. Another conductive path is from pin 4 of the AQV258 I opto-isolator through a capacitor 30 labeled capacitor C7 and to terrestrial earth 25 ground 24. Capacitor C7 can be used to store electrical energy. The other additional conductive path is from pin 4 of the AQV258 I opto-isolator through a capacitor 30 labeled capacitor C8 an a battery 31 to terrestrial earth 25 ground 24. In addition, one or more switches 22 which can be electrically powered with the use of positive and negative wires extending from the positive or plus + portion 96 and negative or minus − portion 97 of the power supply bar of the electronic breadboard 95 or printed circuit board 119 can be included for selectively isolating one or more of the aforementioned three paths from pin 4 of the AQV258 I opto-isolater before reaching capacitor C6 and resistor R6, and/or C7, and/or C8 and a battery 31. In this regard, the electronic symbol for three switches are shown in drawing FIG. 44, that is, one is disposed between pin 4 and C6 and R6 and terrestrial earth 25 ground 24, a second one is disposed between pin 4 and C7 and terrestrial earth 25 ground 24, and a third one is disposed between C8 and battery 31 and terrestrial earth 25 ground 24. Accordingly, one or more of these three paths to terrestrial earth 25 ground 24 can be selected for use and in various partial or complete combination. The electronic switch 22 including switching circuit 40u shown in drawing FIG. 32 was made and tested to determine to what degree the aforementioned traditional model of electricity would possibly be applicable and affect the amount of electrical energy that could be collected and harvested using a receiver device 20 from the electrical potential as between the terrestrial earth ground and the surrounding atmosphere. However, it has been found that the simpler configuration associated with circuit 40y shown in drawing FIG. 44 can also enable a receiver and harvesting device 20 including an electronic switch 22 and to collect and harvest electrical energy, and at least in part because the aforementioned modern model of electricity is a viable one for electrical engineering.

Figure 48:
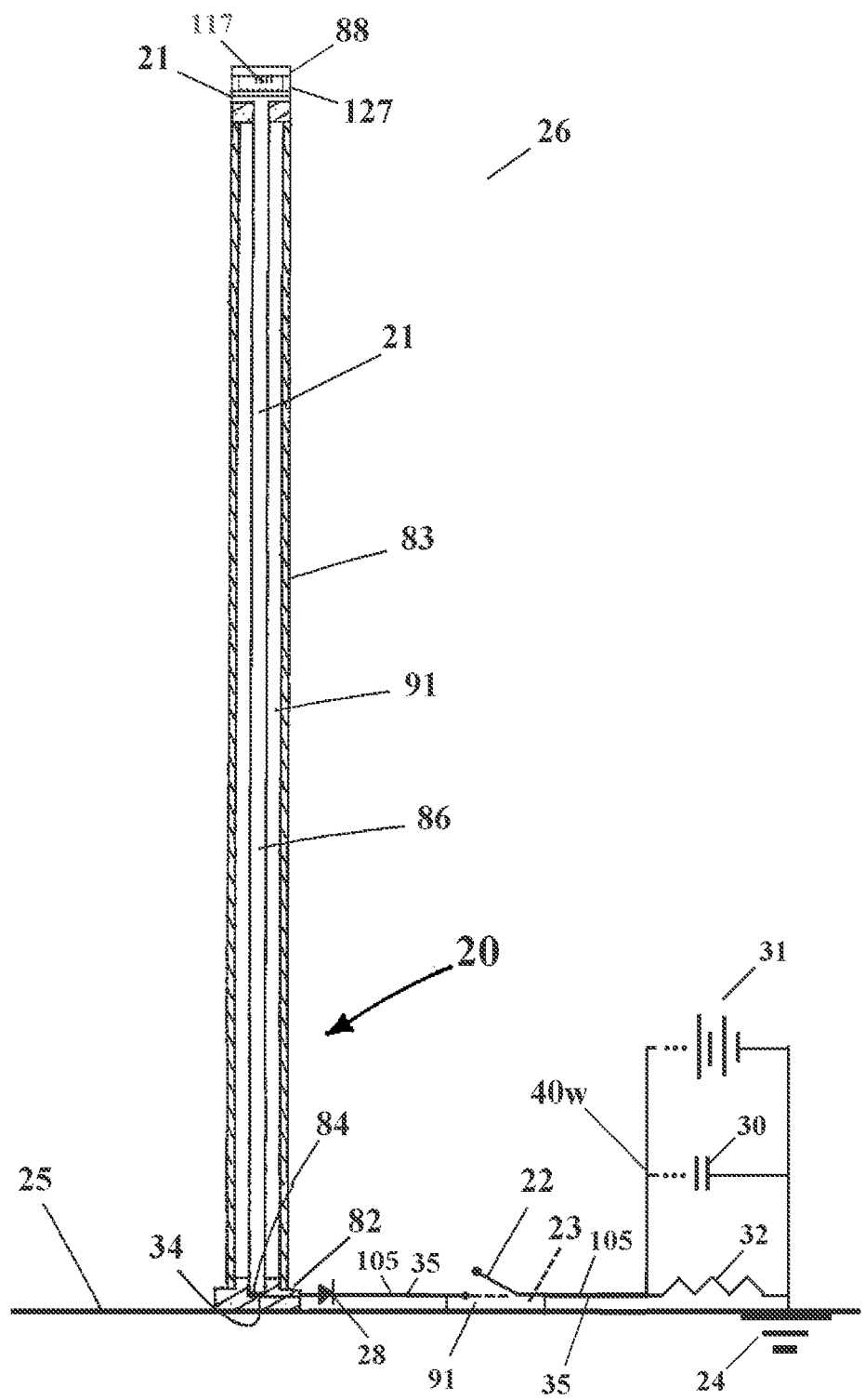
FIG. 48 shows an ion generator disposed proximate to the top end of a portion of a receiver and harvesting device.

Drawing FIG. 48 shows a receiver and harvesting device 20 including an antenna 21 having a top end 33 that is exposed to the atmosphere, and also an electrically conductive structure such as a rod 86, or wire 35 that is substantially shielded and substantially electrically isolated from ions present in the atmosphere 26 between the top end 33 and bottom end 34 generally similar to the antenna 21 shown in drawing FIG. 34. Further, the antenna 21 can include or be located proximate to an ion generator 88, as shown and discussed in drawing FIGS. 36-37 and also FIGS. 45-47, that is disposed at or near the top end 33 of the antenna 21. In addition, the antenna 21 can include or be located proximate to a humidifier or fogger device 117, as discussed and shown in drawing FIG. 47. The top 33 of the antenna 21 can also include a sphere 50 or a toroid 51, or other geometric shape, and can be configured in a phi geometry and/or fractal configuration such as those shown in drawing FIGS. 24-26, and/or a Mandelbrot set to configure a Mandelbrot antenna 21. Furthermore, the top 33 of the antenna 21 can include electrically conductive nanostructures 104 or nanowires 93 for gathering ions and/or reducing the local breakdown voltage of the air and/or surrounding atmosphere as discussed and shown in drawing FIG. 35. As shown in drawing FIG. 48, the centrally disposed electrically conductive structure, e.g., a rod 86 or wire 35 or other core portion of the antenna 21 can be substantially shielded and substantially electrically isolated from the outer jacket or container portion 83 of the combined antenna structure by an isolator plug 85, an isolator base 82, and isolator portion 91. The isolator portion 91 can be a captive dielectric gas such as SF6, a vacuum, or a tube or layer of plastic or other electrically non-conductive material. The bottom end 34 of the antenna 21 can include an electrical connection 84 to a wire 35 or other electrically conductive structure which leads to a switch 22. In this regard, the wire 35 is typically electrically isolated except for its connection point 84 with the bottom end 34 of the antenna 21 and the switch 22, and that these connections and also other portions of the receiver and harvesting device 20 can also be coated or encapsulated with an electrically insulating material using, e.g., potting compounds, glob tops, and molding encapsulates which can be made of acrylic, elastomers, compounds, epoxy, polyurethanes, polyesters, polyamides, silicones, resins, rubber, thermosets, thermoplastics, and some of the aforementioned materials can be cured using room temperature vulcanization, or visible and/or ultraviolet light. ASTM F641 provides a standard specification implantable epoxy electronic encapsulants. Companies which can provide such materials and/or services include 3M, Henkel Adhesives, Geospace, Loctite, the Lord Corporation, Panacol, and the Robert McKeowne Company, Inc. It can be readily understood by a person of ordinary skill in the electrical art field that a switch 22 typically includes a structure and means for electrically isolating its electrically conductive contact points from one another and also the surrounding environment. The switch 22 can include a controller device having means for providing variable speed control 23, as previously discussed in this specification and this could possibly include a 555 timer or 955 timer, that is, an integrated circuit having at least one variable capacitor in the position of C1 and/or at least one variable resistor in the position of R1 and/or R2. With reference to the embodiment of a receiver and harvesting device 20 shown in drawing FIG. 48, it can be readily understood that a circuit selected from circuits 40a-i and 40k-w shown and discussed in drawing FIGS. 4-5, 8-11, 14-17, 20-23, 31-32, 38-39, 43-44, and 48 can be included between the bottom end 34 of the antenna 21 and/or a diode 28 which is in electrical communication with the bottom end 34 of the antenna 21 and/or a switch 22, and terrestrial earth 25 ground 24. Further, the switch 22 can be made using at least a portion of one of the electronic timer circuits 40t, 40u, 40x, and 40y shown and discussed in drawing FIGS. 31, 32, 43, and 44, respectively. As shown in FIG. 48, a circuit 40w can include a diode 28 and a switch 22 having a variable speed control 23, at least one of a resistor 32 or load such as an electrical device, and/or a capacitor 30, and/or a battery 31. In this regard, as also shown and discussed with reference to drawing FIG. 44, at least one of a resistor 32 or load such as an electrical device, which are often indicated using the same symbol in electrical schematic drawings, and/or a capacitor 30, and/or a battery 31 can be selected for use with a receiver and harvesting device 20 in various partial or complete combination(s). The antenna 21 and ion generator 88 can be switched on and off to terrestrial earth 25 ground 24 together, or alternatively the ion generator 88 can be provided with a source of remote electric power and be controlled separately.

Figure 49:
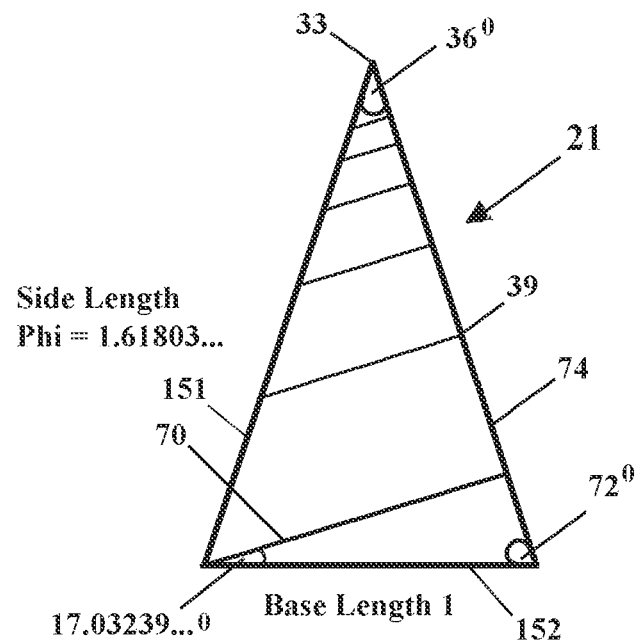
FIG. 49 shows a conical structure having a side to base length ratio corresponding to the number phi.

Drawing FIG. 49 shows a conical structure 74 having a side 151 to base 152 length ratio corresponding to the number phi which is an irrational number having a value of 1.61803 to the fifth digit. Accordingly, the ratio of the length of the side 151 of this conical structure 74 to the length of the base 152 is approximately 1.61803/1. The angle of the apex of the conical structure 74 is approximately 36 degrees, and the angle between the side and bottom is approximately 72 degrees. As previously discussed, the number phi and also fractal structures can be observed in structures and other phenomenon in nature. Some individuals believe that matter and/or energy has a tendency to form, accumulate or nest in relationship to structures having a phi geometry. Accordingly, the top end 33 of an antenna 21 can include a geometric structure configured in a phi geometry, e.g., a conical structure 74 as shown in drawing FIG. 49, a toroid shape as shown in FIG. 23, or a fractal configuration such as shown in FIG. 25. Also shown in drawing FIG. 49 is a logarithmic spiral 70, and in particular, a phi spiral which has a slope of approximately 17.03239 degrees. In this regard, the conical structures 74 shown in drawing FIGS. 27-29 which can be used to make an antenna 21 and/or coil 39 can alternatively be configured in a phi geometry. This possibility is shown with a spiral shaped antenna 21 and/or coil 39 which is configured in a phi geometry being disposed about the conical structure 74 shown in FIG. 49. Further, a first conical structure 74 having a first height can include a primary coil 55, and a second conical structure 74 having a different and second height can include a secondary coil 56, and the secondary coil 56 can be disposed inside or outside of the first conical structure 74 and primary coil 55 in a nesting relationship like that of Russian Kabuki dolls. In addition, the nanostructures 104 and/or nanowires 93 shown in drawing FIGS. 35-37, and also FIGS. 46-48 can have a portion near their points 126 configured in and/or approximately consistent with a phi geometry.

Figure 50:
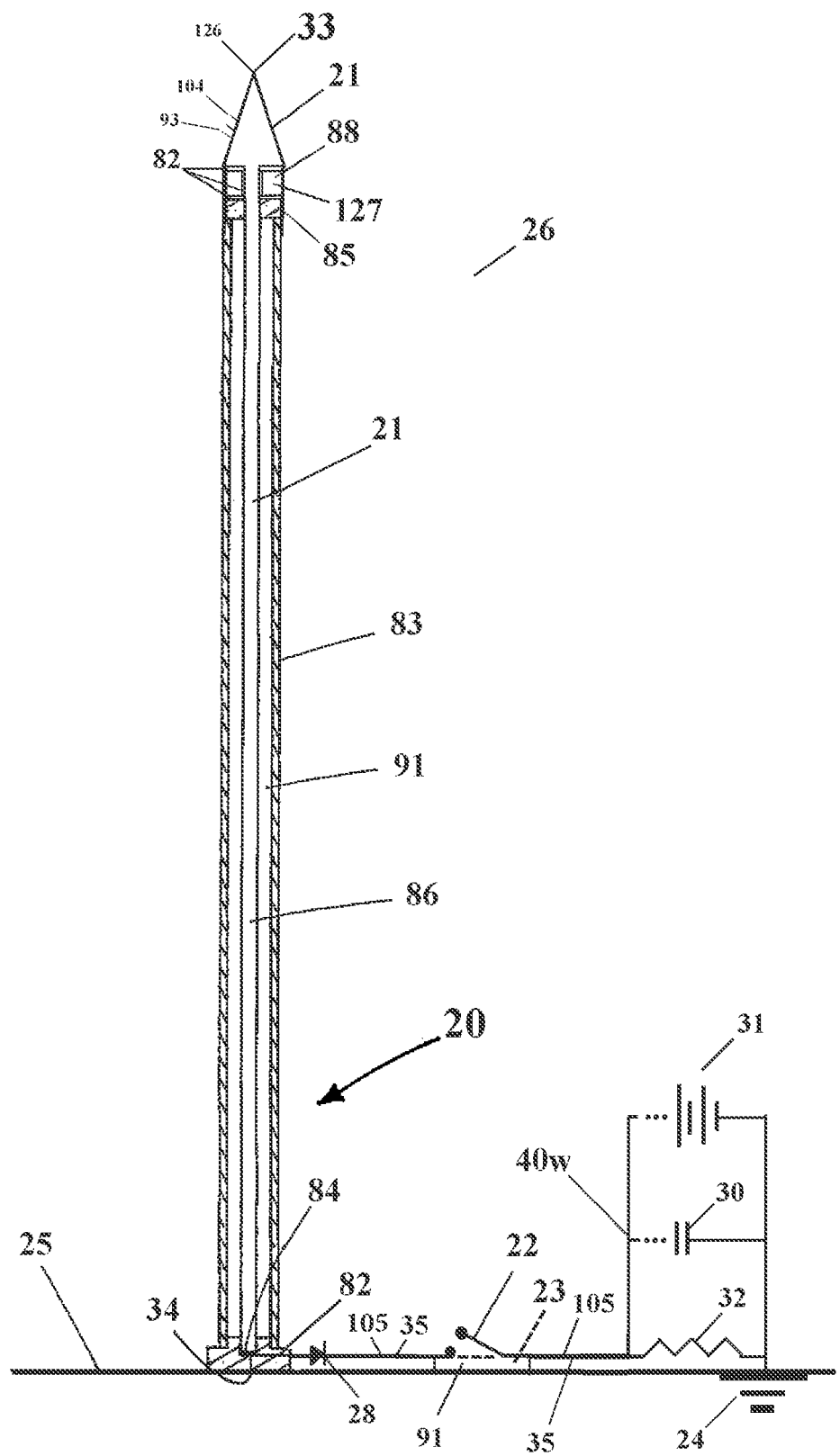
FIG. 50 shows a receiver and harvesting device including an antenna having a portion near the top end which is configured in a geometric shape generally similar to the one shown in drawing FIG. 49.

Drawing FIG. 50 shows a receiver and harvesting device 20 including an antenna 21 having a portion near the top end 33 configured in a phi geometric shape generally similar to the one shown in drawing FIG. 49. The antenna 21 can include a top end 33 having a point 126. Further, the antenna 21 can also include a plurality of nanostructures 104 or nanowires 93 having points 126. The antenna 21 can possibly also include an ion generator 88, and/or magnetofluiddynamic drive 127, and/or a humidifier or fog providing device 117. The ion generator 88, and/or magnetofluiddynamic drive 127, and/or humidifier or fog providing device 117 can be electrically isolated from the antenna 21 and/or a conductive structure which is in electrical communication with the antenna 21 such as a rod 86 or wire 85, by using at least one of a non-conductive isolator plug 85, an insulator 82, and a layer of insulation 105.

Figure 51:
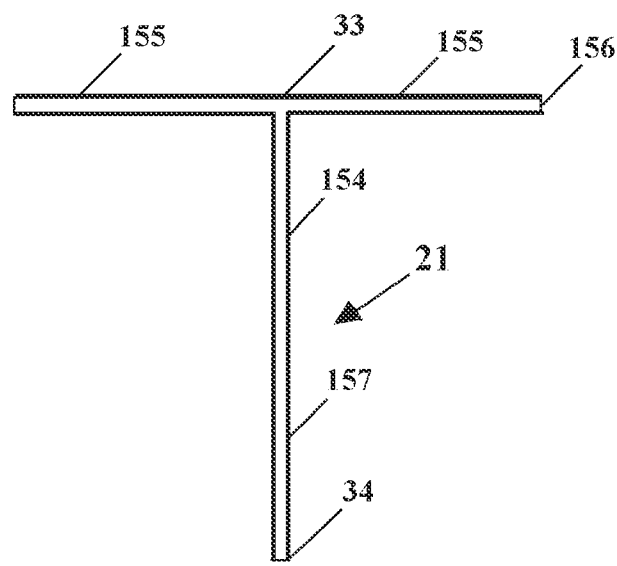
FIG. 51 shows a dipole antenna.

Drawing FIG. 51 shows a dipole 154 antenna 21 including top end 33, a bottom end 34, a center portion 157 and two opposing transverse portions 155 each having ends 156. The dipole 154 antenna 21 can be made in a phi configuration in which the ratio of the length of the center portion 157 to the length of a transverse portion 155 to the fifth digit is approximately 1.61803. Further, a dipole 154 antenna 21 can be made in a phi fractal configuration and also possibly include a Mandelbrot set.

Figure 52:
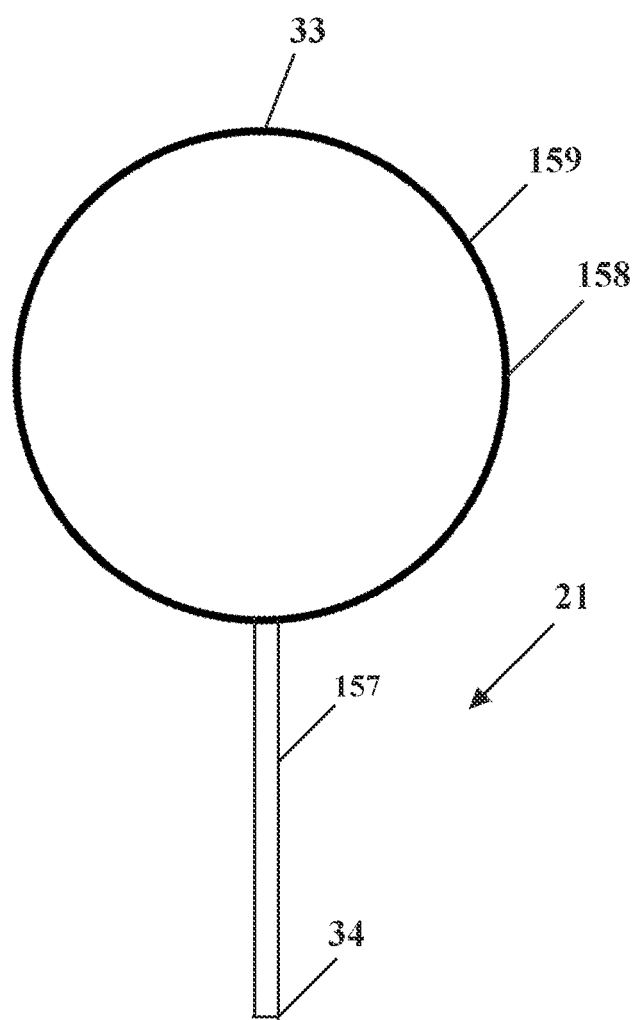
FIG. 52 shows a loop antenna.

Drawing FIG. 52 shows a loop 158 antenna 21 including a top end 33, a bottom end 34, a center portion 157 and a circular loop portion 159.

Figure 53:
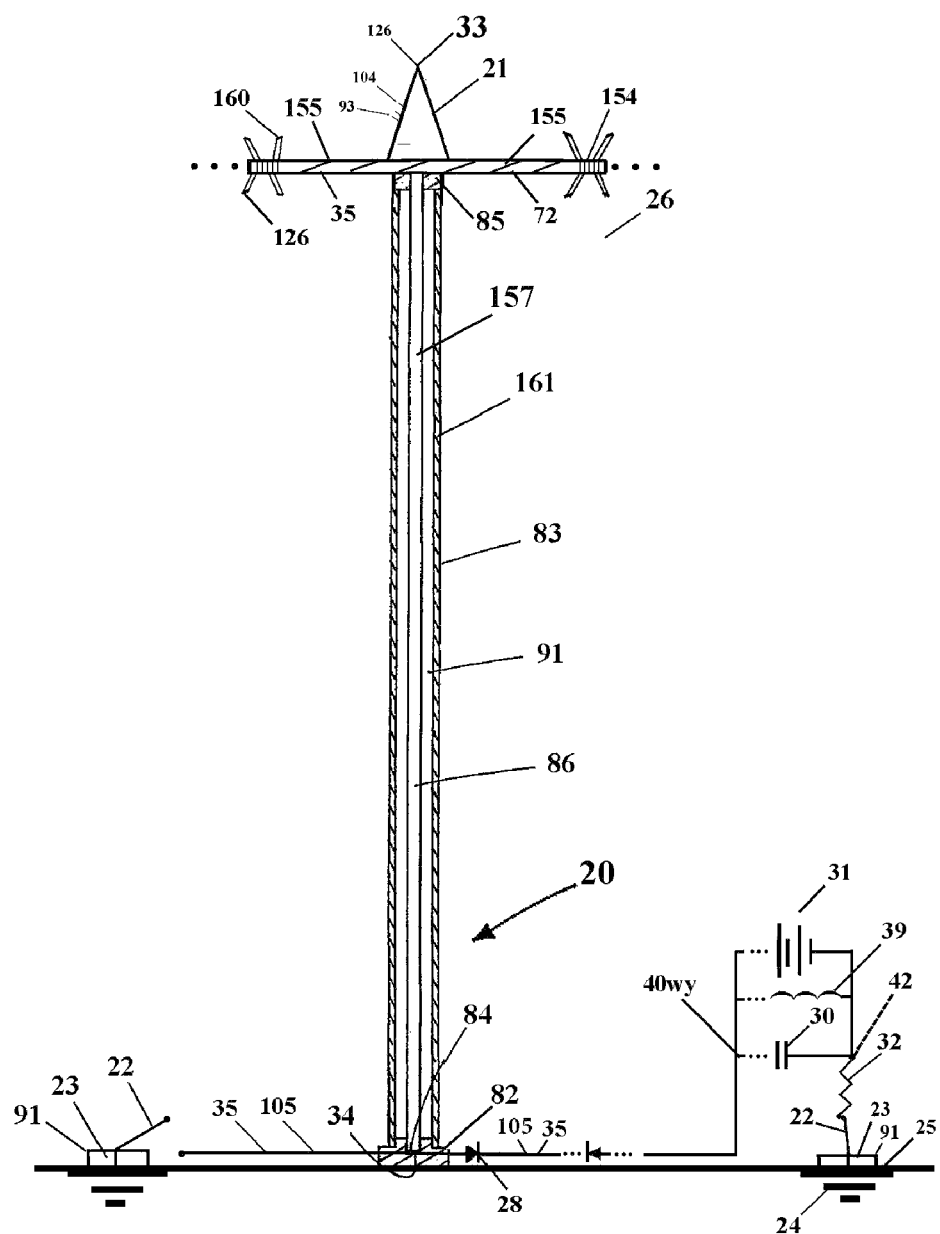
FIG. 53 shows a portion of a fence and a receiver and harvesting device including two switches.

Drawing FIG. 53 shows a receiver and harvesting device 20 including two switches 22. In this regard, drawing FIG. 53 shows an antenna 21 including a top portion having a phi configuration similar to that shown in drawing FIGS. 49-50, a top end 33, and a bottom end 34. Alternatively, the top portion of the antenna 21 having a phi configuration can be omitted, but including a pointed configuration can sometimes serve to also help protect an antenna 21 from livestock, and the reason and basis for this purpose will be made apparent from the discussion provided below. Drawing FIG. 53 shows an antenna 21 which is configured to be in the form and have the structure of a dipole antenna 154 which includes two opposing transverse portions 155 that are in physical contact with a center portion 157 which is vertically disposed so as to be in electrical communication with the transverse portions 155. The transverse portions 155 can be made of an electrically conductive material. In this regard, the symbol for an ellipses ( . . . ) is here used to represent and show that the transverse portions 155 can extend for a greater length. The dipole antenna 154 can also include a larger number and plurality of transverse portions 155, as discussed below. The center portion 157 of the dipole antenna 154 can either be in constant electrical communication with a receiver and harvesting device 20, or alternatively, can be caused to be in electrical communication with a receiver and harvesting device 20, e.g., with the use of a switch.

As shown in drawing FIG. 53, the main transverse portions 155 of the dipole antenna 154 can of a barbed wire 160 having a plurality of sharp points 126 and which is readily available in various material compositions such as steel, and which can be coated with aluminum, zinc, and other metals, e.g., see ASTM A121-22. Razor wire is here considered to be one form of barbed wire. Alternatively, the dipole 154 antenna 21 can be made of an unbarbed wire 35 as shown in drawing FIG. 35. Further, the dipole 154 antenna 21 can be made of an electrical conductor 72 or a wire 35 which includes a plurality of smaller and more numerous projections or points 126 which can be configured as nanostructures 104 or nanowires 93, and this possibility is represented on the left side of the wire 35 and antenna 21 shown in drawing FIG. 54. In some cases, it can be readily understood that it may not be possible to well see such nanostructures 104 or nanowires 93 with the naked eye, and so their relative scale cannot then be easily shown or rendered in the drawings, and so these structures are represented and indicated with the use of relatively small numerals in drawing FIGS. 53-56. The center portion 157 of a dipole antenna 154 can also be made of an electrically conductive metal and possibly be configured to serve as a fence post 161 or a fence stay 164.

The barbed wire 160 which has been or will be installed on farms and in other locations in the United States and around the world can be retrofitted and/or fitted so as to be placed in functional electrical communication with a receiving and harvesting device 20. In this regard, barbed wire 160 and unbarbed wire 35 is typically connected to either a wooden fence post(s) 162 using barbed metal staples 166, or to a metal T-post(s) 163 using a small piece of metal wire that is twisted about the barbed wire 160 or unbarbed wire 35. However, when electrical isolation of a barbed wire 160 or unbarbed wire 35 is desired or required to create an electrically charged fence for confining livestock, or in this case to have the barbed wire 160 or unbarbed wire 35 serve as and effectively be the transverse portion(s) 155 of a dipole antenna 154 for a different electrical purpose which relates to collecting and harvesting electrical energy from the electrical potential as between the earth and its atmosphere with a receiver and harvesting device 20, a nonconductive electrical insulator 91 such as a fin tube insulator 165 can be used to isolate the barbed wire 160 or unbarbed wire 35 from the barbed staples 166 and wooden fence post(s) 162. In this regard, a conventional barbed wire 160 fence 167 typically includes 3-5 pieces and elevated layers of barbed wire 160 which are vertically spaced apart and secured to either wooden fence posts 162 or metal T-posts 163. In this case, the top barbed wire 160 or unbarbed wire 35 of a fence 167 having the greatest vertical elevation above the terrestrial earth 25 is typically placed in electrical communication with a receiver and harvesting device 20 because the electrical potential as between the earth and its atmosphere increases with greater vertical elevation. However, the size of the dipole antenna 154 and amount of surface area included on the transverse portions 155, which in this case is a barbed wire 160 or unbarbed wire 35 that is exposed to ions in the atmosphere is also a factor to be considered, and so alternatively the center portion 157 of a dipole antenna 154 which is or can be caused to be in electrical communication with a receiver and harvesting device 20 can possibly be connected to more than one and even all of the barbed wires 160 or unbarbed wires 35 of a fence 167. When barbed wire 160 or unbarbed wire 35 has been or will be installed on metal posts such as T-posts 163, then the barbed wire 160 or unbarbed wire 35 can be electrically isolated from the metal T-posts 163 using an electrical insulator 91 such a nonconductive glass, ceramic, porcelain, thermoplastic material and a structure and/or fastener which is configured and made so as to be quickly and easily attached to the selected metal post(s). In this regard, a large number of fasteners which are commonly known as T-post insulators 168 having different configurations are readily available for use in making an electrically charged fence for the purpose of confining livestock, or in this case to instead make an electrically isolated fence which can serve as a transverse portion 155 of a dipole antenna 154 and be used with a receiver and harvesting device 20. The center portion 157 can be electrically unshielded from the atmosphere and then take the form of a fence stay 164, a wire 35, rod, or other electrically conductive structure 72 which is in electrical communication with the one or more transverse portions 155, e.g., barbed wire 160 or unbarbed wire 35. Alternatively, the center portion 157 of the dipole antenna 154 can be substantially shielded and isolated from ions in the atmosphere with the exception of the electrically communicating transverse portions 157 which are made of barbed wire 160 or unbarbed wire, e.g., as shown in drawing FIGS. 53 and 54.

On the right side of the antenna 21, a diode 28 can be used to direct voltage and current towards at least one of a battery 31, a capacitor 30, a coil 39, and a resistor or load 32, and then also prevent voltage and current from being trapped in the antenna 21. A second diode 28 facing the opposite direction, or alternatively a bidirectional TVS diode 28 can be used in order to protect the circuit 40wy and its components from an electrical overload that could be caused, e.g., by a lightning strike. The electrical energy collected by the antenna 21 can then be electrically communicated and possibly stored in at least one of a battery 31, a capacitor 30, and/or a coil 39, in partial or complete combination. Accordingly, the antenna 21 can be used to collect electrical energy which can be harvested and stored in the aforementioned structures, and then possibly be used by a resistor or load 32 such as an electrical device. The second switch 22 on the right side of the antenna 21 can include a variable speed control 23, and be used to selectively place the resistor or load 32 in open or closed electrical communication with terrestrial earth 25 ground 24. As shown in FIG. 53, the first switch 22 on the left side of the antenna 21 is open, whereas the second switch 22 on the right side of the antenna 21 is closed. In this regard, when the first switch 22 becomes open the elevated gradient of electrical potential as between earth and its atmosphere will be caused to drop and move downwards proximate to the antenna 21, and this results in a pulse of electrical energy which is then directed out of the antenna 21 and into at least one of the structures or components shown on the right side of the antenna 21, and/or other structures or devices which have been disclosed herein. When the second switch 22 on the right side of the antenna 21 is closed and places the resistor or load 32 in communication with a terrestrial earth 25 ground 24, the electrical energy collected by the antenna 21 and possibly stored in at least one of a battery 31, a coil 39, and a capacitor 30 can be communicated to and used by the load 32. Alternatively, if and when the first switch 22 and the second switch 22 are synchronized to be in the same phase and to open and close at the same time, then the collection and storage of electrical energy, and overall cycle of the receiver and harvesting device 20 and also the load 32 will be changed. Besides the two aforementioned opposite alternatives, i.e., the first switch 22 being open when the second switch is closed, or the first switch 22 being open and the second switch 22 also being open, there is a range of various possibilities with regards to the contact, or dwell, and/or length of the relative working time or duty cycles of the first and second switches 22. The relative speed and timing of the opening and closing of the first and second switches 22 can be configured and adjusted so as to optimize the collection and harvesting of energy and/or the performance of the load 32 or electrical device. For example, if the second switch 22 is opened less frequently than the first switch 22 this can permit a larger amount of electrical energy to be stored in at least one of a battery 31, a coil 39, and/or a capacitor 30 when the load 32 is not in electrical communication with terrestrial earth 25 ground 24. As shown in drawing FIG. 54 with the use of dashed lines, the switches 22 can be initially or continually provided with a remote or phantom source of electrical energy such as a DC or AC power supply, and/or the switches 22 can be provided with electrical energy which has been collected by the antenna 21. Further, one of the two switches 22 can possibly be used to drive and/or control the other. In addition, the possible use of a transformer 42 in the circuit 40$wy$ disposed between the antenna 21 and the load 32 is also shown with the use of dashed lines in drawing FIG. 53. Moreover, it can be readily understood that one or more of the other structures or devices which have been disclosed in this application could possibly be included to alternatively configure, modify or adapt a circuit such as circuit 40$wy$. Again, as previously discussed, the symbol for ellipses has been used to indicate the possibility of omissions and/or alternatives with reference to the structures or devices which can be included in circuit 40$wy$.

Figure 54:
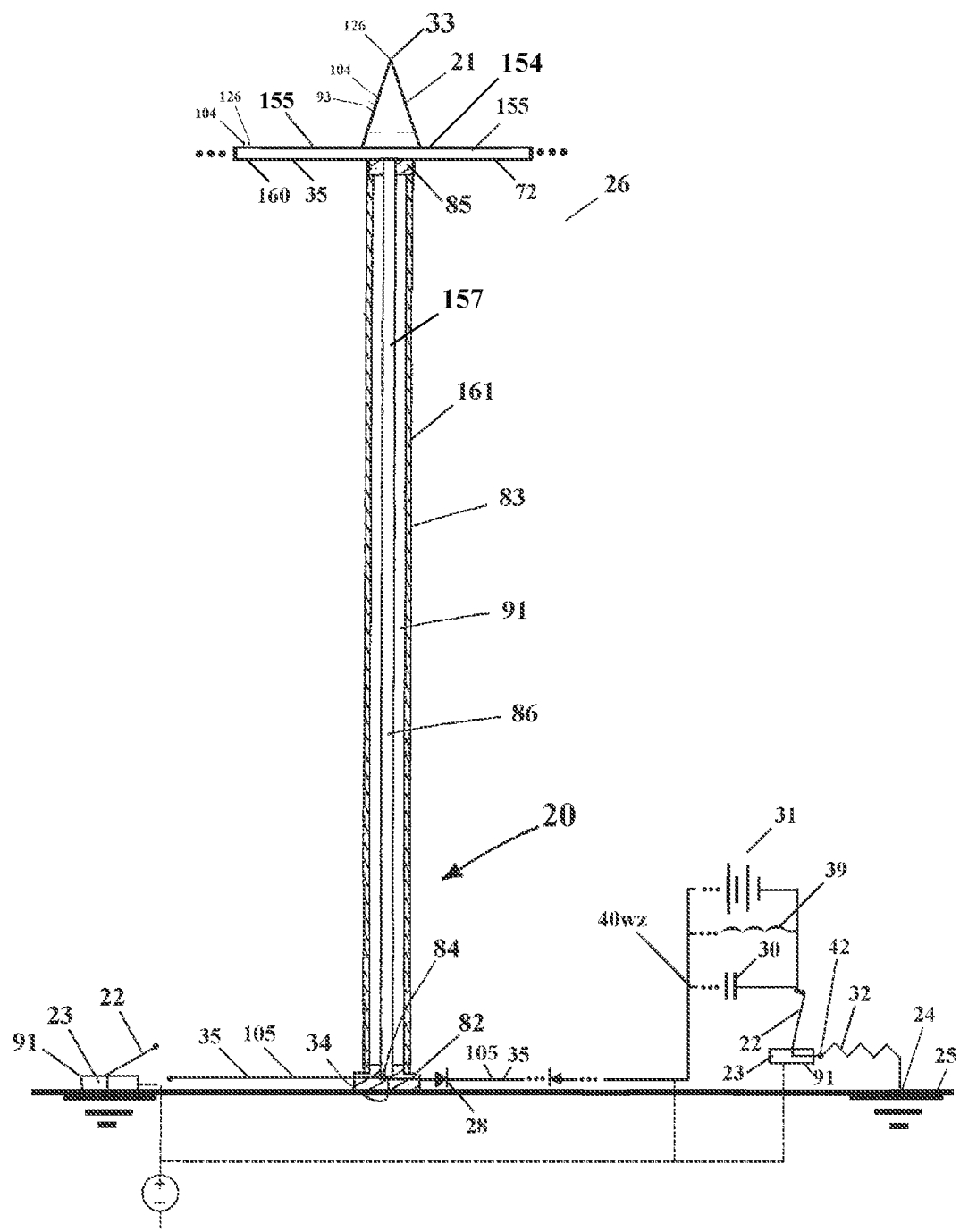
FIG. 54 shows a portion of a fence and another configuration of alternative receiver and harvesting device including two switches.

Drawing FIG. 54 shows a receiver and harvesting device 20 including two switches 22. In this regard, drawing FIG. 54 shows an antenna 21 including a top portion having a phi configuration similar to that shown in drawing FIGS. 49-50, a top end 33, and a bottom end 34. Alternatively, the top portion of the antenna 21 having a phi configuration can be omitted, but including a pointed configuration can sometimes serve to also help protect an antenna 21 from livestock, and the reason and basis for this purpose will be made apparent from the discussion provided below. Drawing FIG. 54 shows an antenna 21 which is configured to be in the form and have the structure of a dipole antenna 154 which includes two opposing transverse portions 155 that are in physical contact with a center portion 157 which is vertically disposed so as to be in electrical communication with the transverse portions 155. The transverse portions 155 can be made of an electrically conductive material. In this regard, the symbol for an ellipses ( . . . ) is here used to represent and show that the transverse portions 155 can extend for a greater length. The dipole antenna 154 can also include a larger number and plurality of transverse portions 155, as discussed below. The center portion 157 of the dipole antenna 154 can either be in constant electrical communication with a receiver and harvesting device 20, or alternatively, can be caused to be in electrical communication with a receiver and harvesting device 20, e.g., with the use of a switch.

As shown in drawing FIG. 54, the main transverse portions 155 of the dipole antenna 154 can of a barbed wire 160 having a plurality of sharp points 126 and which is readily available in various material compositions such as steel, and which can be coated with aluminum, zinc, and other metals, e.g., see ASTM A121-22. Razor wire is here considered to be one form of barbed wire. Alternatively, the dipole 154 antenna 21 can be made of an unbarbed wire 35 as shown in drawing FIG. 35. Further, the dipole 154 antenna 21 can be made of an electrical conductor 72 or a wire 35 which includes a plurality of smaller and more numerous projections or points 126 which can be configured as nanostructures 104 or nanowires 93, and this possibility is represented on the left side of the wire 35 and antenna 21 shown in drawing FIG. 54. In this regard, barbed wire 160 and unbarbed wire 35 which has been galvanized and includes a coating which is often made of zinc can sometimes include a plurality of small irregular protrusions or projections on its surface and this is shown on the barbed wire 60 disposed on the left side of the center portion 157 of the dipole antenna 154 which shows nanostructures 104 and points 126. The center portion 157 of a dipole antenna 154 can also be made of an electrically conductive metal and possibly be configured to serve as a fence post 161 or a fence stay 164.

The barbed wire 160 which has been or will be installed on farms and in other locations in the United States and around the world can be retrofitted and/or fitted so as to be placed in functional electrical communication with a receiving and harvesting device 20. In this regard, barbed wire 160 and unbarbed wire 35 is typically connected to either a wooden fence post(s) 162 using barbed metal staples 166, or to a metal T-post(s) 163 using a small piece of metal wire that is twisted about the barbed wire 160 or unbarbed wire 35. However, when electrical isolation of a barbed wire 160 or unbarbed wire 35 is desired or required to create an electrically charged fence for confining livestock, or in this case to have the barbed wire 160 or unbarbed wire 35 serve as and effectively be the transverse portion(s) 155 of a dipole antenna 154 for a different electrical purpose which relates to collecting and harvesting electrical energy from the electrical potential as between the earth and its atmosphere with a receiver and harvesting device 20, a nonconductive electrical insulator 91 such as a fin tube insulator 165 can be used to isolate the barbed wire 160 or unbarbed wire 35 from the barbed staples 166 and wooden fence post(s) 162. In this regard, a conventional barbed wire 160 fence 167 typically includes 3-5 pieces and elevated layers of barbed wire 160 which are vertically spaced apart and secured to either wooden fence posts 162 or metal T-posts 163. In this case, the top barbed wire 160 or unbarbed wire 35 of a fence 167 having the greatest vertical elevation above the terrestrial earth 25 is typically placed in electrical communication with a receiver and harvesting device 20 because the electrical potential as between the earth and its atmosphere increases with greater vertical elevation. However, the size of the dipole antenna 154 and amount of surface area included on the transverse portions 155, which in this case is a barbed wire 160 or unbarbed wire 35 that is exposed to ions in the atmosphere is also a factor to be considered, and so alternatively the center portion 157 of a dipole antenna 154 which is or can be caused to be in electrical communication with a receiver and harvesting device 20 can possibly be connected to more than one and even all of the barbed wires 160 or unbarbed wires 35 of a fence 167. When barbed wire 160 or unbarbed wire 35 has been or will be installed on metal posts such as T-posts 163, then the barbed wire 160 or unbarbed wire 35 can be electrically isolated from the metal T-posts 163 using an electrical insulator 91 such a nonconductive glass, ceramic, porcelain, thermoplastic material and a structure and/or fastener which is configured and made so as to be quickly and easily attached to the selected metal post(s). In this regard, a large number of fasteners which are commonly known as T-post insulators 168 having different configurations are readily available for use in making an electrically charged fence for the purpose of confining livestock, or in this case to instead make an electrically isolated fence which can serve as a transverse portion 155 of a dipole antenna 154 and be used with a receiver and harvesting device 20. The center portion 157 can be electrically unshielded from the atmosphere and then take the form of a fence stay 164, a wire 35, rod, or other electrically conductive structure 72 which is in electrical communication with the one or more transverse portions 155, e.g., barbed wire 160 or unbarbed wire 35. Alternatively, the center portion 157 of the dipole antenna 154 can be substantially shielded and isolated from ions in the atmosphere with the exception of the electrically communicating transverse portions 157 which are made of barbed wire 160 or unbarbed wire, e.g., as shown in drawing FIGS. 53 and 54. Accordingly, it is possible to configure and effectively create a large dipole antenna 154 using a fence 167 which includes barbed wire 160 having a plurality of sharp points 126 or unbarbed wire 35 and which can extend for many thousands of feet or miles for use with a receiver and harvesting device 20.

The switch 22 including a variable speed control 23 shown on the left side of drawing FIG. 54 is used to selectively place the antenna 21 in open or closed electrical communication with a terrestrial earth 25 ground 24. On the right side of the antenna 21, a diode 28 can be used to direct voltage and current towards at least one of a battery 31, a capacitor 30, a coil 39, and a resistor or load 32, and also to prevent voltage and current from being trapped in the antenna 21. A second diode 28 facing the opposite direction, or alternatively a bidirectional TVS diode 28 can be used in order to protect the circuit 40$wz$ and its components from an electrical overload that could be caused, e.g., by a lightning strike. The electrical energy collected by the antenna 21 can then be directed to and then possibly stored in at least one of a battery 31, a capacitor 30, and/or a coil 39, in partial or complete combination. Accordingly, the antenna 21 can be used to collect electrical energy which can be harvested and stored in these structures and devices, and possibly be used by a resistor or load 32 such as an electrical device. Unlike the configuration and structure shown in drawing FIG. 53, the second switch 22 shown on the right side of the antenna 21 in drawing FIG. 54 is disposed between the load 32 which is already in electrical communication with terrestrial earth 25 ground 24, and the other portion of the circuit 40$wz$ which can include at least one of a wire 35, a diode 28, a capacitor 30, a coil 39, and a battery 31, and at least one of these structures and devices can then be placed in open or closed electrical communication with the load 32 and terrestrial earth 25 ground 24. As shown in FIG. 54, the first switch 22 on the left side of the antenna 21 is open, whereas the second switch 22 on the right side of the antenna 21 is closed. In this regard, when the first switch 22 become open the elevated gradient of electrical potential as between earth and its atmosphere will be cause to drop and move downwards proximate to the antenna 21, and this results in a pulse of electrical energy which is then directed out of the antenna 21 and into at least one of the structures and devices shown on the right side of the antenna 21, and/or other structures or devices which have been disclosed herein. When the second switch 22 on the right side of the antenna 21 is closed and then places the resistor or load 32 which is already in communication with a terrestrial earth 25 ground 24 in electrical communication with at least one of the aforementioned structures or devices included in the circuit 40$wz$, the electrical energy collected by the antenna 21 and possibly stored in at least one of a battery 31, a coil 39, and a capacitor 30 can be communicated to and at least partially used by the load 32. Alternatively, if and when the first switch 22 and the second switch 22 are synchronized to be in the same phase and to open and close at the same time, then the collection and storage of electrical energy, and overall cycle of the receiver and harvesting device 20 and also the load 32 will be changed. Besides the two aforementioned opposite alternatives, i.e., the first switch 22 being open when the second switch is closed, or the first switch 22 being open and the second switch 22 also being open, there is a range of various possibilities with regards to the contact, or dwell, and/or length of the relative working time or duty cycles of the first and second switches 22. The relative speed and timing of the opening and closing of the first and second switches 22 can be configured and adjusted so as to optimize the collection and harvesting of energy and/or the performance of the load 32 or electrical device. For example, if the second switch 22 is opened less frequently than the first switch 22 this can permit a larger amount of electrical energy to be stored in at least one of a battery 31, a coil 39, and/or a capacitor 30 when the load 32 is not in electrical communication with terrestrial earth 25 ground 24.

As shown in drawing FIG. 54 with the use of dashed lines, the switches 22 can be initially or continually provided with a remote or phantom source of electrical energy such as a DC or AC power supply, and/or the switches 22 can be provided with electrical energy which has been collected by the antenna 21. Again, one of the two switches 22 can possibly be used to drive and/or control the other. In addition, the possible use of a transformer 42 in the circuit 40$wz$ disposed between the antenna 21 and the load 32 is also shown with the use of dashed lines in drawing FIG. 54. Moreover, it can be readily understood that one or more of the other structures or devices which have been disclosed in this application could possibly be included to alternatively configure, modify or adapt a circuit such as circuit 40$wz$. Again, as previously discussed, the symbol for ellipses has been used to indicate the possibility of omissions and/or alternatives with reference to the structures or devices which can be included in circuit 40$wz$.

Figure 55:
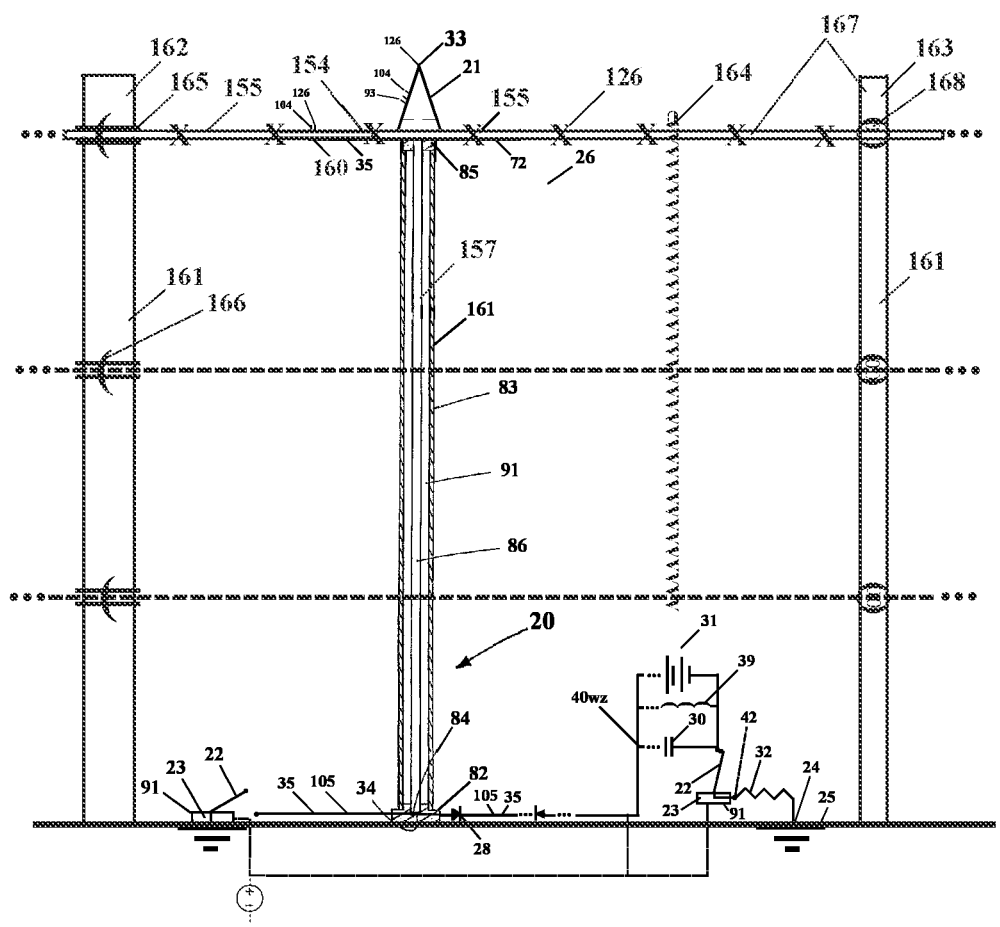
FIG. 55 shows a fence and a dipole antenna having a substantially shielded center portion which is in electrical communication with a receiver and harvesting device.

Drawing FIG. 55 shows a fence 167 and a dipole antenna 154 including transverse portions 155 made of barbed wire 160 and a substantially shielded center portion 157 which is in electrical communication with a receiver and harvesting device 20. Also shown are several fence posts 161 including a wooden fence post 162 with a barbed staple 166 for securing an insulator such as a fin tube wire insulator 165 which is disposed around the barbed wire 160 on the left side of the drawing figure, and a metal T-post 163 including a T-post insulator 168 which is disposed around at least a portion of the barbed wire 160 on the right side of drawing FIG. 55. A fence stay 164 is shown on the right side of the drawing figure between the center portion 157 of the dipole antenna 154 and the T-post 163. The center portion 157 of the dipole antenna 154 can also serve as a fence stay 164 and/or fence post 161. Shown with the use of phantom dashed lines are the positions of two other portions of barbed wire 160. In FIG. 55, the center portion 157 of the dipole antenna 154 is substantially shielded from ions in the atmosphere between its bottom end 34 and most of its length until it reaches the two transversion portions 155 of the dipole antenna 154 which are made of the barbed wire 160 which has the highest vertical elevation above terrestrial earth 25 ground 24 relative to the others. Alternatively, the center portion 157 of the dipole antenna 154 can be configured to also be in electrical communication with one or more of the barbed wires 160 which are disposed at lower elevations above terrestrial earth 25 ground 24. The center portion 157 and transverse portions 155 of the dipole antenna 154 can be configured in a T shape as shown in drawing FIG. 51, or alternatively can include pointed top end 33 for collecting ions and protecting the dipole antenna 154 from livestock as shown in drawing FIG. 55. An unbarbed wire 35 can be used in place of barbed wire 160, but all things being equal the points 126 on barbed wire 160 typically provide for the collection of a larger number of ions at a faster rate and therefore more electrical energy relative to unbarbed wire 35.

Figure 56:
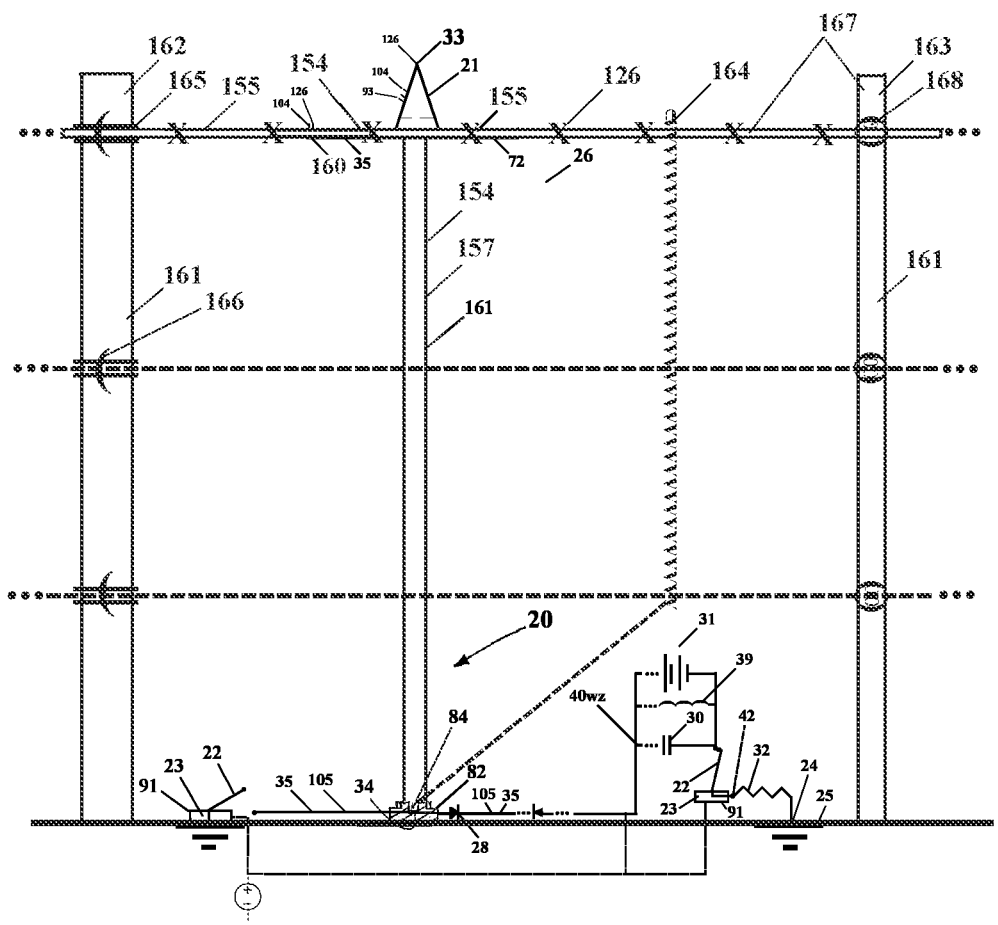
FIG. 56 shows a fence and a dipole antenna having an unshielded center portion which is in electrical communication with a receiver and harvesting device.

Drawing FIG. 56 shows a fence 167 and a dipole antenna 154 including transverse portions 155 made of barbed wire 160 and an unshielded center portion 157 which is in electrical communication with a receiver and harvesting device 20. Also shown are several fence posts 161 including a wooden fence post 162 with a barbed staple 166 for securing an insulator such as a fin tube wire insulator 165 which is disposed around the barbed wire 160 on the left side of the drawing figure, and a metal T-post 163 including a T-post insulator 168 which is disposed around at least a portion of the barbed wire 160 on the right side of drawing FIG. 55. A fence stay 164 is shown on the right side of the drawing figure between the center portion 157 of the dipole antenna 154 and the T-post 163. A phantom dashed line is shown between the fence stay 164 and the connection 84 with a wire 35 associated with the receiver and harvesting device 20 in order to show that a fence stay 164 can possibly be used as the center portion 157 of the dipole antenna 154. The center portion 157 of the dipole antenna 154 can also serve as a fence stay 164 and/or fence post 161. Shown with the use of phantom dashed lines are the positions of two other portions of barbed wire 160. In FIG. 56, the center portion 157 of the dipole antenna 154 is unshielded from ions in the atmosphere substantially between its bottom end 34 and top end 33. The center portion 157 of the dipole antenna 154 can be configured to be in electrical communication with the barbed wire 160 having the greatest vertical elevation, but also one or more of the barbed wires 160 which are disposed at lower elevations above terrestrial earth 25 ground 24. The center portion 157 and transverse portions 155 of the dipole antenna 154 can be configured in a T shape resembling the dipole antenna 154 shown in drawing FIG. 51, or alternatively can include pointed top end 33 for collecting ions and protecting the dipole antenna 154 from livestock as shown in drawing FIG. 56. An unbarbed wire 35 can be used in place of barbed wire 160, but all things being equal the points 126 on barbed wire 160 typically provide for the collection of a larger number of ions at a faster rate and therefore more electrical energy relative to unbarbed wire 35. Moreover, it can be readily understood that when a barbed wire 160 or unbarbed wire 35 is continuous so as to configure a loop, or one or more pieces of barbed wire 160 or unbarbed wire 35 are in disposed in direct contact and/or in electrical communication with each other that an antenna 21 can be configured to make a loop, and thereby a closed loop antenna 158. In this regard, the closed loop can have a circular, square, rectangle, or any other regular or irregular geometric configuration.

Supplies for making a barbed wire 160 or unbarbed wire 35 fence 167 and supplies for electrical fences can be obtained from large retailers like the Home Depot, https://www.homedepot.com, Lowes, https://www.lowes.com, Ace Hardware, https://www.acehardware.com, online from Amazon, https://www.amazon.com, and in particular from companies and retailers that specialize in providing farm supplies, e.g., the Grange CO-OP located in Ashland, Oregon, https://grangecoop.com, the Tractor Supply Company located in Redding, California, https://tractorsupply.com, and Western Ranch Supply, https://westernranchsupply.com.

The following Clauses provide exemplary structures of a device for receiving and harvesting electrical energy from the earth and its atmosphere, and also a method of making such a receiver and harvesting device.

Clause 1: A device configured to receive electrical energy from an electrical potential derived from the earth and its atmosphere, the device comprising: an antenna comprising a length between a top end and a bottom end, said top end being disposed at a first elevation, said bottom end being disposed at a second elevation, said first elevation being vertically higher than said second elevation; a terrestrial earth ground; a switch in electrical communication with said antenna and said terrestrial earth ground, said switch adapted to alternate between an open and a closed electrical connection with said antenna and said terrestrial earth ground many times per second, whereby said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy; said antenna, said switch, and said terrestrial earth ground further comprising an electrically conductive structure or wire, whereby said antenna, said switch, and said terrestrial earth ground are configured to be in electrical communication with one another; said electrically conductive structure or wire being substantially shielded and substantially electrically isolated from ions present in the atmosphere substantially along the length of said antenna between said top end of said antenna disposed at said first elevation and said bottom end of said antenna disposed at said second elevation; said electrically conductive structure or wire also being substantially shielded and substantially electrically isolated between said bottom end of said antenna and said switch and including any connections of said electrically conductive structure or wire to said switch; said electrically conductive structure or wire also being substantially shielded and substantially electrically isolated from said atmosphere between said switch and said terrestrial earth ground until said electrically conductive structure or wire is disposed beneath a surface of said earth and is in subsurface electrical communication with said terrestrial earth ground; and at least one of a resistor or load, a capacitor, and a battery configured to be in electrical communication with said electrically conductive structure or wire and disposed between said antenna and said terrestrial earth ground.

Clause 2: The device of claim 1, further comprising a diode, at least one of said top end of said antenna and said bottom end of said antenna being in electrical communication with said diode.

Clause 3: The device of claim 1, further comprising a tuner in electrical communication with said antenna.

Clause 4: The device of claim 1, further comprising an electronic variable speed control in electrical communication with said switch.

Clause 5: The device of claim 1, further comprising an amplifier in electrical communication with said antenna.

Clause 6: The device of claim 1, further comprising a transistor in electrical communication with said antenna.

Clause 7: The device of claim 1, wherein said antenna further comprises at least one coil.

Clause 8: The device of claim 1, further comprising a circuit in electrical communication with said antenna.

Clause 9: The device of claim 8, said circuit adapted to resonate.

Clause 10: The device of claim 1, further comprising at least one electronic component in electrical communication with said antenna, the at least one electronic component selected from the group of electronic components consisting of: an amplifier, a magnetic amplifier, a converter, said capacitor comprising an air capacitor, an electrolytic capacitor, a series of capacitors, a diode, a series of diodes, a Cockcroft-Walton generator, a coil, a coil comprising a conical shape, a coil comprising primary and secondary windings, a coil comprising a secondary winding comprising a length in the ratio of 1.61803 . . . /1 relative to the primary winding, a DC combiner, a DC multiplier, a demultiplexer, a filter, an inductor, an inverter, a Marx generator, a master control, a wireless master control, a modulator, an oscillator, an on and off master power switch, an on and off phantom power switch, a phase shifter, a phantom power supply, a power output controller, an AC power supply, a DC power supply, a rectifier, a bridge rectifier, a spark gap, a variable speed control switch, a tap, a transistor, a graphene transistor, a transformer, a transmitter, a tuner, a vacuum tube, a series of vacuum tubes, and, a visual display, wherein said antenna is selected from the group consisting of: a monopole antenna, a dipole antenna, a loop antenna, a fractal antenna, an antenna comprising a golden rectangle, an antenna comprising a golden triangle, an antenna comprising a golden spiral, a fractal antenna comprising a Mandelbrot set, an antenna comprising a sphere on said top end, an antenna comprising a toroid on said top end, an antenna comprising a coil, an antenna comprising a tuner, an antenna comprising a tuner comprising a tap, an antenna comprising a tuner comprising an air capacitor, an antenna comprising at least one resistor and at least one capacitor in electrical communication, an antenna comprising a transmitter, and an antenna comprising a counterpoise.

Clause 11: The device of claim 1, wherein said antenna is in electrical communication with at least one of an electric motor in a transportation vehicle and an electric power grid.

Clause 12: A device configured to receive electrical energy from an electrical potential derived from the earth and its atmosphere, the device comprising: an antenna comprising a length between a top end and a bottom end, said top end being disposed at a first elevation, said bottom end being disposed at a second elevation, said first elevation being vertically higher than said second elevation; a terrestrial earth ground; and a switch in electrical communication with said antenna and said terrestrial earth ground, said switch adapted to alternate between an open and a closed electrical connection with said antenna and said terrestrial earth ground many times per second, whereby said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy; said antenna, said switch, and said terrestrial earth ground further comprising an electrically conductive structure, whereby said antenna, said switch, and said terrestrial earth ground are configured to be in electrical communication with one another; said electrically conductive structure being substantially shielded and substantially electrically isolated from ions present in the atmosphere substantially along the length of said antenna between said top end of said antenna disposed at said first elevation and said bottom end of said antenna disposed at said second elevation; said electrically conductive structure also being substantially shielded and substantially electrically isolated between said bottom end of said antenna and said switch and including any connections of said electrically conductive structure to said switch; said electrically conductive structure also being substantially shielded and substantially electrically isolated from said atmosphere between said switch and said terrestrial earth ground until said electrically conductive structure is disposed beneath a surface of said earth and is in subsurface electrical communication with said terrestrial earth ground; at least one of a resistor or load, a capacitor, and a battery configured to be in electrical communication with said electrically conductive structure and disposed between said antenna and said terrestrial earth ground; said antenna comprising an antenna comprising a vertical portion disposed between said first elevation and said second elevation and also a transverse portion comprising a wire which is disposed above said second elevation and said terrestrial earth ground.

Clause 13: The device of claim 12, wherein said wire comprises a barbed wire comprising a plurality of points.

Clause 14: The device of claim 1, wherein said switch comprises a switch selected from the group consisting of a mechanical switch, a relay, a fluid-mechanical mercury switch, an optical switch, a spark gap switch, an electronic circuit and timing chip switch, a transistor switch, a gas filled tube switch, a vacuum tube switch, and a hydrogen thyratron tube switch.

Clause 15: The device of claim 1, further comprising a plurality of nanostructures or nanowires comprising points.

Clause 16: The device of claim 1, further comprising at least one of an ion generator, a magnetofluidynamic drive, and a humidifier or fogger.

Clause 17: The device of claim 1, said at least one of a resistor, a load, a capacitor, and a battery in electrical communication with said electrically conductive structure or wire being configured to be disposed between said bottom end of said antenna and said switch.

Clause 18: The device of claim 1, said at least one of a resistor, a load, a capacitor, and a battery in electrical communication with said electrically conductive structure or wire being configured to be disposed between said switch and said terrestrial earth ground.

Clause 19: The device of claim 1, further comprising at least one vertical structure, said at least one vertical structure selected from the group of vertical structures consisting of: a building, a fence post, a utility pole, a cell phone tower, a recharging station for electric vehicles, and a solar array.

Clause 20: A method of producing electrical energy from the electrical potential derived from the earth and its atmosphere, the method comprising: providing an antenna comprising a top end comprising a plurality of nano structures or nanowires comprising points, and a length between said top end and a bottom end, wherein said top end is disposed at a first elevation and said bottom end is disposed at a second elevation, said first elevation being vertically higher than said second elevation; providing a terrestrial earth ground; providing a switch in electrical communication with said antenna and said ground, providing an electrically conductive structure or wire, whereby said antenna, said switch, and said terrestrial earth ground are in electrical communication with one another; substantially electrically isolating said electrically conductive structure or wire from ions present in the atmosphere substantially along the length of said antenna between said top end of said antenna disposed at said first elevation and said bottom end of said antenna disposed at said second elevation; substantially shielding and substantially electrically isolating said electrically conductive structure or wire between said bottom end of said antenna and said switch and including any connections of said electrically conductive structure or wire to said switch; substantially shielding and substantially electrically isolating said electrically conductive structure or wire from said atmosphere between said switch and said terrestrial earth ground until said electrically conductive structure or wire is disposed beneath a surface of said earth and is in subsurface electrical communication with said terrestrial earth ground; providing at least one of a resistor or a load, a capacitor, and a battery also being in electrical communication with said electrically conductive structure or wire and disposed between said antenna and said terrestrial earth ground; and alternating said switch between an open and a closed electrical connection between said antenna and said terrestrial earth ground many times per second such that said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy.

Without being bound to theory and/or to the scale of some of the devices for receiving and harvesting electrical energy which have been shown in the provided drawing figures and discussed herein, and in view of the fact that atmospheric and terrestrial conditions are ever changing, and that certain electrical phenomenon take place at, near, or perhaps even faster than the speed of light, the provided drawing figures and related discussion in this specification have been provided in order to disclose a device and method of collecting and harvesting electrical energy from the earth and its atmosphere.

Having thus described the invention, it should be apparent that numerous structural modifications and adaptations may be resorted to without departing from the scope and fair meaning of the instant invention as set forth hereinabove.

What is claimed is:

1. A device configured to receive electrical energy from an electrical potential derived from the earth and its atmosphere, the device comprising:
    an antenna comprising a length between a top end and a bottom end, said top end being disposed at a first elevation, said bottom end being disposed at a second elevation,
    said first elevation being vertically higher than said second elevation;
    a terrestrial earth ground;
    a switch in electrical communication with said antenna and said terrestrial earth ground, said switch adapted to alternate between an open and a closed electrical connection with said antenna and said terrestrial earth ground many times per second, whereby said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy;
    said antenna, said switch, and said terrestrial earth ground further comprising an electrically conductive structure or wire, whereby said antenna, said switch, and said terrestrial earth ground are configured to be in electrical communication with one another;
    said electrically conductive structure or wire being substantially shielded and substantially electrically isolated from ions present in the atmosphere substantially along the length of said antenna between said top end of said antenna disposed at said first elevation and said bottom end of said antenna disposed at said second elevation;
    said electrically conductive structure or wire also being substantially shielded and substantially electrically isolated between said bottom end of said antenna and said switch and including any connections of said electrically conductive structure or wire to said switch;
    said electrically conductive structure or wire also being substantially shielded and substantially electrically isolated from said atmosphere between said switch and said terrestrial earth ground until said electrically conductive structure or wire is disposed beneath a surface of said earth and is in subsurface electrical communication with said terrestrial earth ground;
    and at least one of a resistor or load, a capacitor, and a battery configured to be in electrical communication with said electrically conductive structure or wire and disposed between said antenna and said terrestrial earth ground.

2. The device of claim 1, further comprising a diode, at least one of said top end of said antenna and said bottom end of said antenna being in electrical communication with said diode.

3. The device of claim 1, further comprising a tuner in electrical communication with said antenna.

4. The device of claim 1, further comprising an electronic variable speed control in electrical communication with said switch.

5. The device of claim 1, further comprising an amplifier in electrical communication with said antenna.

6. The device of claim 1, further comprising a transistor in electrical communication with said antenna.

7. The device of claim 1, wherein said antenna further comprises at least one coil.

8. The device of claim 1, further comprising a circuit in electrical communication with said antenna.

9. The device of claim 8, said circuit adapted to resonate.

10. The device of claim 1, further comprising at least one electronic component in electrical communication with said antenna, the at least one electronic component selected from the group of electronic components consisting of: an amplifier, a magnetic amplifier, a converter, said capacitor comprising an air capacitor, an electrolytic capacitor, a series of capacitors, a diode, a series of diodes, a Cockcroft-Walton generator, a coil, a coil comprising a conical shape, a coil comprising primary and secondary windings, a coil comprising a secondary winding comprising a length in the ratio of 1.61803/1 relative to the primary winding, a DC combiner, a DC multiplier, a demultiplexer, a filter, an inductor, an inverter, a Marx generator, a master control, a wireless master control, a modulator, an oscillator, an on and off master power switch, an on and off phantom power switch, a phase shifter, a phantom power supply, a power output controller, an AC power supply, a DC power supply, a rectifier, a bridge rectifier, a spark gap, a variable speed control switch, a tap, a transistor, a graphene transistor, a transformer, a transmitter, a tuner, a vacuum tube, a series of vacuum tubes, and, a visual display, wherein said antenna is selected from the group consisting of: a monopole antenna, a dipole antenna, a loop antenna, a fractal antenna, an antenna comprising a golden rectangle, an antenna comprising a golden triangle, an antenna comprising a golden spiral, a fractal antenna comprising a Mandelbrot set, an antenna comprising a sphere on said top end, an antenna comprising a toroid on said top end, an antenna comprising a coil, an antenna comprising a tuner, an antenna comprising a tuner comprising a tap, an antenna comprising a tuner comprising an air capacitor, an antenna comprising at least one resistor and at least one capacitor in electrical communication, an antenna comprising a transmitter, and an antenna comprising a counterpoise.

11. The device of claim 1, wherein said antenna is in electrical communication with at least one of an electric motor in a transportation vehicle and an electric power grid.

12. A device configured to receive electrical energy from an electrical potential derived from the earth and its atmosphere, the device comprising:
- an antenna comprising a length between a top end and a bottom end, said top end being disposed at a first elevation, said bottom end being disposed at a second elevation,
- said first elevation being vertically higher than said second elevation;
- a terrestrial earth ground; and
- a switch in electrical communication with said antenna and said terrestrial earth ground, said switch adapted to alternate between an open and a closed electrical connection with said antenna and said terrestrial earth ground many times per second, whereby said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy;
- said antenna, said switch, and said terrestrial earth ground further comprising an electrically conductive structure, whereby said antenna, said switch, and said terrestrial earth ground are configured to be in electrical communication with one another;
- said electrically conductive structure being substantially shielded and substantially electrically isolated from ions present in the atmosphere substantially along the length of said antenna between said top end of said antenna disposed at said first elevation and said bottom end of said antenna disposed at said second elevation;
- said electrically conductive structure also being substantially shielded and substantially electrically isolated between said bottom end of said antenna and said switch and including any connections of said electrically conductive structure to said switch;
- said electrically conductive structure also being substantially shielded and substantially electrically isolated from said atmosphere between said switch and said terrestrial earth ground until said electrically conductive structure is disposed beneath a surface of said earth and is in subsurface electrical communication with said terrestrial earth ground;
- at least one of a resistor or load, a capacitor, and a battery configured to be in electrical communication with said electrically conductive structure and disposed between said antenna and said terrestrial earth ground;
- said antenna comprising an antenna comprising a vertical portion disposed between said first elevation and said second elevation and also a transverse portion comprising a wire which is disposed above said second elevation and said terrestrial earth ground.

13. The device of claim 12, wherein said wire comprises a barbed wire comprising a plurality of points.

14. The device of claim 1, wherein said switch comprises a switch selected from the group consisting of a mechanical switch, a relay, a fluid-mechanical mercury switch, an optical switch, a spark gap switch, an electronic circuit and timing chip switch, a transistor switch, a gas filled tube switch, a vacuum tube switch, and a hydrogen thyratron tube switch.

15. The device of claim 1, further comprising a plurality of nanostructures or nanowires comprising points.

16. The device of claim 1, further comprising at least one of an ion generator, a magnetofluidynamic drive, and a humidifier or fogger.

17. The device of claim 1, said at least one of a resistor, a load, a capacitor, and a battery in electrical communication with said electrically conductive structure or wire being configured to be disposed between said bottom end of said antenna and said switch.

18. The device of claim 1, said at least one of a resistor, a load, a capacitor, and a battery in electrical communication with said electrically conductive structure or wire being configured to be disposed between said switch and said terrestrial earth ground.

19. The device of claim 1, further comprising at least one vertical structure, said at least one vertical structure selected from the group of vertical structures consisting of: a building, a fence post, a utility pole, a cell phone tower, a recharging station for electric vehicles, and a solar array.

20. A method of producing electrical energy from the electrical potential derived from the earth and its atmosphere, the method comprising:
- providing an antenna comprising a top end comprising a plurality of nanostructures or nanowires comprising points, and a length between said top end and a bottom end, wherein said top end is disposed at a first elevation and said bottom end is disposed at a second elevation, said first elevation being vertically higher than said second elevation;
- providing a terrestrial earth ground;
- providing a switch in electrical communication with said antenna and said ground, providing an electrically conductive structure or wire, whereby said antenna, said switch, and said terrestrial earth ground are in electrical communication with one another;
- substantially electrically isolating said electrically conductive structure or wire from ions present in the atmosphere substantially along the length of said antenna between said top end of said antenna disposed at said first elevation and said bottom end of said antenna disposed at said second elevation;
- substantially shielding and substantially electrically isolating said electrically conductive structure or wire between said bottom end of said antenna and said switch and including any connections of said electrically conductive structure or wire to said switch;
- substantially shielding and substantially electrically isolating said electrically conductive structure or wire from said atmosphere between said switch and said terrestrial earth ground until said electrically conductive structure or wire is disposed beneath a surface of said earth and is in subsurface electrical communication with said terrestrial earth ground;
- providing at least one of a resistor or a load, a capacitor, and a battery also being in electrical communication with said electrically conductive structure or wire and disposed between said antenna and said terrestrial earth ground;
- and alternating said switch between an open and a closed electrical connection between said antenna and said terrestrial earth ground many times per second such that said electrical potential is caused to change along said length of said antenna and also between said top end of said antenna and said terrestrial earth ground corresponding with a frequency of said switch being manipulated between said open and said closed electrical connection resulting in the harvesting of a series of pulses of electrical energy.

* * * * *